United States Patent [19]

Patterson

[11] 3,766,520

[45] Oct. 16, 1973

[54] CHARACTER READER WITH HANDPRINT CAPABILITY

[75] Inventor: Joseph V. Patterson, Charlotte, N.C.

[73] Assignee: Regonition Equipment Incorporated, Irving, Tex.

[22] Filed: Nov. 10, 1971

[21] Appl. No.: 197,458

Related U.S. Application Data

[63] Continuation of Ser. No. 867,592, Oct. 20, 1969.

[52] U.S. Cl. ........... 340/146.3 AE, 340/146.3 AC, 340/146.3 MA

[51] Int. Cl. ........................................... G06k 9/12

[58] Field of Search ............... 340/146.3, 146.3 AC, 340/146.3 J, 146.3 AE

[56] References Cited

UNITED STATES PATENTS

| | | | |
|---|---|---|---|
| 3,297,993 | 1/1967 | Clapper | 340/146.3 AE |
| 3,541,511 | 11/1970 | Genchi et al. | 340/146.3 AC |

OTHER PUBLICATIONS

Genchi et al., Proceedings of the IEEE, "Recognition of Handwritten Numerical Characters for Letter Sorting," Vol. 56, No. 8, Aug. 1968, pp. 1292–1301.

*Primary Examiner*—Thomas A. Robinson
*Assistant Examiner*—Leo H. Boudreau
*Attorney*—D. Carl Richards et al.

[57] ABSTRACT

Binary signals representing the black (character presence) or white (character absence) state of each of a plurality of cells in a grid encompassing a character to be identified are compared with the signals from cells surrounding each given cell to produce vector signals identifying the vector relationship of character edges at and adjacent to each cell.

A set of accumulators, one for each member of a set of predetermined character features, is connected to be responsive to the vector signals sequentially for each of a plurality of subsets of said cells. Signals from the accumulators are stored in a storage matrix for each subset. The character features thus stored in the storage matrix for all of the subsets are then applied to character masks for character identification.

17 Claims, 31 Drawing Figures

INVENTOR:
JOSEPH V. PATTERSON

Richards, Harris & Hubbard
ATTORNEYS

INVENTOR:
JOSEPH V. PATTERSON

Richards, Harris & Hubbard
ATTORNEYS

INVENTOR:
JOSEPH V. PATTERSON

Richards, Harris & Hubbard
ATTORNEYS

INVENTOR:
JOSEPH V. PATTERSON

Richards, Harris & Hubbard
ATTORNEYS

FIRST RING VECTOR DERIVATION

SECOND RING VECTOR DERIVATION

INVENTOR:
Richards, Harris & Hubbard
ATTORNEYS

CURVATURE DERIVATION (STOP-NODE-STRAIGHT LINE)

CURVATURE DERIVATION (STOP-NODE-STRAIGHT LINE)

CURVATURE DERIVATION
(STOP-NODE-STRAIGHT LINE)

CURVATURE DERIVATION
(STOP-NODE-STRAIGHT LINE)

INVENTOR:
JOSEPH V. PATTERSON

Richards, Harris & Hubbard
ATTORNEY

INVENTOR:
JOSEPH V. PATTERSON

Richards, Harris & Hubbard
ATTORNEY

INVENTOR:
JOSEPH V. PATTERSON

Richards, Harris & Hubbard
ATTORNEY

INVENTOR:
JOSEPH V. PATTERSON

Richards, Harris & Hubbard
ATTORNEY

INVENTOR:
JOSEPH V. PATTERSON
Richards, Harris & Hubbard
ATTORNEY

INVENTOR

JOSEPH V. PATTERSON

Richards, Harris & Hubbard

ATTORNEY

CHARACTER READER WITH HANDPRINT CAPABILITY

This application is a continuation of application Ser. No. 867,592, filed Oct. 20, 1969, entitled CHARACTER READER WITH HANDPRINT CAPABILITY and assigned to the same assignee now abandoned.

BACKGROUND OF THE INVENTION

This invention relates to character recognition, and more particularly to a method and system wherein the vector relationship of boundary between a character and its background is evaluated and employed in relation to preselected character features to provide character identification, permitting handprint identification capability as well as identification of printing by conventional type fonts and the like.

In the past, users of data processing equipment desiring to read handprinted information for data input to data processing equipment have been faced with the problem of achieving the desired degree of reading reliability. It was necessary to place constraints on the handprinted information. This made the material extremely difficult to follow. Prior optical handprinting readers have been limited to the recognition of numbers and a few selected characters only with severe printing restrictions.

The present invention permits considerable variation in individual handprinting. A major advantage of the optical reading system of the present invention is that it may recognize characters consisting of capital letters, numbers and special symbols, such as $, +, −, and =. The only constraints employed in the present system are that each character is to be printed within a predetermined field, such as a preprinted box, and that they be executed without voids or extra loops or frills. Such restrictions do not demand an unusual amount of care and effort by the writer. Printing can be done with an ordinary soft lead pencil or with a ball point pen preferably using a black, pigment-based ink so long as lines produced do not have voids therein.

Generally too much data is available in a handprinted character rather than an insufficient amount. The purpose of the feature analysis employed in this invention is to extract the data which is inherent in any given character, while excluding the data which is not inherent to any given character. In other words, that data which gives a character its shape is extracted, while data such as size, position, height-to-width ratio, and font style are excluded.

SUMMARY OF INVENTION CLAIMED

In accordance with this invention, automatic recognition of characters is provided where representations of such characters are sequentially focused onto an array of photocells forming a retina whose output signals are applied to amplitude correlators to derive for each cell a black output signal or a white output signal for control of character selection.

Vector generator means are responsive to the derived signal from each cell and to the derived signals from cells surrounding each cell for generating a vector signal which is combined with adjacent vector signals to generate a curvature signal representative of the type of curvature in said character responsible for the output signal from each cell.

In response to the vector signals, automatic means classify and store sets of indicia designating one or more predetermined features of the character present in zones occupied by each of a plurality of multiple contiguous or overlapping subarrays of the array of photocells.

Means including character mask comparison means responds to the sets of indicia for producing an output signal uniquely representative of the character in question.

DESCRIPTION OF THE DRAWINGS

For a more complete understanding of the invention and for further objects and advantages thereof, reference may be had to the following description taken in conjunction with the accompanying drawings, in which.

GENERAL

The present invention will be described in connection with a particular example comprising one embodiment found to operate satisfactorily in identifying handwritten alphanumeric characters. The example involves recognizing the numerals zero through nine and a space. It was specifically provided to respond to a format wherein numeric characters were handprinted in a field defined by a rectangular box and with the characters substantially filling the box with no breaks in stroke.

In considering this example, it should be kept in mind that six basic stages of operations are involved. They are:

Stage 1 — Digitizing with conversion of analog grey to black and white.

Stage 2 — Vector derivation by determining local direction of black - white interface.

Stage 3 — Curvature derivation by determining local change of direction of black - white interface.

Stage 4 — Feature derivation by determining regional shape characteristics.

Stage 5 — Recognition masking by comparison with stored character memory.

Stage 6 — Character decision.

Stages 1, 5 and 6, in general, are common to operations conducted in a prior system such as described and claimed in U.S. Pat. No. 3,417,372 to Bieser and thus, the present invention involves a system wherein a handprint character recognition module essentially is introduced into and becomes a part of the data flow channel of U.S. Pat. No. 3,417,372.

FIG. 1

Figure 1:
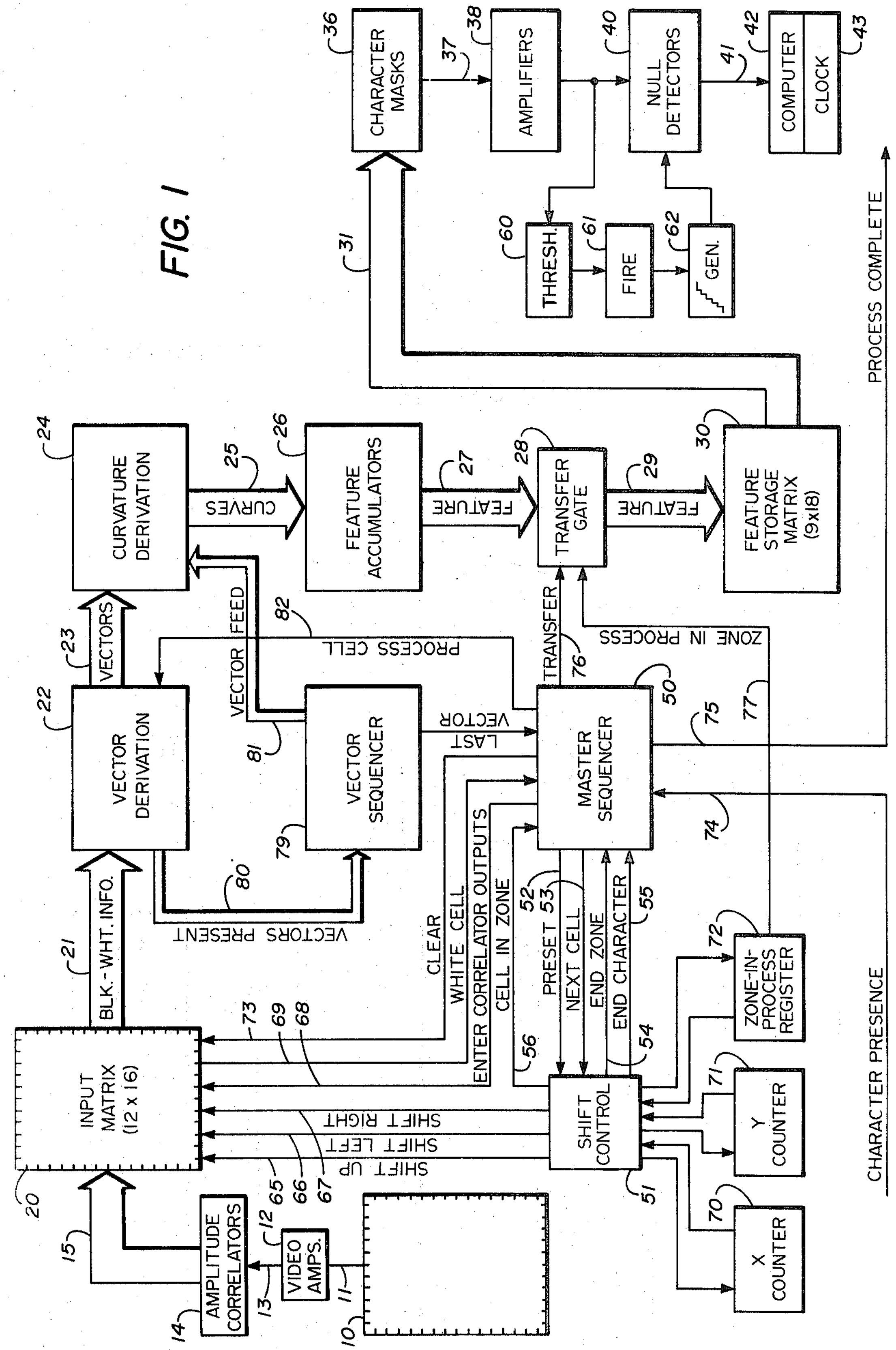
FIG. 1 is a block diagram of an optical character recognition system embodying the present invention.

More particularly, as shown in FIG. 1, a retina 10 comprises a 12 × 16 photocell array. Each photocell provides an output signal which is connected by way of 192 separate channels 11 and a corresponding number of video amplifiers 12, channels 13 and amplitude correlators 14 to the input matrix 20 of the handprint reader module. The 192 amplifiers 12 and correlators 14 operate as described in Bieser U.S. Pat. No. 3,417,372.

Matrix 20 is a 12 × 16 storage matrix comprised of 192 flip-flops, one for each cell in retina 10, with suitable control logic therein. The input matrix is connected by way of black - white information channels 21 to a vector derivation unit 22. The vector derivation unit 22 is provided with eighty vector output channels 23 which leads to a curvature derivation unit 24. The system identifies 204 separate curves by a suitable code on 204 output channels 25 which lead to a feature accumulator unit 26.

The object of the operation of this system is to identify for each of a plurality of zones in the retina 10 the presence of any one or more of eighteen predetermined character features. Thus, there are eighteen feature channels 27 connected by way of a transfer gate 28 and channels 29 to a feature storage matrix 30. The features stored in matrix 30 are then used in connection with character masks, as in Bieser U.S. Pat. No. 3,417,372, to generate positive identification of each character.

In a preferred embodiment of the invention, the array 10 is interrogated in nine overlapping zones and the matrix 30 is a 9 × 18 storage matrix having 162 output channels 31 leading to a character mask unit 36. The character mask unit 36 is connected by channels 37 and amplifiers 38 to a null detector 40 and to a threshold unit 60 with a suitable sensing control unit 61 and a step generator 62 whereby there is produced on channel 41 a character identification signal unique for each of the numerals 0–9 and a space. Since the unit 40 and the subsequent units shown in FIG. 1 in general operate the same as in the above U.S. Pat. No. 3,417,372, principle attention will be focused in the present description to the handprint recognition module which comprises that portion of the system beginning with matrix 20 and extending to and including amplifiers 38.

A master sequencer 50 serves to control the operations of the handprint recognition module. The control portions of the system include a shift control unit 51 which is connected to the master sequencer by a preset channel 52, a next cell channel 53, an end zone channel 54, an end character channel 55, and cell-in-zone channel 56. The shift control unit 51 is connected to an X counter 70, a Y counter 71 and a zone-in-process register 72. Two channels lead from each unit 70–72 to the shift control unit 51 for two-way transmission of control functions. The shift control unit is connected by way of control lines 65–67 which apply shift-up, shift-left, and shift-right control signals, respectively, to the input matrix.

The master sequencer 50 is connected by way of channel 68 to the input matrix 20 for control of entry of the output signal from the amplitude correlators 14. A white cell information line 69 is connected from the matrix 20 to the master sequencer 50. A reset line 73 is connected from the master sequencer 50 to matrix 20.

The presence of a character on the retina 10 is signaled to sequencer 50 by way of channel 74. A process complete signal is applied by sequencer 50 to a channel 75. A transfer signal is applied by way of channel 76 from sequencer 50 to gate 28. A zone-in-process signal is applied by way of channel 77 to gate 28. A vector sequencer unit 79 is connected by way of channel 80 to unit 22 and by way of channel 81 to unit 24. A process cell signal is applied by way of channel 82 from sequencer 50 to unit 22. The system thus briefly described will now be considered as to details of construction along with the following principle of operation.

FIG. 2

Each photocell in retina 10 has an electrical output dependent upon the amount of light projected onto the photocell from the document containing handprinted characters. The magnitude of the photocell output current will vary between an upper limit representing the optical density of the document background and a lower limit representing the optical density of the character image.

Each photocell, for example, is connected to a video amplifier whose output is directly proportional to the shade of gray or black representing the character image projected onto a given photocell.

Amplitude correlators 14 compare the output from each photocell with the output of a selected group of surrounding photocells so that a positive determination can be made as to whether or not the signal from each photocell should be designated as a black signal or as a white signal.

More particularly, as explained in greater detail in U.S. Pat. No. 3,417,372, signals from the video amplifiers associated with each of the twenty photocells within the outline 10*a* in FIG. 2 surrounding photocell 0 are applied to amplitude correlator 14. The average output from the photocells in outline 10*a* other than photocell 0 is compared with the output of photocell 0. The amplitude correlators for each photocell in retina 10 thus condition each photocell output to provide a derived signal representative of the proper state of illumination of a given cell considered in relation to the surrounding cells. The signals on channels 14, FIG. 1, correspond with the signals on line 151, FIG. 3 of Bieser U.S. Pat. No. 3,417,372.

FIG. 3

Figure 3:
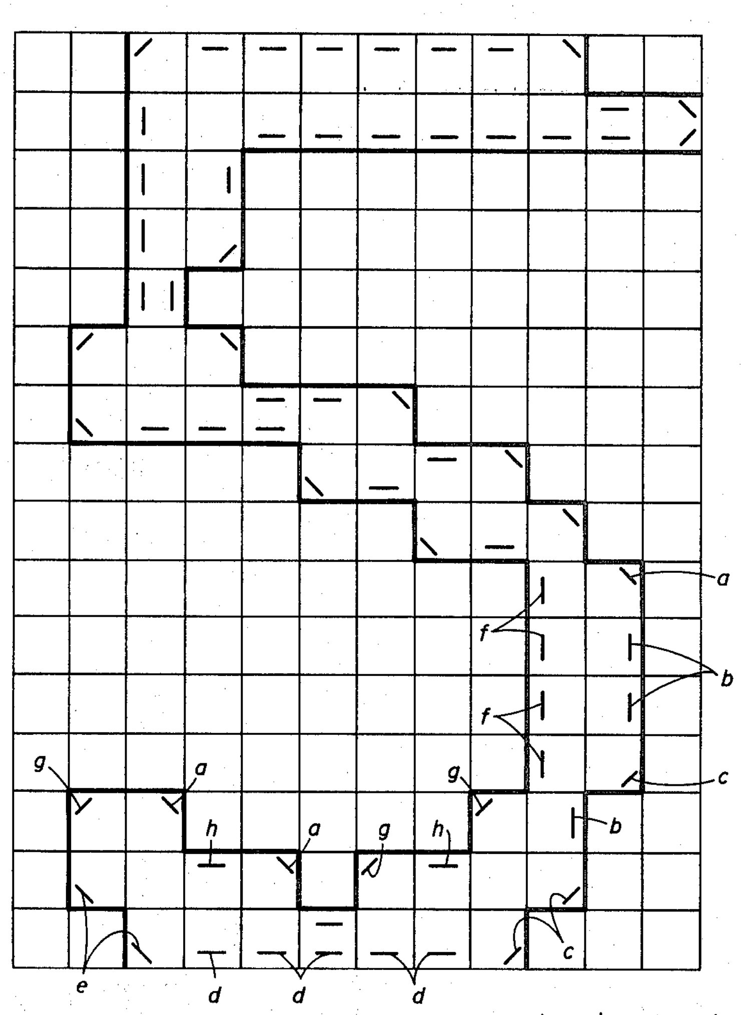
FIG. 3 illustrates edge vectors for the numeral 5 superimposed upon a photocell array.

The handprint module operates in response to each character image projected onto retina 10 by analyzing the black or white state of each amplitude correlator output to determine local line edge direction. Such line edges can be represented by vectors *a–h* as shown in FIG. 3. A change of edge direction, or curvature, is obtained by combining a given photocell vector with the two vectors adjoining the given photocell along the edge. By combining combinations of curvatures, gross shape characteristics or features are obtained. The features derived in this system are designated in Table I which represents the cells in storage matrix 30, FIG. 1.

TABLE I

| | Zones | | | | | | | | |
|---|---|---|---|---|---|---|---|---|---|
| Features | 1 | 2 | 3 | 4 | 5 | 6 | 7 | 8 | 9 |
| Stops | | | | | | | | | |
| Nodes | | | | | | | | | |
| +Curve A | | | | | | | | | |
| +Curve C | | | | | | | | | |
| +Curve E | | | | | | | | | |
| +Curve G | | | | | | | | | |
| −Curve A | | | | | | | | | |
| −Curve C | | | | | | | | | |
| −Curve E | | | | | | | | | |
| −Curve G | | | | | | | | | |
| Horiz. lines | | | | | | | | | |
| Right sl. lines | | | | | | | | | |
| Vert. lines | | | | | | | | | |
| Left sl. lines | | | | | | | | | |
| Sharp A | | | | | | | | | |
| Sharp C | | | | | | | | | |
| Sharp E | | | | | | | | | |
| Sharp G | | | | | | | | | |

The terms of Table I are defined as follows:

Zones = nine contiguous regions in the photocell array.

Stops = line endings characterized by an excess of convex curvature.

Nodes = line intersections characterized by an excess of concave curvature.

+ Curves = convex curves.

− Curves = concave curves.

Sharp = abrupt changes in line direction.

The meanings of these terms are more fully explained in the text following Table IV.

In the analysis, a vector signal is generated dependent upon the relationship of each cell with surrounding photocells. Vector signal generation is determined by analysis of the array 10*a*, FIG. 2. Photocell 0 is the photocell whose vector is to be determined. This vector is determined from the nature of the edges formed between photocell 0 and its surrounding photocells A–H. A photocell must see black and be bordered by at least one white cell to permit use in generation of an edge vector. The vector can be in any one of eight directions, one for each 45° of rotation and designated as vectors *a–h*, FIG. 3.

Figure 4:
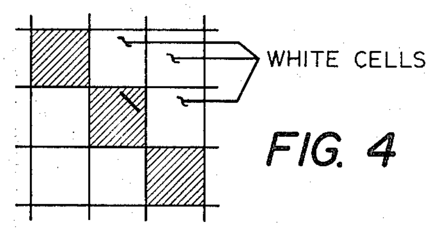
FIGS. 4 and 5 illustrate criteria employed in the invention for vector generation.
Figure 5:
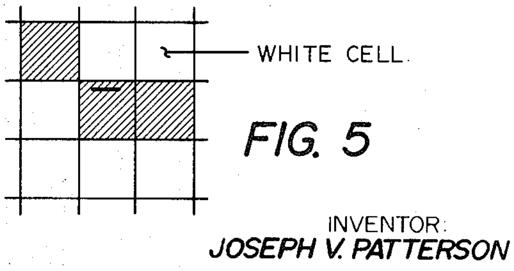

By way of example, vectors *a* and *h* as shown in FIG. 3 exist when the conditions shown in FIGS. 4 and 5, respectively, exist. Conditions shown in FIG. 4 produce vector *a*. Conditions shown in FIG. 5 produce vector *h*. More particularly, it will be considered, by definition, that a diagonal vector will exist in a black cell if the cell adjacent to the vertex (or cell corner) in question and two sides of the cell adjacent to the vertex are white as in FIG. 4. Further, by definition, an orthogonal vector will exist in a black cell if the cell adjacent to the side of the cell in question is white, but does not produce diagonal vectors at the adjacent vertices. Vectors exist only in black cells meeting the above requirements.

These vectors *h* and *a* can be represented in equation form as can all of the eight vectors, as in Table II.

TABLE II $$a = O\,\bar{H}\,\bar{A}\,\bar{B}$$
$$b = O\bar{B}\ (C+D)\ (H+A)$$
$$c = O\,\bar{B}\,\bar{C}\,\bar{D}$$
$$d = O\bar{D}\ (E+F)\ (B+C)$$
$$e = O\,\bar{D}\,\bar{E}\,\bar{F}$$
$$f = O\bar{F}\ (G+H)\ (D+E)$$
$$g = O\,\bar{F}\,\bar{G}\,\bar{H}$$
$$h = O\bar{H}\ (A+B)\ (F+G)$$

Where the photocell designation in Table II has a bar above it, the photocell is white; and where no bar is used, the photocell is black. The combination of two photocells in parenthesis indicates that at least one of the photocells must be white or black depending upon whether a bar is indicated. For example, (C+D) means that either C or D is black.

Photocell 0 may be represented by more than one vector. More particularly, should each of the photocells A–H be white and photocell 0 be black, then photocell 0 is represented by each of the vectors *a*, *c*, *e* and *g*. Should none of these eight conditions be met, no vector signal is generated.

Figure 2:
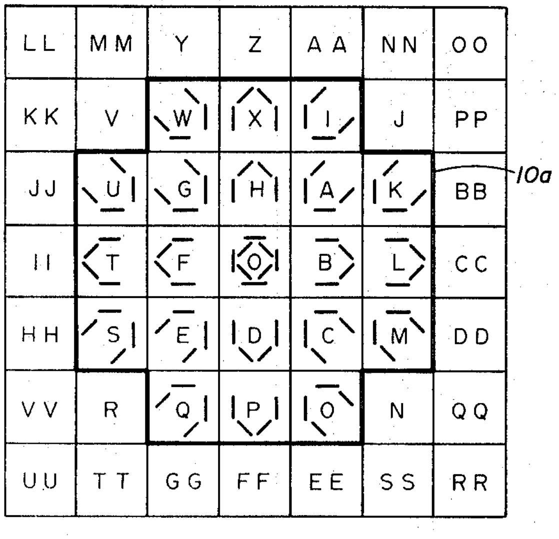
FIG. 2 illustrates search arrays employed in the present invention showing the vector relationships involved therein.

The eight possible vectors for center cell 0 above defined are used in relationship with surrounding photocell vectors to determine a change of edge direction or curvature. Such analysis is accomplished by utilizing combinations of photocell vector signals with the vector signals ascribed to photocells adjoining it at each end. More particularly, the center vectors, as defined, represent eight line edge directions, with adjacent vectors indicating 45° incremental direction change. In a given black/white pattern existing in the process array, as many as four center vectors may be present according to the definitions. It is important that each of these center vectors be processed and that each vector should singly contribute to the accumulative feature derivation process. The vectors which may act as end vectors in a curve whose center vector lies in photocell 0, for example, are also shown in FIG. 2. These vectors may be within photocell 0 also, or may lie in the immediately adjacent cells. In order to derive all vectors, the white/black status of the second ring of photocells I through X must be known. The logic equations for each end vector are set out in Table III.

TABLE III

| | |
|---|---|
| $Ac = A\,\bar{B}\,\bar{L}\,\bar{K}$ | $Eb = E\,\bar{D}\,(P+Q)$ |
| $Ad = A\,\bar{B}\,(L+K)$ | $Ec = E\,\bar{D}\,\bar{P}\,\bar{Q}$ |
| $Af = A\,\bar{H}\,(X+I)$ | $Eg = E\,\bar{F}\,\bar{T}\,\bar{S}$ |
| $Ag = A\,\bar{H}\,\bar{X}\,\bar{I}$ | $Eh = E\,\bar{F}\,(T+S)$ |
| $Ba = B\,\bar{A}\,\bar{L}\,\bar{K}$ | $Fd = F\,\bar{E}\,(T+S)$ |
| $Bc = B\,\bar{C}\,\bar{L}\,\bar{M}$ | $Fe = F\,\bar{E}\,\bar{T}\,\bar{S}$ |
| $Bd = B\,\bar{C}\,(L+M)$ | $Fg = F\,\bar{G}\,\bar{T}\,\bar{U}$ |
| $Bh = B\,\bar{A}\,(L+K)$ | $Fh = F\,\bar{G}\,(T+U)$ |
| $Ca = C\,\bar{B}\,\bar{L}\,\bar{M}$ | $Ga = G\,\bar{H}\,\bar{X}\,\bar{W}$ |
| $Ce = C\,\bar{D}\,\bar{P}\,\bar{0}$ | $Gb = G\,\bar{H}\,(X+W)$ |
| $Cf = C\,\bar{D}\,(P+0)$ | $Gd = G\,\bar{F}\,(T+U)$ |
| $Ch = C\,\bar{B}\,(L+M)$ | $Ge = G\,\bar{F}\,\bar{T}\,\bar{U}$ |
| $Db = D\,\bar{C}\,(P+0)$ | $Ha = H\,\bar{A}\,\bar{X}\,\bar{I}$ |
| $Dc = D\,\bar{C}\,\bar{P}\,\bar{0}$ | $Hb = H\,\bar{A}\,(X+I)$ |
| $De = D\,\bar{E}\,\bar{P}\,\bar{Q}$ | $Hf = H\,\bar{G}\,(X+W)$ |
| $Df = D\,\bar{E}\,(P+Q)$ | $Hs = H\,\bar{G}\,\bar{X}\,\bar{W}$ |

For each orthogonal vector in the center cell there are four possible vectors on either end. Thus, there is a total of sixteen possible three-vector combinations. For each diagonal vector in the center cell there are five possible vectors on either end, including one vector on either end which also lies in the center cell. Thus, there is a total of twenty-five possible three-vector combinations. Since there are four orthogonal and four diagonal vectors in the center cell, there is a total of 164 possible three-vector curvatures.

In order to show the three-vector curvatures in an orderly matrix, a code number which is descriptive of the curve is employed. Each curve is assigned a three-digit number. The first digit represents the direction of the center vector, starting with the digit 1 for the a vector and proceeding clockwise through the digit 8 for the h vector. The second digit represents the number of degrees, in 45° increments, of curvature by which the vector lying counterclockwise from the center vector differs from the center vector, as designated in Table IV:

TABLE IV

8 = 2 units concave
9 = 1 unit concave
0 = same direction as center vector
1 = 1 unit convex
2 = 2 units convex
3 = 2 units convex with the end vector lying in the same cell as the center vector.

Figure 8:
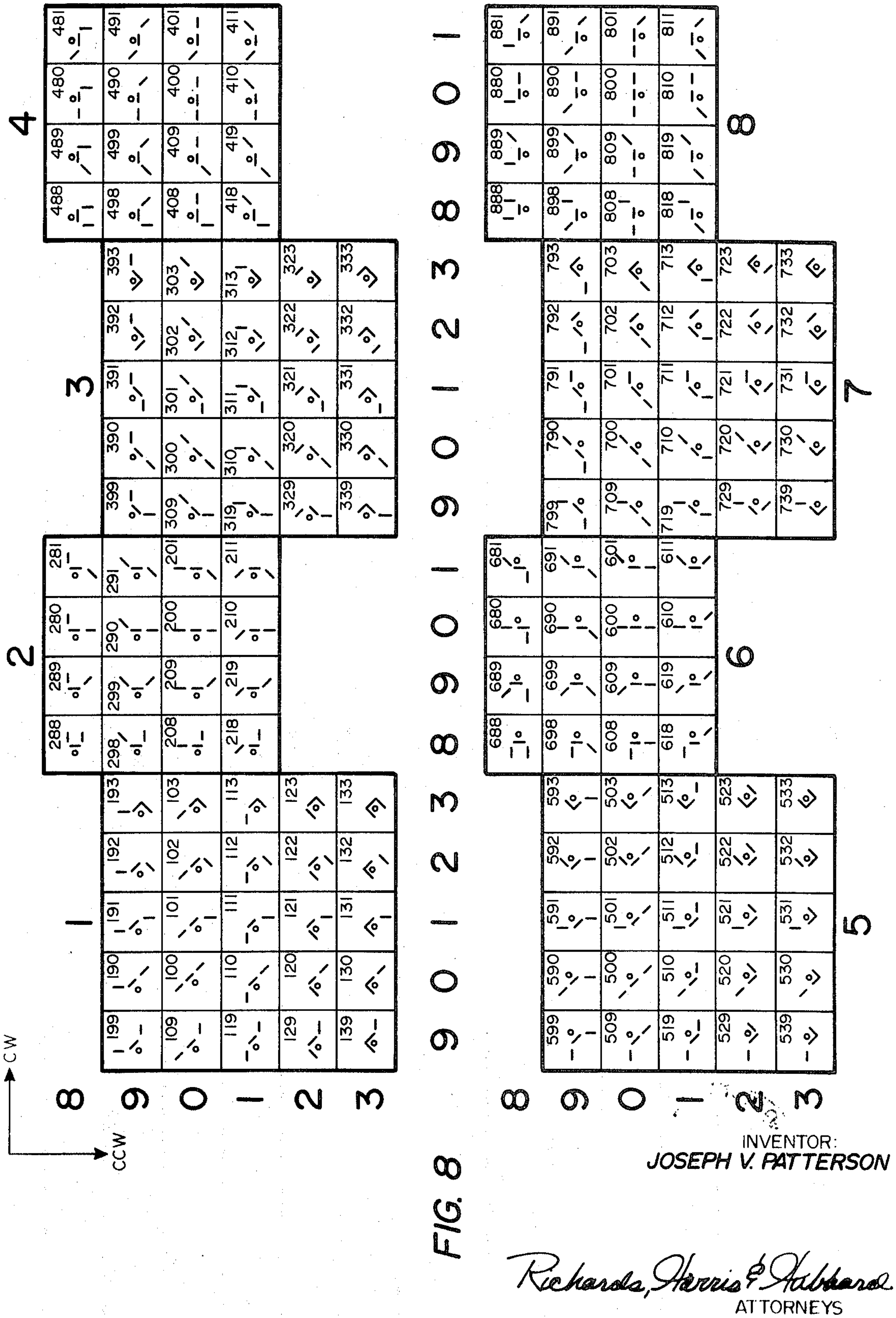
FIG. 8 is a chart illustrating all the three vector combinations sensed in accordance with the present invention.

Likewise the third digit represents the number of degrees, in 45° increments, of curvature by which the vector lying clockwise from the center vector differs from the center vector. FIG. 8 is a chart showing all the 164 possible three-vector combinations or curvatures.

Sharpness has been found to present a special problem. The rectangular nature of the retina 10 tends to accentuate sharp curves, which have edges parallel to the cell boundaries. This makes it more difficult to define which curves are "sharp" and which curves are "not sharp." A curve can be more easily seen as "sharp" if it is bounded by straight lines. That is, if it represents a relatively abrupt transition between straight lines lying 90° or more apart in direction. Therefore, straight lines should enhance sharpness, but not to the extent that straight lines alone would be called "sharp."

Figure 10:
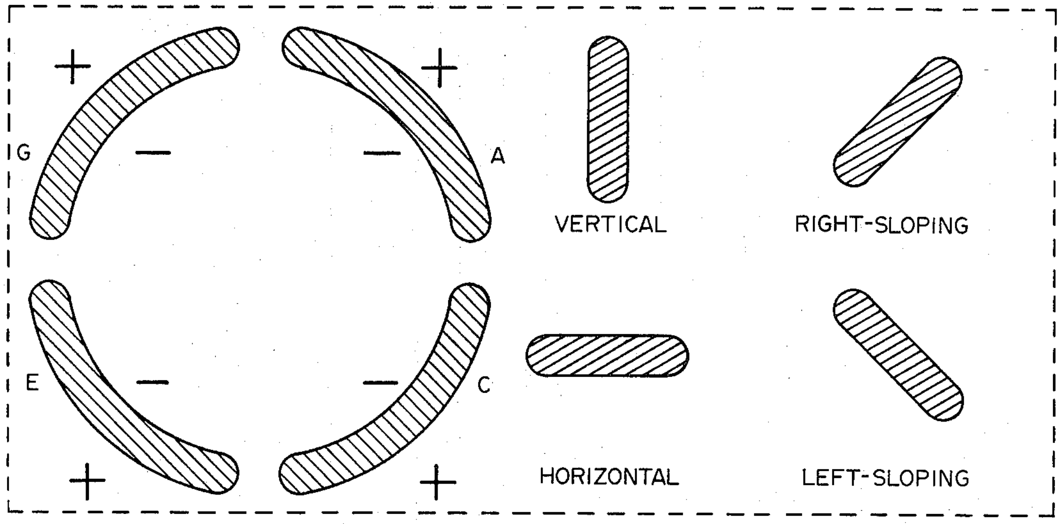
FIG. 10 illustrates curvatures and straight line features which are sensed to identify the nature of character boundaries.

The meaning of concave and convex as used in Table IV will be understood by reference to FIG. 10 wherein positive and negative curvatures for each of the four quadrants A, C, E and G together with the keys to vertical, right sloping, horizontal, and left sloping lines are illustrated. The legend included in FIG. 10 will be used in connection with the detailed drawings of the system later to be described. They are included at this point, however, because of the relationship they bear to the values assigned to the various curves as set out in Table IV.

The following definitions based on the foregoing description will be of assistance:

A vector signal is a signal produced by comparing each black output signal which has an adjoining white output signal with other adjacent output signals to determine the direction of the black/white boundary.

Figure 9:
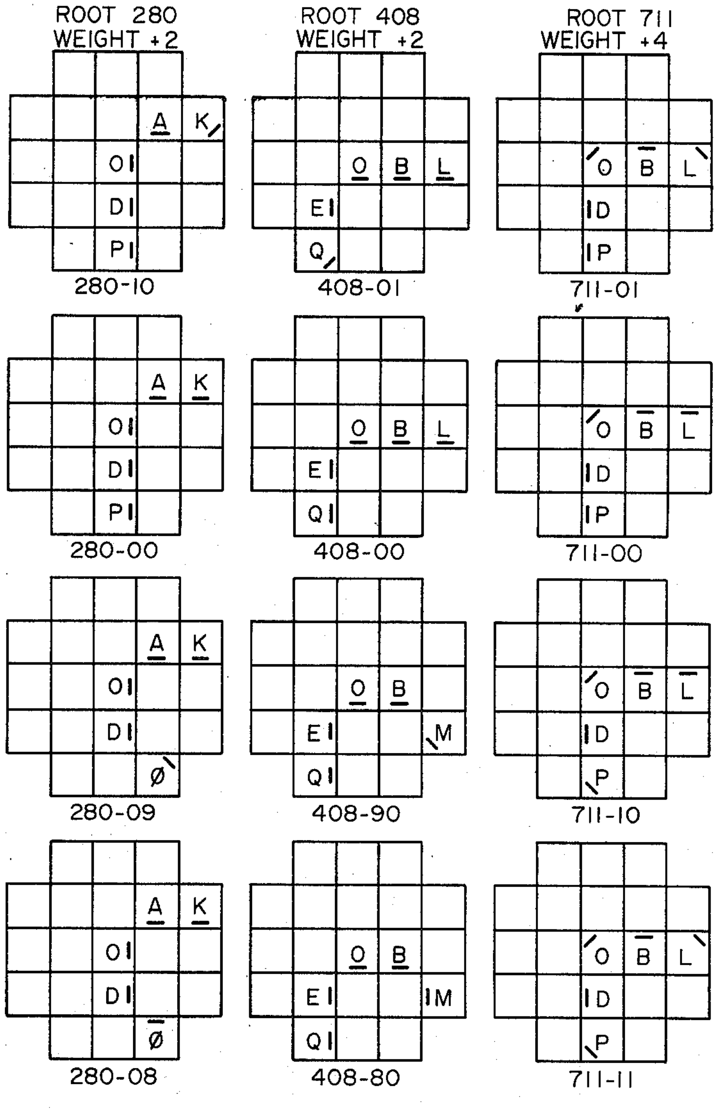
FIG. 9 illustrates one of four sets of five vector combinations employed in the analysis of certain character features.

A curvature signal is a signal generated with reference to three or more vector signals such a illustrated in FIGS. 8 and 9 to indicate changes in direction of the black/white boundary.

A quadrant limited curvature feature signal designates existence of features of black/white boundary having positive or negative curvature (convex or concave) and having orientation designated in terms of four quadrants as illustrated in FIG. 10. By way of example, in identifying the character P, the quadrature limited curvature feature lines leading to the feature storage arrays 2 and 3 of FIG. 29 and designated appropriately by the legends CPA and CNA and would both probably be enabled since the boundary in the character P would have the curvatures of quadrant A, FIG. 10, in zones 2 and 3, FIG. 6, and would not normally exhibit those curvatures in zones 2 and 3 illustrated in quadrants C, E and G, FIG. 10. Additionally, for the letter P the lines leading to feature storage arrays 5 and 6, FIG. 29, would have its lines CPC and CNC enabled.

Further, as will be noted from the description which follows, some of the curvatures are given greater weight in determining the ultimate identity of a given symbol than other curvatures. In FIG. 9, twelve special sets of curves have been illustrated together with the weights to be assigned to the decision making process whenever such curvatures are encountered in the vector and curvature analysis operations. It will be noted that the weighting functions here considered involve the second ring of photocells. They employ five vector combinations. They are all employed for determining when there is a sharpness factor in the G quadrant of the zone under consideration. Thus, FIG. 9 illustrates only the set of five vector groups which are employed in order to determine if there is a sharpness factor in the G quadrant. A similar set will be employed for each of the other three quadrants A, C and E.

In certain cases, more than three vectors along an edge must be combined to define a curve. Therefore, a number of five vector combinations have been chosen to improve readability of ambiguously sharp curves. The use of five vector curvatures requires a simultaneous look at a larger number of cells. Vectors in required cells are shown in FIG. 9. FIG. 9 shows the five vector combinations used with G sharpness. The five vector curves used with the A, C and E sharpnesses can be obtained by rotating the curves shown.

The last two digits in the number of each curve shown are derived by referring to the two end photocells of each curve and using Table IV, substituting the vector of the previous adjacent photocell for the center vector in the Table. For example, in the curve 280–10, the digit 1 means that the vector in photocell K is one unit convex from the vector in photocell A.

FIG. 6

The features previously defined are derived for each zone by weighting curves whose center vector lies within that zone. To insure that each weighted curvature summation actually does represent the feature it contributes to, the zones are chosen to cover the areas where the features are expected to appear. If the zones are too small, the feature cannot be expected to fall within it reliably. If the zone is too large, the inclusion of extraneous curvatures will produce spurious features.

Figure 6:
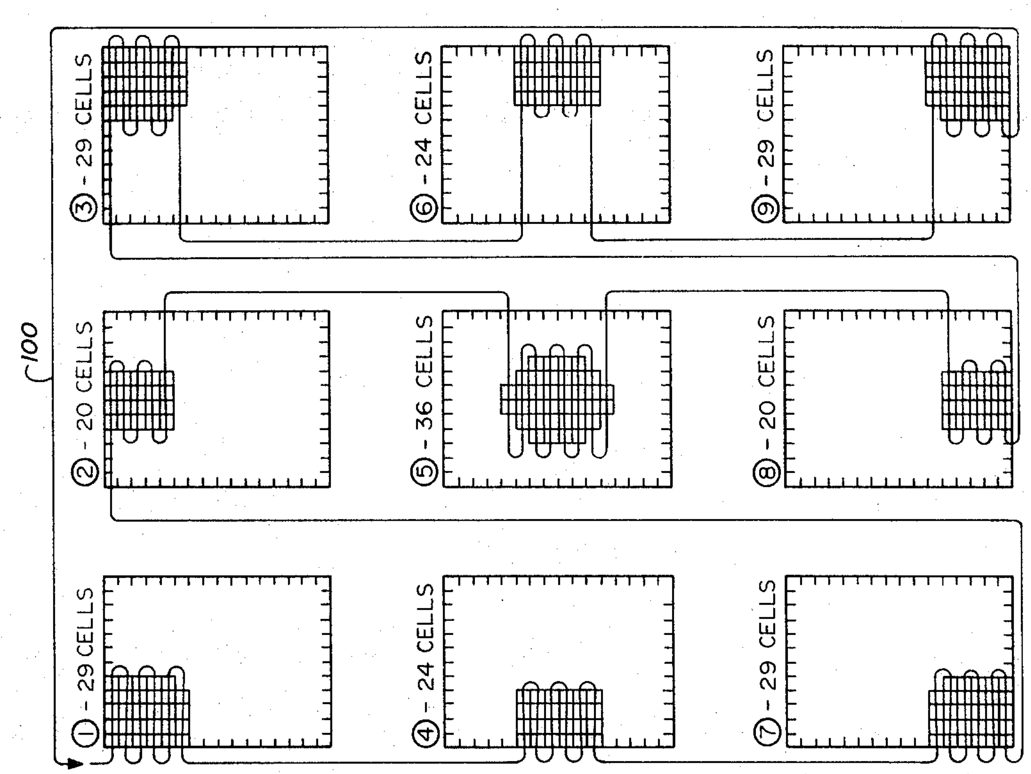
FIG. 6 illustrates a sequence of search through nine retina zones for vector generation.

The nine zones of FIG. 6 are a compromise of the above requirements. They were chosen to conform to the locations of most of the features occurring in the actual alphanumeric character set. The zones overlap by one cell to reduce losses caused by zone straddling features.

Figure 7:
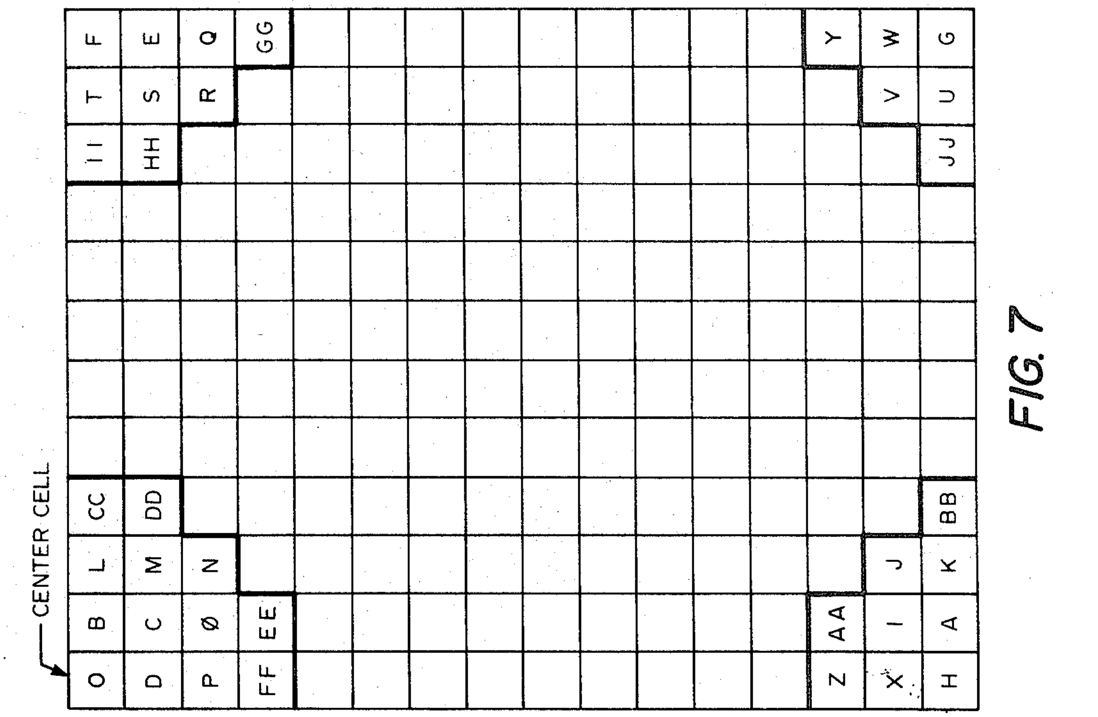
FIG. 7 illustrates the locations of the cells of the preferred process array.

As previously noted, the output from each photocell in the retina 10, as processed by correlators 14, is stored in a 12 × 16 matrix of flip-flops. The flip-flops thus arrayed form a two-dimensional shift register so that each cell is shifted as to occupy the upper left-hand corner position in the shift register matrix. More particularly, as shown in FIG. 7, the zero (0) cell is always considered to be the cell in the upper left-hand corner of the storage matrix 20. With the cell under test at this location, the surrounding cells are in the locations shown in FIG. 7. In such locations the tests for the vector relationships are carried out.

Nine separate zones shown in FIG. 6 are individually examined. The nine zones are labeled in FIG. 6 with zones 1, 3, 7 and 9 each comprising twenty-nine cells. Zones 4 and 6 each have twenty-four cells. Zones 2 and 8 each have twenty cells. Zone 5 has thirty-six cells.

It will be noted that zones 1 and 2 overlap by five cells as do zones 2 and 3. Zones 1 and 4 overlap by four cells with zones 4 and 5 overlapping by four cells. Zones 2 and 5 and zones 5 and 8 overlap by two cells. The overlapping as between zones is provided for the purpose of enhancing the reliability of the detection of features of interest lying within each of the zones.

The shift register is operated to cause cell 1,1 to be first evaluated. The data then stored in cell 1,2 is thereafter evaluated by shifting the entire matrix one column left. The 1,1 data in cells 1,3 and 1,4 and 1,5 are similarly evaluated following succeeding left shifts. Thereafter, cell 2,5 is evaluated by shifting the storage matrix one row up and then shifting in the reverse direction as indicated by path 100 until all the cells in zone 1 occupy position 1,1. After zone 1 has been evaluated, zones 4, 7, 2, 5, 8, 3, 6 and 9 are successively evaluated.

FIG. 11

The foregoing description has related primarily to the mode by which identification is carried out. FIGS. 11–29 represent a more detailed diagram of a preferred embodiment.

Figure 11:
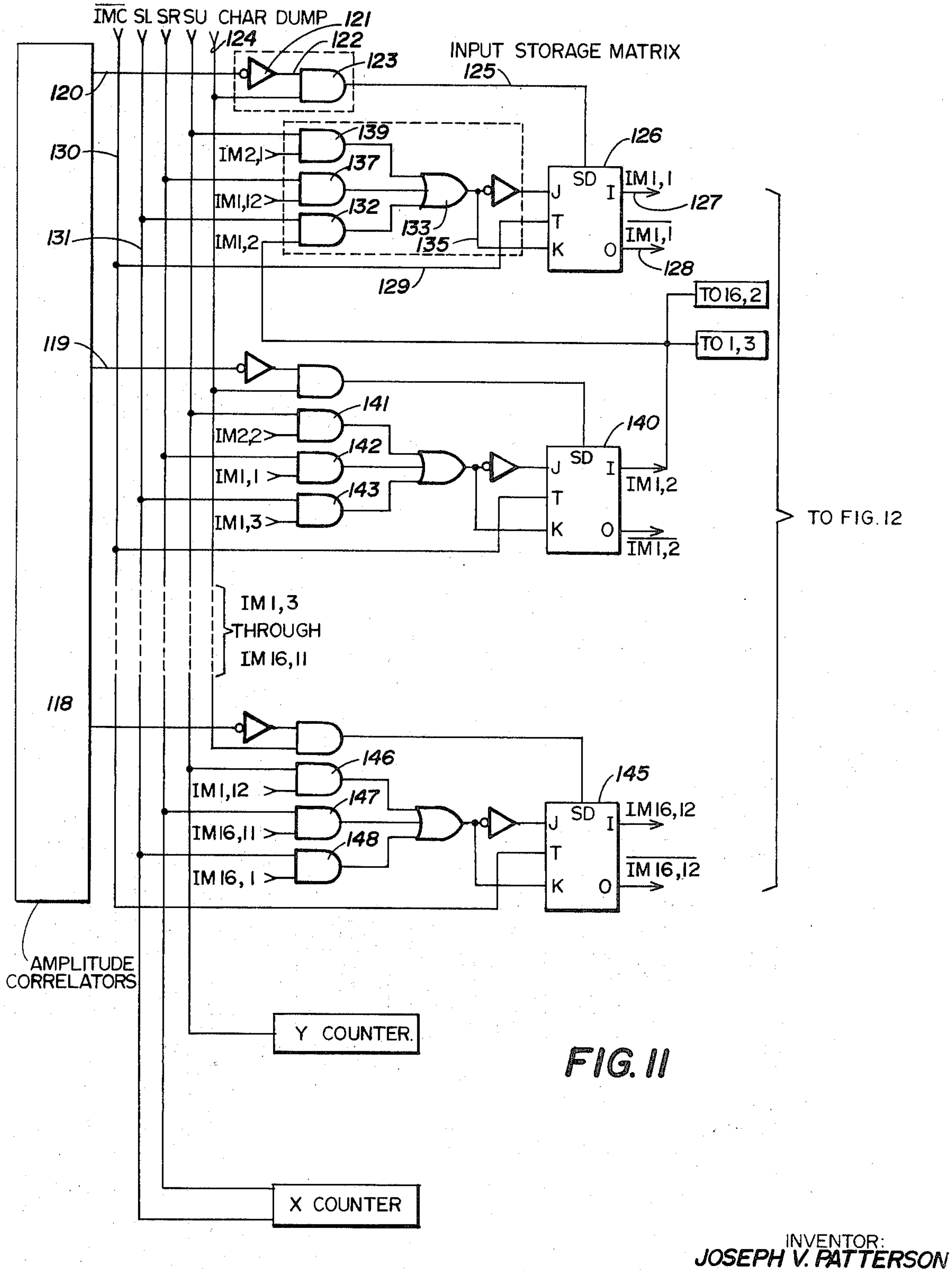
FIG. 11 illustrates in detail the construction of the input matrix of FIG. 1.

As shown in FIG. 11, line 120 extends from correlators 14 as do lines 119 and 118. Only three of the 192 channels leading from the amplitude correlators 14 are shown with the line 120 representing the output from cell 1,1, line 119 from cell 1,2 and line 118 from cell 16,12. Line 120 is connected by way of a threshold circuit 121 and conductor 122 to an AND gate 123, the output of which is connected by way of line 125 to a storage flip-flop 126. Flip-flop 126 has a true output 127 and a false output 128. A reset bus 130 is connected to the flip-flop 126 by line 129. A shift left control bus 131 is connected to an AND gate 132 whose output is connected by way of OR gate 133 and an inverter 134 to one of the steering inputs of the flip-flop 126. The output of OR gate 133 is connected by way of line 135 to the other steering input of flip-flop 126.

A shift right control bus 136 is connected by way of AND gate 137 to OR gate 133. A shift up control bus 138 is connected by way of AND gate 139 to OR gate 133. A character dump bus 124 is connected to the second input of AND gate 123.

The first input to AND gate 132 is connected to the shift left bus 131 and the second input is connected to the IM1,2 output of the flip-flop 140. The second input to AND gate 137 is connected to a flip-flop output IM1,12. The input to AND gate 139 is connected to a flip-flop output IM2,1.

The flip-flop 140 is connected to respond to the signal on line 119 from amplitude correlators 14 in the same manner as flip-flop 126 responds to the signal on line 120. However, inputs to the AND gates 141,142 and 143 are connected to flip-flop outputs IM2,2; IM1,1; and IM1,3, respectively. Similarly, the flip-flop 145 responds to the signal on line 118 from correlators 14 in the same manner as flip-flop 126 responds to the signal on line 120. However, the input to AND gates 146, 147 and 148 are connected to flip-flop outputs IM1,12; IM16,11; and IM16,1, respectively.

The true output of flip-flop 140 is shown directly connected to an input of AND gate 132. It also is connected to an AND gate in the control circuit leading to flip-flops for cells 1,3 and 16,2 for response to a shift right control signal and a shift left control signal.

In order to follow the path 100 of FIG. 6, the entire matrix is moved so that each cell will occupy the zero position of FIG. 7 with no more than two shift pulses required between successive vector derivations. In vector derivation at the end of zone 1 to the start of zone 4, no shift is required. However, in shifting from cell 5,6 of zone 5 to cell 6,5, two shift pulses will be required. Otherwise, only one shift is required.

It will thus be understood that the storage matrix comprises 192 storage cells, three of which, the cells 126, 140 and 145, are shown in FIG. 11. The 192 cells are all interconnected in well known manner and in accordance with the pattern shown in FIG. 11 to provide for the shift sequence shown in FIG. 6. In addition to the shift control circuitry interconnecting all 192 cells, the thirty-seven cells A–JJ of FIG. 7 are connected through output lines to succeeding portions of the system by means of which the identification procedures are implemented. While in FIG. 11 the outputs are labeled IM1,1, etc., the succeeding portions of the system will be considered by reference to the zero cell of FIG. 7 with the lines being labeled O, A, B, . . . HH, II, JJ to correspond with the cell locations in FIG. 7.

Cells A–JJ of FIG. 7 comprise a process array. This is a gated section of the input matrix. It is the process array that supplies data inputs to the processing logic. The process array is thus a gating array that presents the processing inputs to the vector derivation logic. A border forcing logic generates inhibit terms to the process array to simulate edge effects in the original character, i.e., to force certain of the cells to provide white condition signals. Except for such forced white conditions, however, the process array directly reflects the conditions in input matrix 20 of FIG. 1.

FIG. 12

Figure 12:
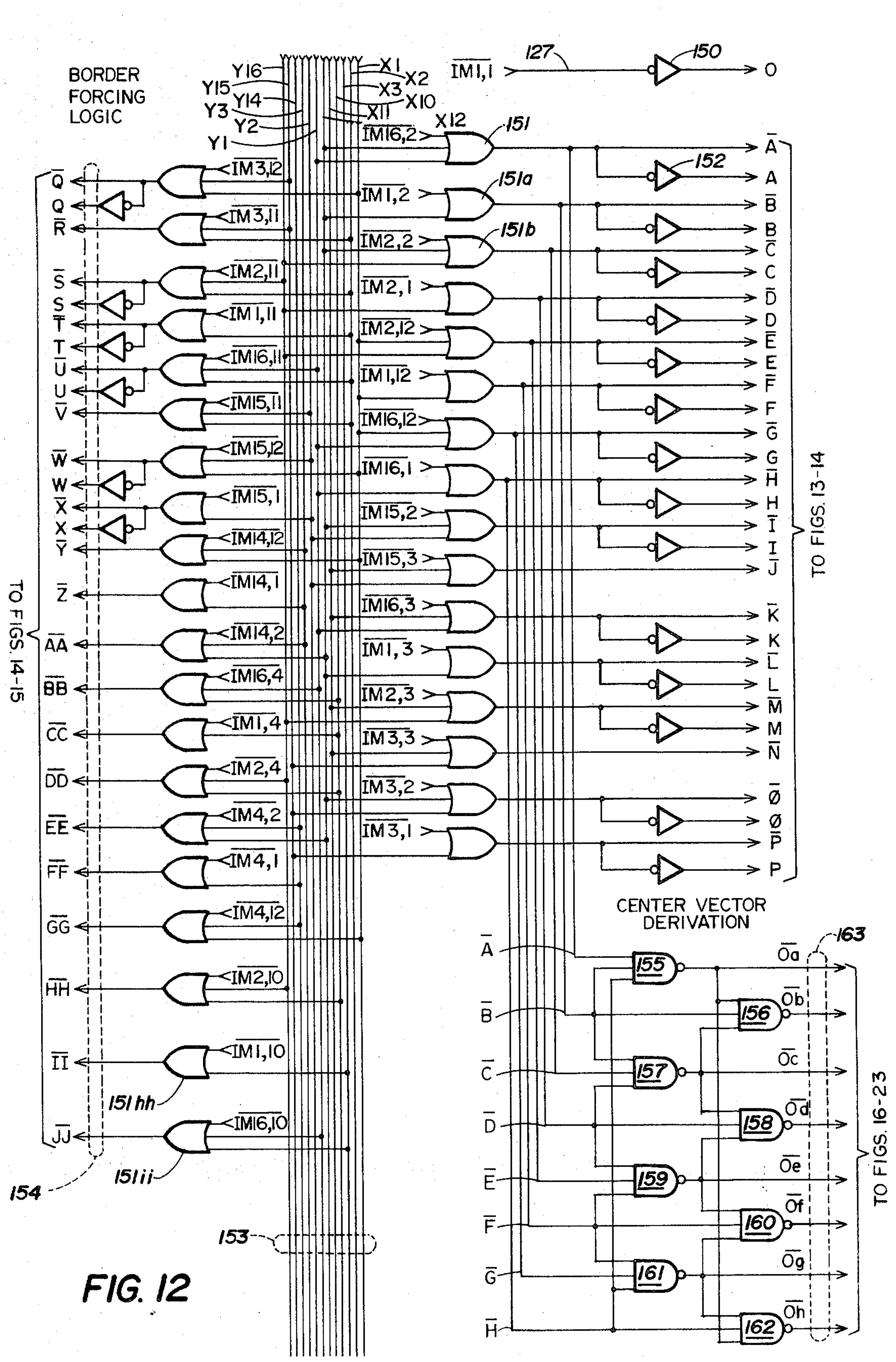
FIG. 12 illustrates border forcing logic and center cell vector generation.

The circuit of FIG. 12 is a border forcing logic and center vector generator.

As shown in FIG. 12, the false output lines from matrix 20 in FIG. 1 are connected by way of OR gates to output terminals labeled to conform with the cell location correspondingly labeled in FIG. 7. More particularly, the outputs from FIG. 11 are ORed with selected outputs from the X counter and Y counter. Counter X will cycle on twelve counts and counter Y will cycle on sixteen counts to proceed through the shift sequences of FIG. 6. Only a limited number of counter outputs are required for sampling the thirty-seven cells needed in FIG. 7 for vector derivation. As shown in FIG. 12, counter outputs X1, X2, X3, X10, X11, X12, Y1, Y2, Y3, Y14, Y15, Y16 are employed.

It performs a logic function that forces white data zones in the process array to reflect the "in-process" location of an artificial three cell white border around the input matrix 20. The purpose of forcing such a border is to isolate top from bottom and left from right data during the character processing operation. Border forcing is performed by observing the center cell XY location data and determining when the center cell is within three cells of any edge of the input matrix 20. When an edge condition exists, a certain section of the process array is forced white.

By utilizing the circuit connections shown in FIG. 12, the border forcing function is accomplished.

In FIG. 12, it will be noted that line 127, on which the signal $\overline{\mathbf{IM1,1}}$ from flip-flop 126 appears, is connected through an inverter 150 to output terminal 0. Similarly, the output line $\overline{\mathbf{IM16,2}}$ is connected to an OR gate 151 along with the X counter bus X12 and Y counter bus Y1. Thus, if any one of the three conditions $\overline{\mathbf{IM16,2}}$, X12 or Y1 occurs, then the output from the OR gate 151 is true. An inverter 152 provides an output which is the complement of the output of OR gate 151. The two outputs from OR gate 151 are labeled $\overline{A}$ and A. In a similar manner, OR gates 151*a*–151*ii* are employed with the connections from the input matrix of FIG. 11 as indicated together with connections to the counter bus 153 as shown in FIG. 12 to provide the true and false output states labeled in the left and right hand borders, respectively. The circuit thus serves to provide output signals as produced from the processing array of FIG. 11 with the border forcing logic superimposed thereon.

As illustrated in FIG. 12, the signals $\overline{A}$–$\overline{H}$ are connected to a center vector logic circuit. More particularly, the signal $\overline{A}$ is connected to one input of a NAND gate 155 whose output appears on the line labeled $\overline{Oa}$. The signal $\overline{B}$ is connected to NAND gate 155, to a NAND gate 156 and to a NAND gate 157. The signal $\overline{C}$ is connected only to NAND gate 157. The signal $\overline{D}$ is connected to NAND gate 157, to NAND gate 158 and to NAND gate 159. The signal $\overline{E}$ is connected to NAND gate 159. The signal $\overline{F}$ is connected to NAND gate 159, to NAND gate 160 and to NAND gate 161. The signal $\overline{G}$ is connected to NAND gate 161. The signal $\overline{H}$ is connected 155 NAND gate 155, to NAND gate 161 and to NAND gate 162. The output of NAND gate 155 is connected to NAND gate 156 and to NAND gate 162. The output of NAND gate 157 is connected to NAND gates 156 and 158. The output of NAND gate 159 is connected to NAND gates 158 and 160. The output of NAND gate 160 is connected to NAND gates 160 and 162. Thus, there are produced on the eight output lines signals representative of the center vector. There will only be one of the lines 163 enabled in a true state at any one time. The output lines are labeled to represent the center vector or the 0 vector with the subscript indicating the particular character of the vevtor for the center cell. The logic employed to produce the output states on lines 163 is shown in the following table.

TABLE V $a = O\,\overline{A}\,\overline{B}\,\overline{H}$ $b = O\,\overline{B}\,\overline{a}\,\overline{c}$ $c = O\,\overline{B}\,\overline{C}\,\overline{D}$ $d = O\,\overline{D}\,\overline{e}\,\overline{c}$ $e = O\,\overline{D}\,\overline{E}\,\overline{F}$ $f = O\,\overline{F}\,\overline{e}\,\overline{g}$ $g = O\,\overline{F}\,\overline{G}\,\overline{H}$ $h = O\,\overline{H}\,\overline{g}\,\overline{a}$ Lower case denotes vectors. Complemented cells indicate white.

FIGS. 13, 14 AND 15

Figure 13:
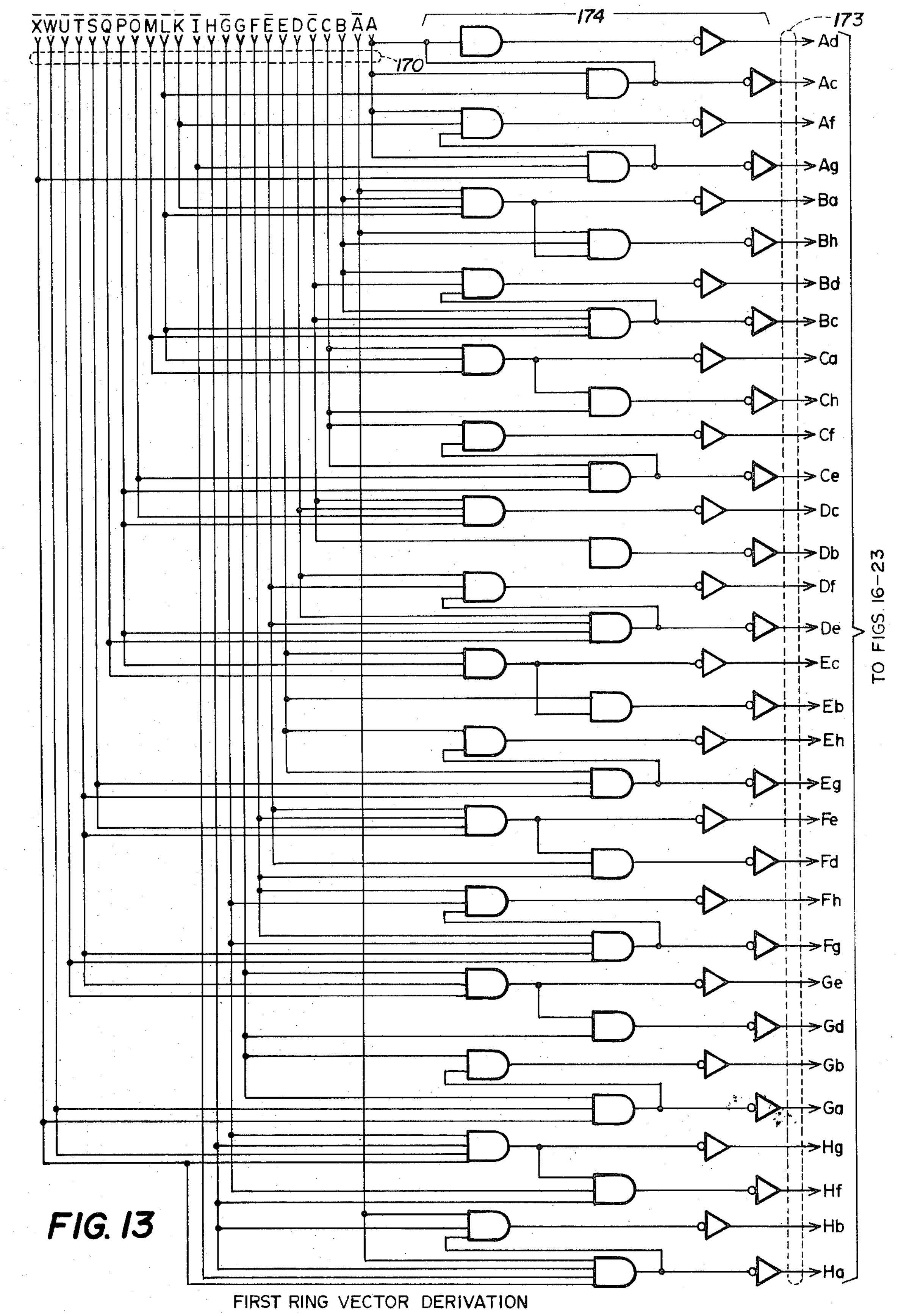
FIG. 13 illustrates circuitry for first ring vector derivation.
Figure 14:
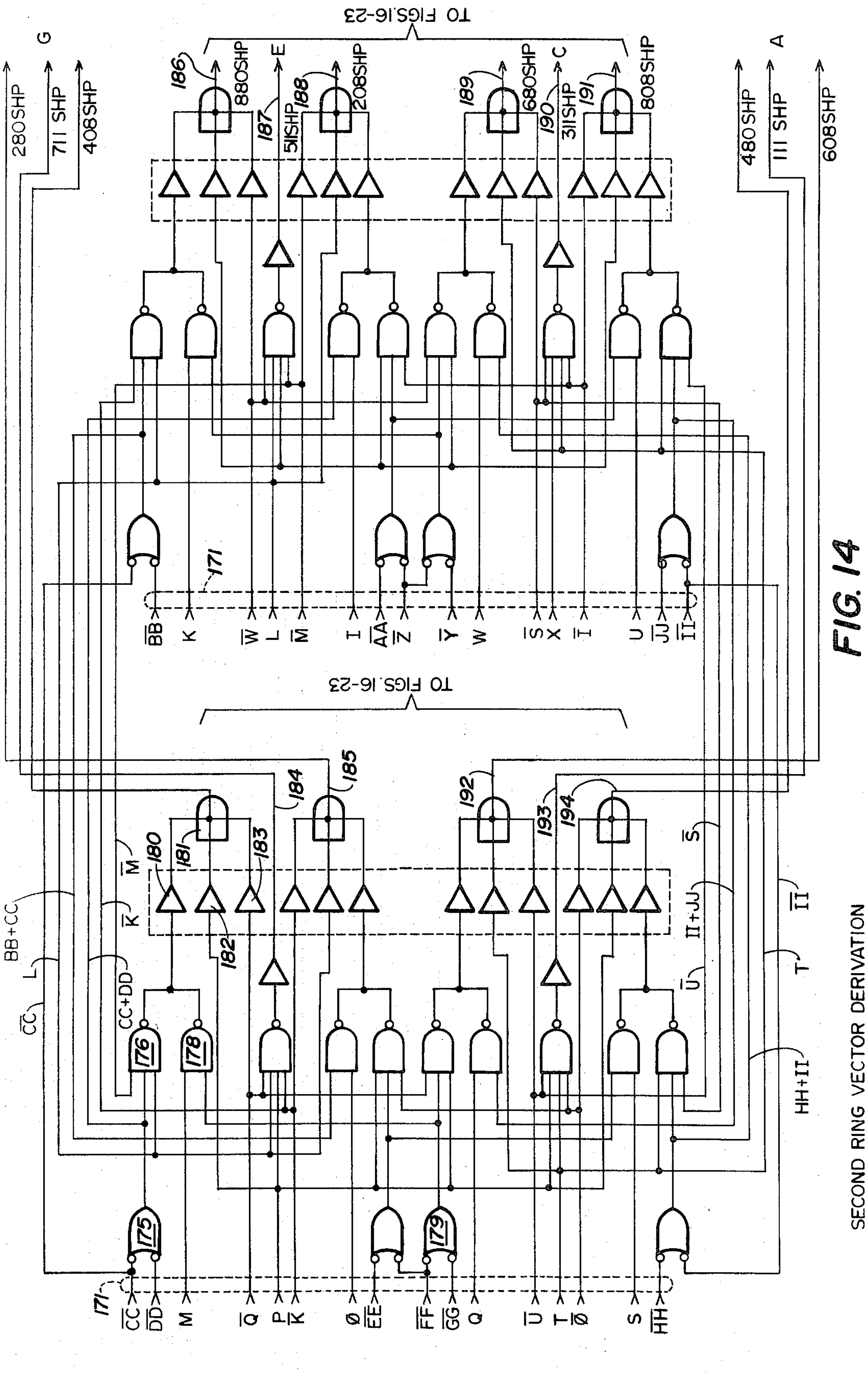
FIG. 14 illustrates circuit logic for second ring vector generation.

While the connections between the output lines 154 of FIG. 12 to the inputs in FIGS. 13 and 14 have not been shown, the corresponding signal bearing conductors have been labeled in FIG. 12 to correspond with the input lines 170 of FIG. 13 and 171 of FIG. 14. FIG. 13 serves to provide first ring vector derivation. That is, the input lines 170 leading from FIG. 12 are connected through suitable logic to produce on output lines 173 indications, in accordance with the table of FIG. 8, of the changes in direction of character edges in the region adjacent to the 0 cell. The output signals on channels 173 represent incremental direction changes adjacent to the center vector. The logic system 174 of FIG. 13 serves to produce the signals labeled at the right hand border of FIG. 13 in accordance with the logic equation set forth in Table VI.

TABLE VI $Ac = A\,\overline{B}\,\overline{L}\,\overline{K}$
$Ad = A\,\overline{B}\,(L+K)$
$Af = A\,\overline{H}\,(X+I)$
$Ag = A\,\overline{H}\,\overline{X}\,\overline{I}$ $Ba = B\,\overline{A}\,\overline{L}\,\overline{K}$
$Bc = B\,\overline{C}\,\overline{L}\,\overline{M}$
$Bd = B\,\overline{C}\,(L+M)$
$Bh = B\,\overline{A}\,(L+K)$ $Ca = C\,\overline{B}\,\overline{L}\,\overline{M}$
$Ce = C\,\overline{D}\,\overline{P}\,\overline{0}$
$CF = C\,\overline{D}\,(P+0)$
$Ch = C\,\overline{B}\,(L+M)$ $Db = D\,\overline{C}\,(P+0)$
$Dc = D\,\overline{C}\,\overline{P}\,0$
$De = D\,\overline{E}\,\overline{P}\,\overline{Q}$
$Ef = D\,\overline{E}\,(P+Q)$ $Eb = E\,\overline{D}\,(P+Q)$
$Ec = E\,\overline{D}\,\overline{P}\,\overline{Q}$
$Eg = E\,\overline{F}\,\overline{T}\,\overline{S}$
$Eh = E\,\overline{F}\,(T+S)$ $Fd = F\,\overline{E}\,(T+S)$
$Fe = F\,\overline{E}\,\overline{T}\,\overline{S}$
$Fg = F\,\overline{G}\,\overline{T}\,\overline{U}$
$Fh = F\,\overline{G}\,(T+U)$ $Ga = G\,\overline{H}\,\overline{X}\,\overline{W}$
$GB = G\,\overline{H}\,(X+W)$
$Gd = G\,\overline{F}\,(T+U)$
$Ge = G\,\overline{F}\,\overline{T}\,\overline{U}$ $Ha = H\,\overline{A}\,\overline{X}\,\overline{I}$
$Hb = H\,\overline{A}\,(X+I)$
$Hf = H\,\overline{G}\,(X+W)$
$Hs = H\,\overline{G}\,\overline{X}\,\overline{W}$ The discussion of vector combinations and curvature derivation should illustrate the reason for not requiring a definition of the other first ring vector possibilities.

It will be recognized from an inspection of FIG. 2 that there are other vector possibilities existing. However, only those vectors are generated which can connect to the end of one of the eight center vectors. Thus, there are thirty-two first ring vector signals supplied by the logic of FIG. 13.

In addition to the first ring vector derivation provided by the logic of FIG. 13, the output lines from FIG. 12 are connected to the input lines 171 of FIG. 14 to provide twelve output sharpness signals. The circuit of FIG. 14 serves to provide twelve vectors which can be added to certain of the three vector combinations to provide five vector sets which will serve to indicate sharpness for certain selected conditions. These are the conditions referred to above in connection with FIG. 9.

As shown in FIG. 14, the lines $\overline{CC}$ and $\overline{DD}$ are connected through negations to an OR gate 175. The output of OR gate 175 is connected to NAND gate 176. The output signal M is connected to NAND gate 178. The signals $\overline{FF}$ and $\overline{GG}$ are connected through negations to OR gate 179 whose output is connected to NAND gate 178. The outputs of NAND gates 176 and 178 are connected through an inverter 180 to one input of an AND gate 181. A second input of AND gate 181 is supplied by the input P through an inverter 182. The third input of AND gate 181 is supplied by $\overline{Q}$ through inverter 183. The output of the AND gate 181 is the vector 408 SHP.

FIG. 14 thus includes the logic necessary for indicating the presence of the combination of vectors indicated in FIG. 9 as 408–01, 408–00, 408–90 or 408–80. In a similar manner, the vectors 711 SHP, 280 SHP, 880 SHP, 511 SHP, 208 SHP, 680 SHP, 311 SHP and 808 SHP, 608 SHP, 111 SHP and 480 SHP are produced by the logic circuitry leading to lines 184–194, respectively. Each of the input states has been labeled on the input lines 171 and the appropriate logic connections are shown so that the twelve output sharpness indicating signals are thus present. Note that there are three sharpness vectors for each of the four quadrants A, C, E and G.

FIG. 15

For the circuit thus far described and with particular reference to the output signals from the border forcing circuit of FIG. 12, the center vector generator also shown in FIG. 12, the first ring vector derivation circuit of FIG. 13 and the second ring vector derivation circuit of FIG. 14, there are essentially four different sets of output signals available for use by the curvature derivation circuit and the feature accumulators. However, before describing how the four sets of signals are utilized in the succeeding portion of the circuit, it should be noted that there is an additional set of signals which are required. These are the signals generated by the vector sequencer circuit of FIG. 15. This circuit is used to determine which vectors exist in the center cell 0.

Figure 15:
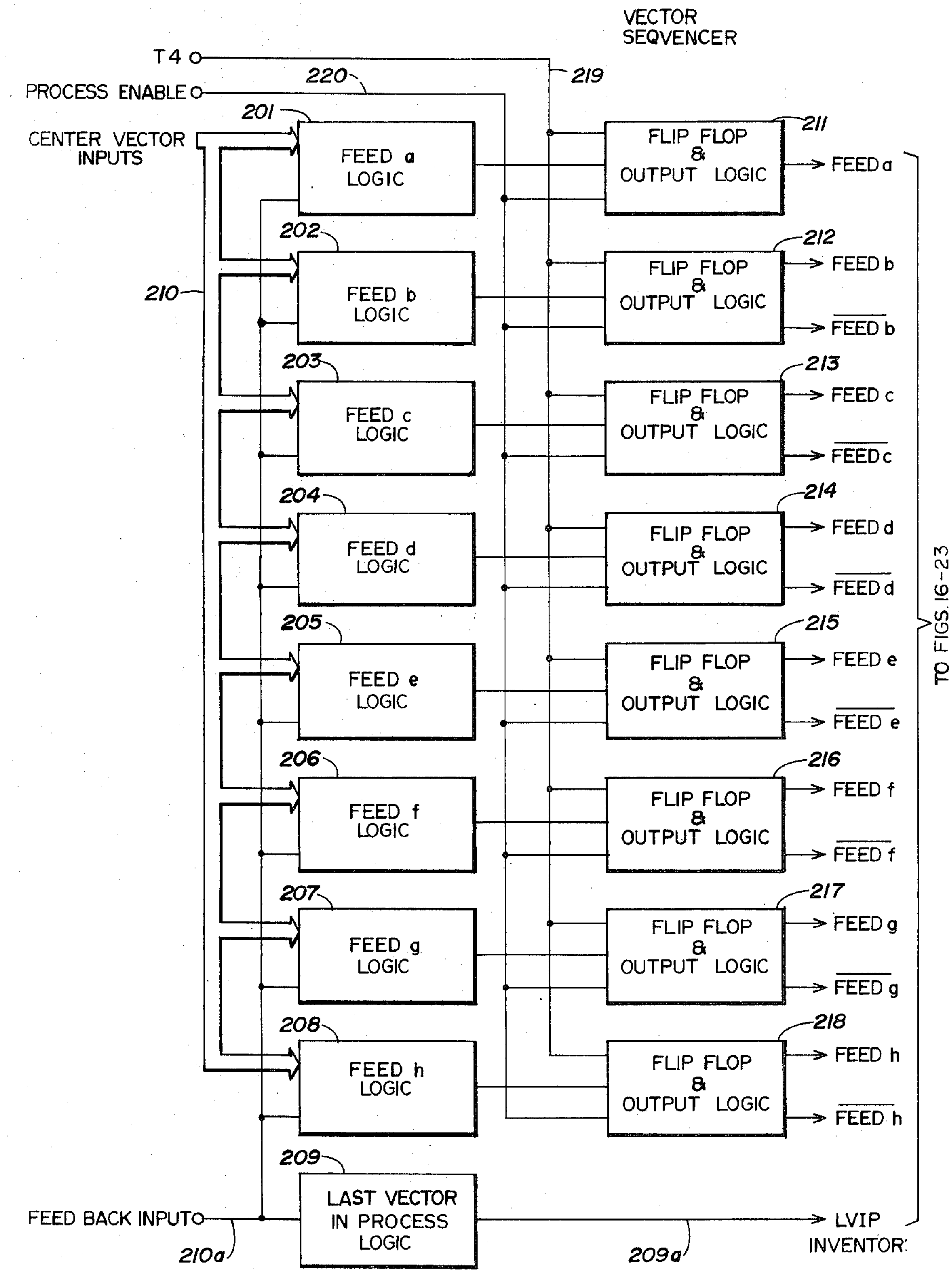
FIG. 15 illustrates vector sequence control logic.

The system of FIG. 15 includes eight separate feed logic circuits 201–208. Circuit 201 is labeled "feed a logic" and is connected at its output to a flip-flop and output logic circuit 211. The center vector inputs are connected to all of the logic units 201–208 in parallel by way of a bus 210. A feedback bus 210a is also provided for utilization of a particular feedback input. A "last vector in process" logic unit 209 provides a signal on line 209*a* which will be utilized as described hereinafter.

A clock pulse T4 is applied to each of the units 211–218 by way of a bus 219. A signal $\overline{\text{PROCESS ENABLE}}$ is similarly applied to units 211-218 by way of a bus 220. The output signals FEED $a$ – $\overline{\text{FEED}}$ h are thus provided at the output of the circuit of FIG. 15.

The vector sequencing circuit of FIG. 15 is necessary because in a given black/white pattern existing in the process array, as many as four center vectors may be present. It is important that each of the center vectors be processed and that each vector should singly contribute to an accumulative feature derivation process later to be described. If this condition is not met, valuable information about the character will be lost, with a detremental effect on the recognition capability of the system.

The vector sequencer of FIG. 15 is a logic system used to implement this processing condition. The vector sequencer sequentially enables the center vectors according to the priority ranking: $a, b, c, d, e, f, g$, and $h$. The resultant vector enabling signals are denoted feed $a$, feed $b$, etc., which are the true output of eight flip-flops. The steering of each flip-flop is dependent upon the existing center vectors and the states of the vector sequencer. The vector sequencer generates a shift control signal, a last vector in process signal (LVIP), that indicates that a given center cell processing operation is completed and that an input matrix shift operation should occur.

The circuit serves to step through the vectors sequentially, staring with vector $a$ and ending with vector $h$. When the last vector has been processed, the LVIP signal is generated and the new information from the next cell is entered. At the beginning of the process all of the flip-flops will be set to a logic 0 and when enabled by clock pulse T4, the flip-flops change state in response to outputs from units 201–208. The FEED LOGIC is composed of AND and OR gates arranged to operate in accordance with appropriate logic equations (Table VII).

For this reason the details of the logic of FIG. 15 have not been shown since they may readily be formed by reference to the equations of Table VII.

TABLE VII

1. $\text{feed } a = \text{T4} \cdot \text{PE } [a \cdot (\overline{\text{feed } d}) \cdot (\overline{\text{feed } f}) \cdot (\overline{\text{feed } h})]$
2. $\text{feed } b = \text{T4} \cdot \text{PE } [(a+b) \cdot (\overline{\text{feed } d}) \cdot (\overline{\text{feed } f}) \cdot (\overline{\text{feed } h})]$
3. $\text{feed } c = \text{T4} \cdot \text{PE } [(\text{feed } b) \cdot (c) + (\overline{a+b}) \cdot (\overline{\text{feed } f}) \cdot (\text{feed } h) \cdot (c)]$
4. $\text{feed } d = \text{T4} \cdot \text{PE } [(c+d)\ (\text{feed } b) + (c+d) \cdot (\overline{a+b}) \cdot (\overline{\text{feed } f}) \cdot (\overline{\text{feed } h})]$
5. $\text{feed } e = \text{T4} \cdot \text{PE } [(e) \cdot (\text{feed } d) + (e) \cdot (\overline{c+d}) \cdot (\text{feed } b) + (e) \cdot (\overline{c+d}) \cdot (\overline{a+b}) \cdot \overline{\text{feed } h}]$
6. $\text{feed } f = \text{T4} \cdot \text{PE } [(e+f) \cdot (\text{feed } d) + (e+f) \cdot (\overline{c+d}) \cdot (\text{feed } b) + (e+f) \cdot (\overline{c+d}) \cdot (a+b)\ (\overline{\text{feed } h})]$
7. $\text{feed } g = \text{T4} \cdot \text{PE } [g \cdot (\text{feed } f) + g \cdot (\overline{e+f})\ (\text{feed } d) + g \cdot (\overline{e+f}) \cdot (\overline{c+d}) \cdot \text{feed } b + g \cdot (\overline{e+f}) \cdot (\overline{c+d})\ (\overline{a+b})]$
8. $\text{feed } h = T4 \cdot \text{PE } [(g+h) \cdot (\text{feed } f) + (\overline{g+h}) \cdot (\overline{e+f}) \cdot (\text{feed } d) + (g+h) \cdot (e+f) \cdot (\overline{c+d}) \cdot \text{feed } b + (g+h) \cdot (\overline{e+f}) \cdot (\overline{c+d}) \cdot (\overline{a+b})]$
9. $\text{LVIP} = \text{PE } [(\text{feed } h) + (\text{feed } f)\ (\overline{g+h}) + (\text{feed } d) \cdot (\overline{g+h}) \cdot (e+f) + (\text{feed } b)\ (\overline{g+h}) \cdot (\overline{e+f}) \cdot (\overline{c+d})]$ In Table VII, T4 in the equations indicates that the "feed $x$" flip-flop is set by the transition of T4 after the other logic conditions are established. In each instance, the "feed $x$" signal is reset by the next T4 clock pulse.

Further, feed $b$ is set with feed $a$; feed $d$ is set with feed $c$; feed $f$ is set with feed $e$; and feed $h$ is set with feed *g*. This is a logic simplification permissible because the center vector definitions do not allow the simultaneous occurrence of these vector pairs. For example, vector b requires that vector a be absent. This reduces the required sequencing by a factor of two.

The execution of the equations of Table VII are further illustrated and will be understood from an inspection of the relationships set forth in Table VIII. The symbol, *tn*, refers to the value of each flip-flop output during any given clock pulse. The symbol, *tn*+1, indicates what the flip-flop output will be for the next clock pulse.

TABLE VIII

| Clock pulses | | 1 | 2 | 3 | 4 |
|---|---|---|---|---|---|
| Logic signals: | | | | | |
| Oa | | 1 | 1 | 1 | 1 |
| Ob | | 0 | 0 | 0 | 0 |
| Oc | | 1 | 1 | 1 | 1 |
| Od | | 0 | 0 | 0 | 0 |
| Oe | | 1 | 1 | 1 | 1 |
| Of | | 0 | 0 | 0 | 0 |
| Og | | 0 | 0 | 0 | 0 |
| Oh | | 0 | 0 | 0 | 0 |
| a+b | | 1 | 1 | 1 | 1 |
| $\overline{a+b}$ | | 0 | 0 | 0 | 0 |
| c+d | | 1 | 1 | 1 | 1 |
| $\overline{c+d}$ | | 0 | 0 | 0 | 0 |
| e+f | | 1 | 1 | 1 | 1 |
| $\overline{e+f}$ | | 0 | 0 | 0 | 0 |
| g+h | | 0 | 0 | 0 | 0 |
| $\overline{g+h}$ | | 1 | 1 | 1 | 1 |
| Flip-flop output: | | | | | |
| Feed a | tn | 0 | 1 | 0 | 0 |
| | tn+1 | 1 | 0 | 0 | 0 |
| Feed b | tn | 0 | 1 | 0 | 0 |
| | tn+1 | 1 | 0 | 0 | 0 |
| Feed c | tn | 0 | 0 | 1 | 0 |
| | tn+1 | 0 | 1 | 0 | 0 |
| Feed d | tn | 0 | 0 | 1 | 0 |
| | tn+1 | 0 | 1 | 0 | 0 |
| Feed e | tn | 0 | 0 | 0 | 1 |
| | tn+1 | 0 | 0 | 1 | 0 |
| Feed f | tn | 0 | 0 | 0 | 1 |
| | tn+1 | 0 | 0 | 1 | 0 |
| Feed g | tn | 0 | 0 | 0 | 0 |
| | tn+1 | 0 | 0 | 0 | 0 |
| Feed h | tn | 0 | 0 | 0 | 0 |
| | tn+1 | 0 | 0 | 0 | 0 |
| LVIP | tn | 0 | 0 | 0 | 0 |
| | tn+1 | 0 | 0 | 0 | 1 |

The conditions indicated in Table VIII are so set to represent those conditions where three center cell vectors exist simultaneously for each of the A, C and E vector directions.

FIGS. 16–23

The circuits of FIGS. 16–23 are curvature derivation circuits. They produce output signals to indicate the presence in each of the nine zones of curvatures, orthogonal or sloping lines shown in FIG. 10.

More particularly, output signals from the circuits of FIGS. 12–15 are applied as input signals to the logic circuits of FIGS. 16–23. In response thereto, signals will be generated at the outputs of the respective FIGS. 16–23 to represent the presence of any of the 164 curves shown in the table of FIG. 8. In addition, the circuits of FIGS. 16–23 produce twelve output signals, representative of the existence of sharpness, i.e., $\overline{\text{C408-S}}$, FIG. 16. The sharpness signals are produced in response to utilization of the twelve output signals from the circuit of FIG. 14, i.e. 408SHP, FIG. 16.

Figures 16, 17:
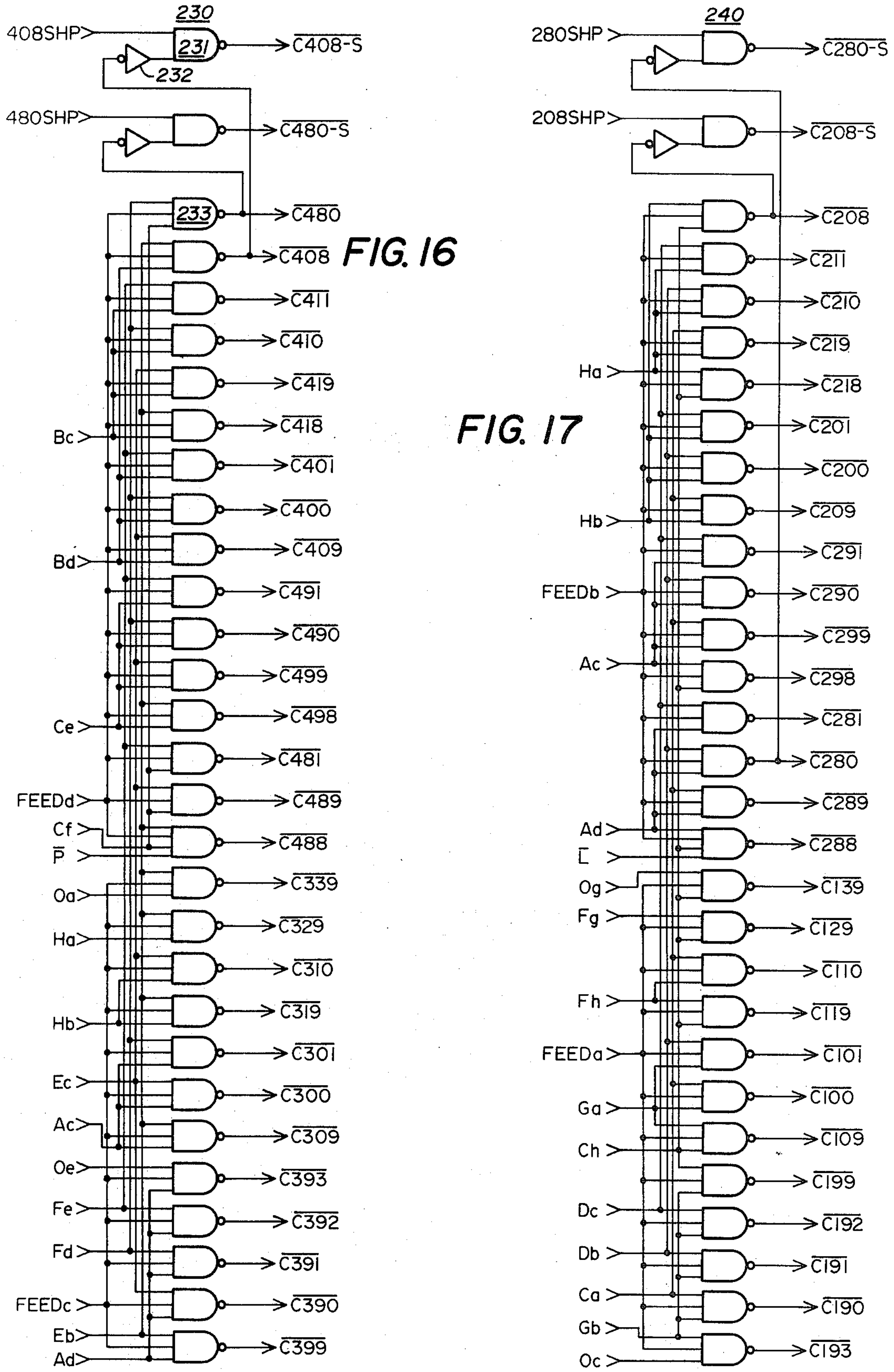
FIGS. 16–23 illustrate circuit logic for generation of curvature and sharpness signals.

The logic circuit of FIG. 16 comprises a bank 230 of thirty NAND gates which are provided to produce a like number of outputs each of which is appropriately labeled. The output signals are each identified by the prefix "C." Absence of a one state on any output line represents the presence of one of the curves in FIG. 8 except that absence of a one state on the first two outputs $\overline{\text{C408-S}}$ or $\overline{\text{C480-S}}$ indicates the existence of a sharpness in curves 408 and 480 respectively.

It will be noted that NAND gate 231 is supplied at one input with the signal 408SHP from FIG. 14. The second input to NAND gate 231 is supplied by way of an inverter 232. Inverter 232 is connected to the output of NAND gate 233. NAND gate 233 has three inputs, i.e.: FEED *d*, signal E*b*, and signal B*d*. With these inputs, the signal $\overline{\text{C408-S}}$ is produced.

In a similar manner, the remaining outputs are produced. The input signals and connections to the various ones of the bank of NAND gates required to produce the labeled outputs are as illustrated in FIG. 16. Note that FEED *d* and FEED *c* signals from FIG. 15 are utilized in FIG. 16.

In FIG. 17 a bank 240 of thirty NAND gates are employed being responsive to signals including FEED b and FEED a and the other input signals noted thereon to produce the labeled output signals.

Figures 18, 19:
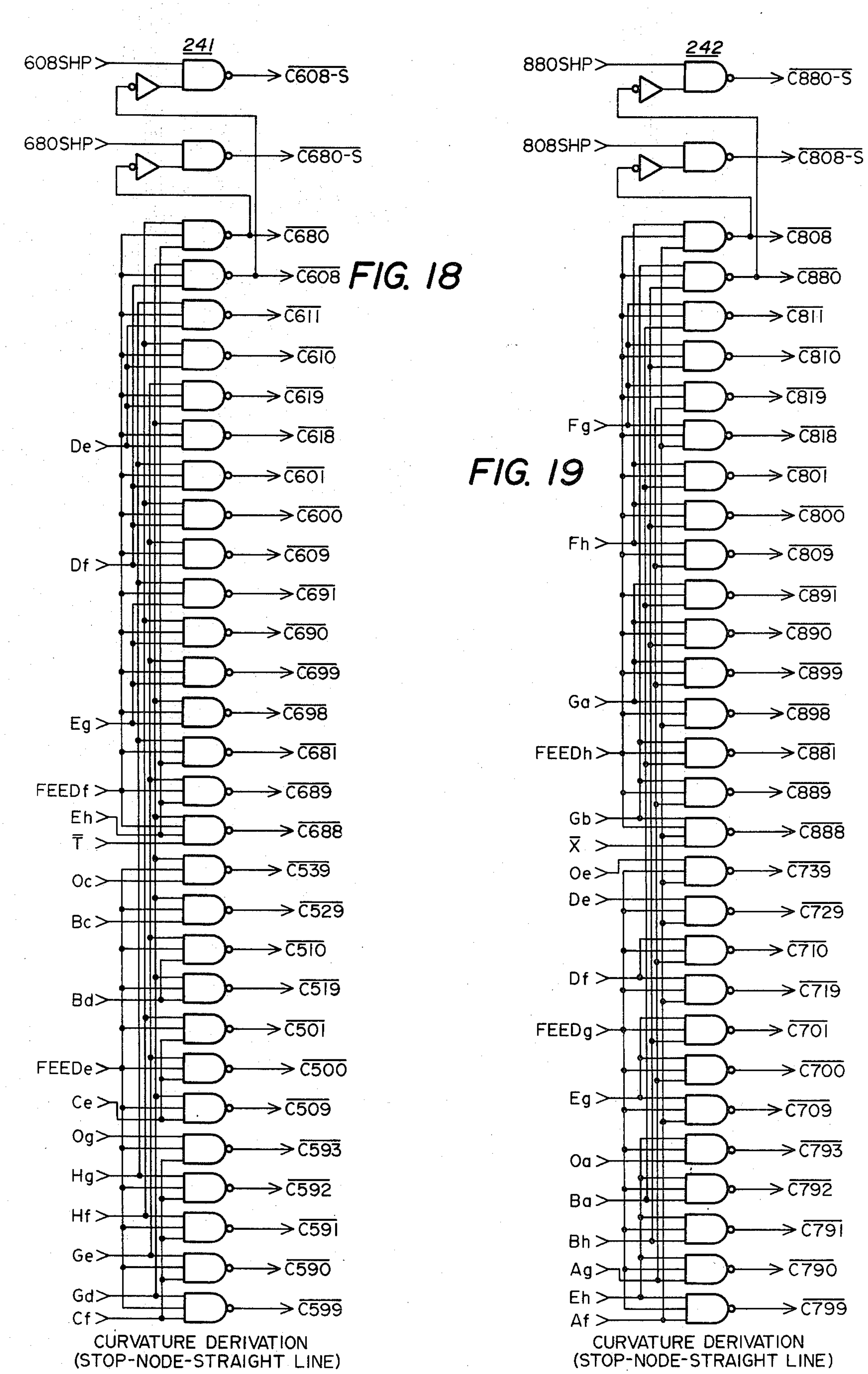

In FIG. 18 bank 241 of thirty NAND gates and in FIG. 19 bank 242 of thirty NAND gates are similarly employed to be responsive to FEED *f*, FEED *e* and FEED *h*, FEED *g* signals, respectively.

Figure 20:
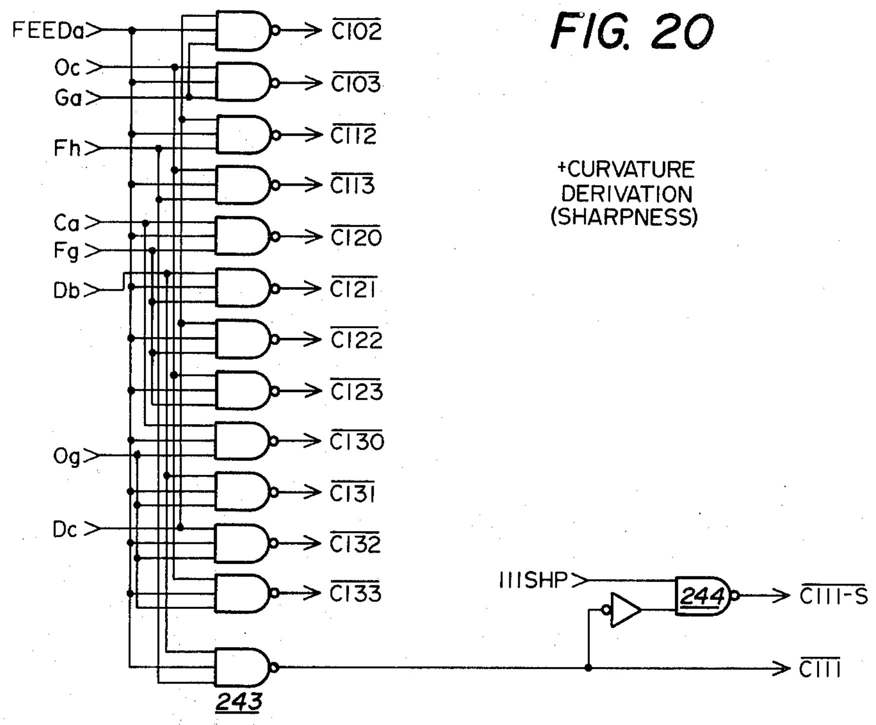
Figure 21:
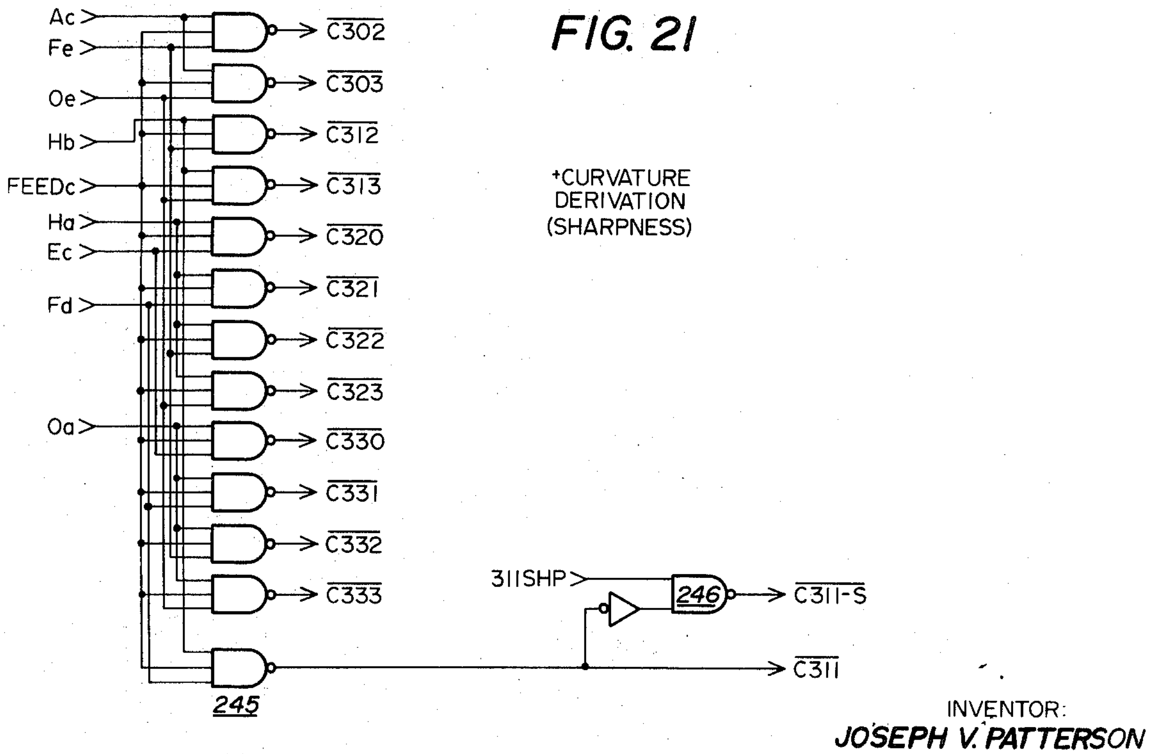

In FIG. 20 a bank 243 of thirteen NAND gates are employed to generate output signals in response to FEED a and an additional sharpness signal 111SHP through the use of NAND gate 244. Similarly, in FIG. 21 bank 245 of thirteen NAND gates plus NAND gate 246 are employed as to be responsive to FEED *c*, sharpness signal 311SHP and associated signals.

Figure 22:
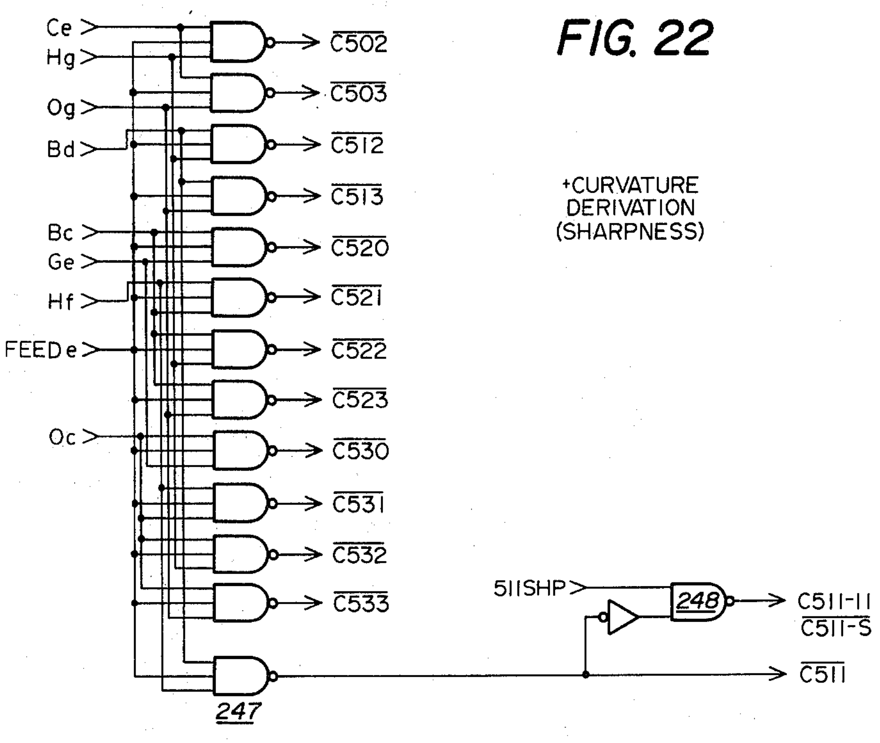
Figure 23:
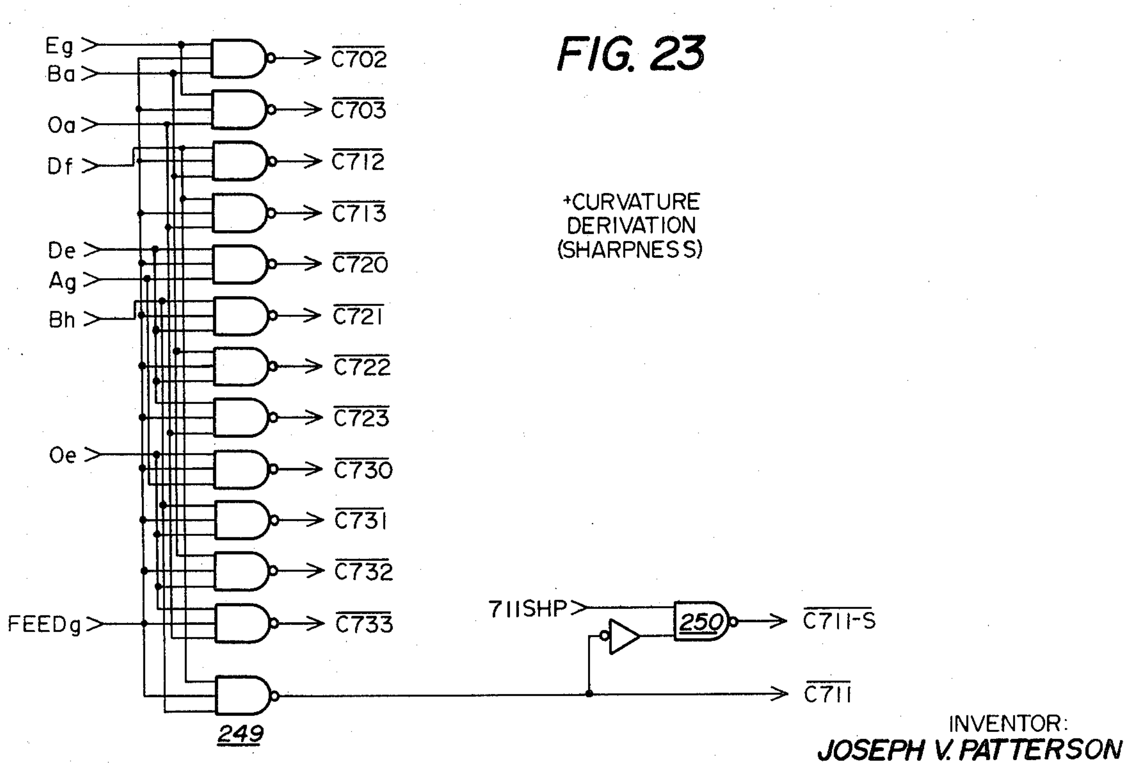

In FIG. 22 bank 247 of thirteen NAND gates plus NAND gate 248 are employed to be responsive to FEED *e* signal, sharpness signal 511SHP and associated signals. In FIG. 23 bank 249 of thirteen NAND gates plus NAND gate 250 are employed as to be responsive to FEED *g* signals, sharpness signal 711SHP and associated signals.

FIGS. 24–28

The signal outputs from the circuits of FIGS. 16–23 are employed by a set of accumulators. The accumulators comprise the circuits shown in FIGS. 24–28.

Figure 24:
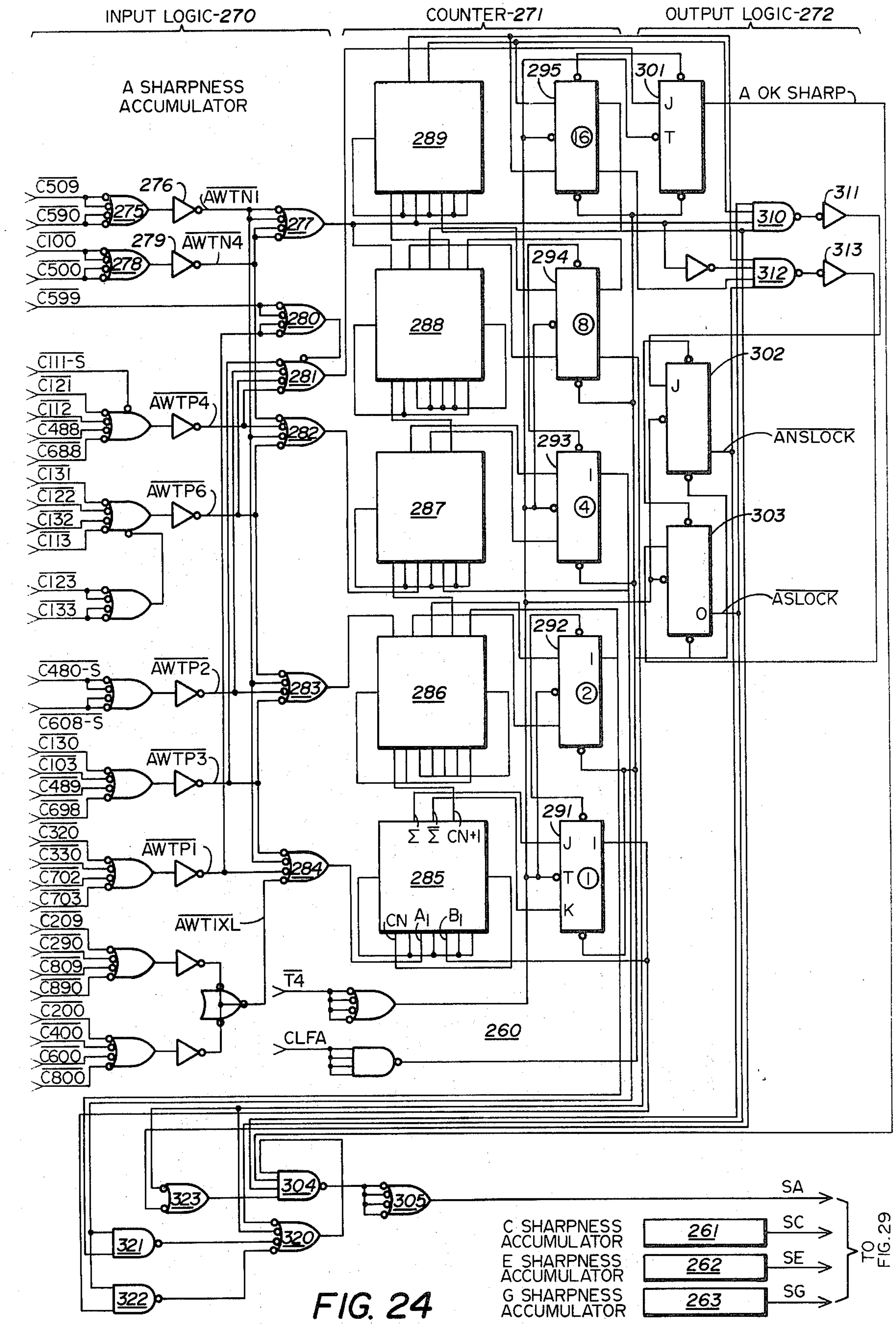
FIG. 24 illustrates sharpness accumulators for each of four quadrants in a given zone of the retina.

FIG. 24 shows in detail one of four sharpness accumulators employed in the system, i.e.: A sharpness accumulator 260. The C, E and G sharpness accumulators 261, 262 and 263 are shown in block form only in FIG. 24, their construction being identical with that of the A sharpness accumulator 260 but with different inputs which will be detailed in connection with a table hereinafter set forth.

Figures 25, 25A:
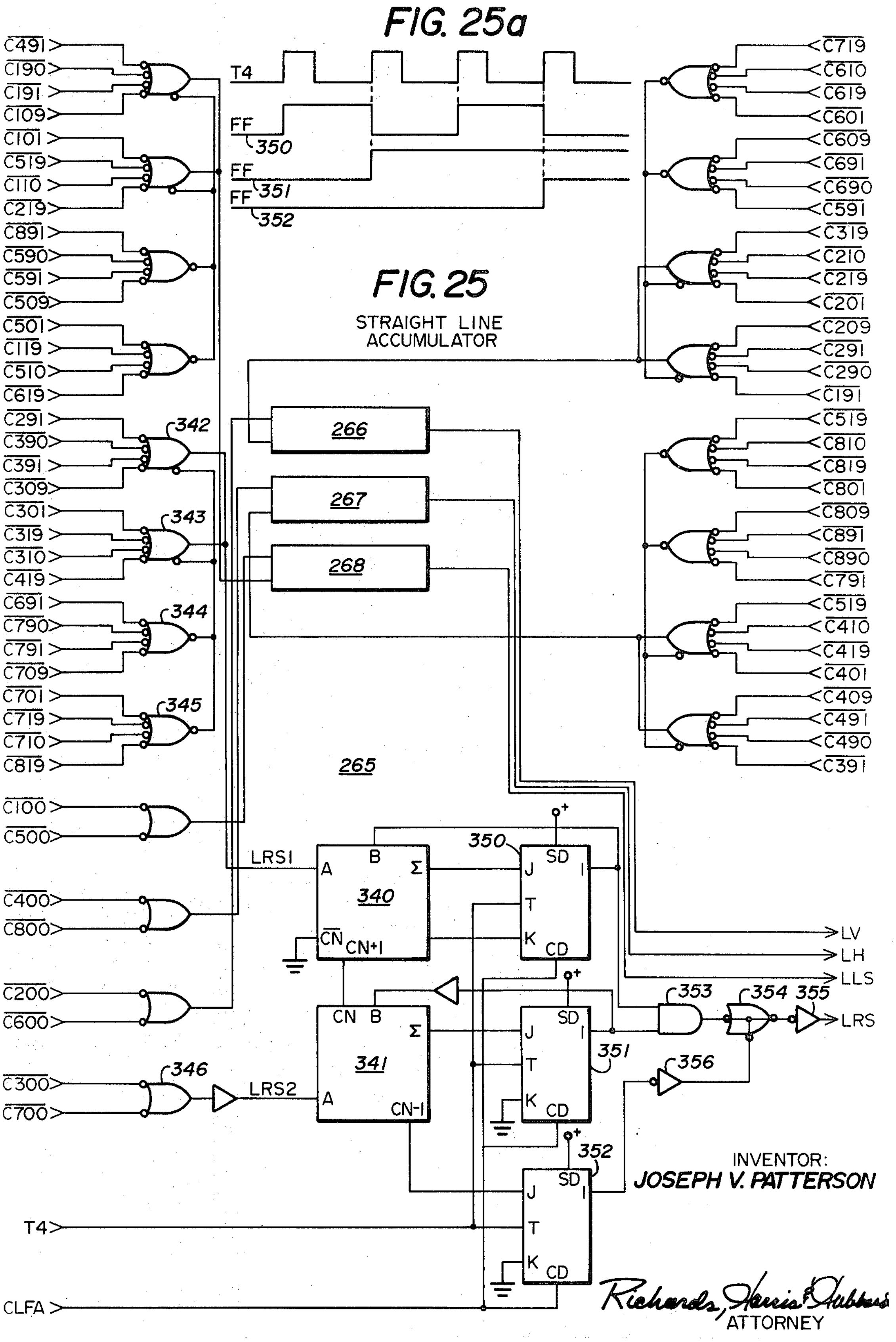
FIG. 25 illustrates straight 2 accumulators for each of the four zone quandrants.
FIG. 25*a* illustrates a timing sequence employed in the straight line accumulators.

FIG. 25 illustrates in detail a straight line accumulator 265 with fan-in logic leading thereto. The detailed circuit 265 relates to generation of a signal representing the presence of a line having a right slope (LRS).

Shown in block form are the circuits 266, 267, and 268 for generating signals representative of the presence of a line-vertical (LV), a line-horizontal (LH), and a line-left sloping (LLS) respectively. All of the input signals necessary for the generation of the four output signals from the circuit of FIG. 25 are labeled at the left margin of FIG. 25.

Figure 26:
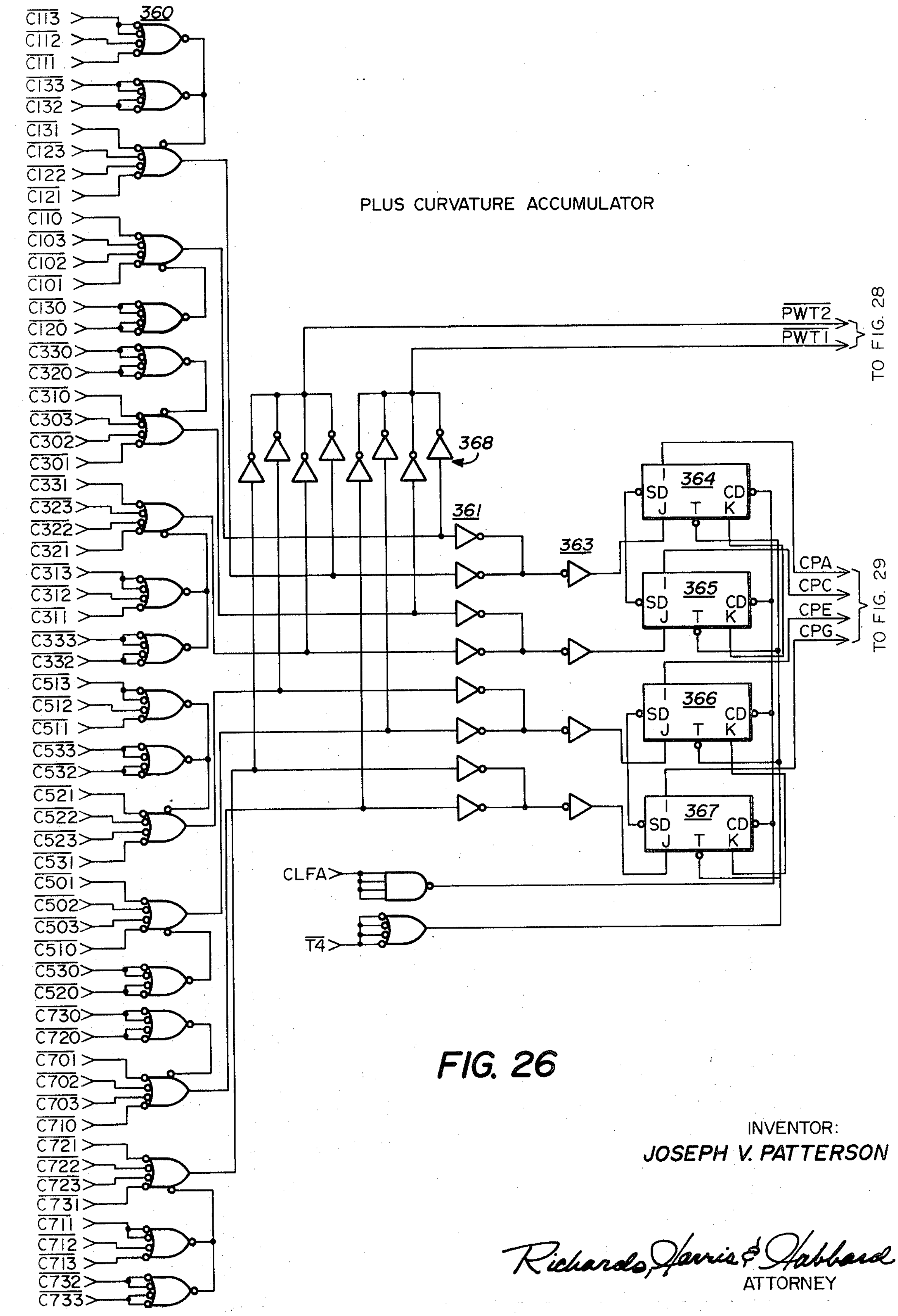
FIG. 26 illustrates plus curvature accumulators for each of the four quadrants.

FIG. 26 illustrates a plus curvature accumulator circuit. The circuit produces four output signals, curvature positive in zone A (CPA), curve positive in zone C (CPC), curvature positive in zone E (CPE), and curve positive in zone g (CPG). In addition, two weighting signals $\overline{PWT1}$ and $\overline{PWT2}$ are produced.

Figure 27:
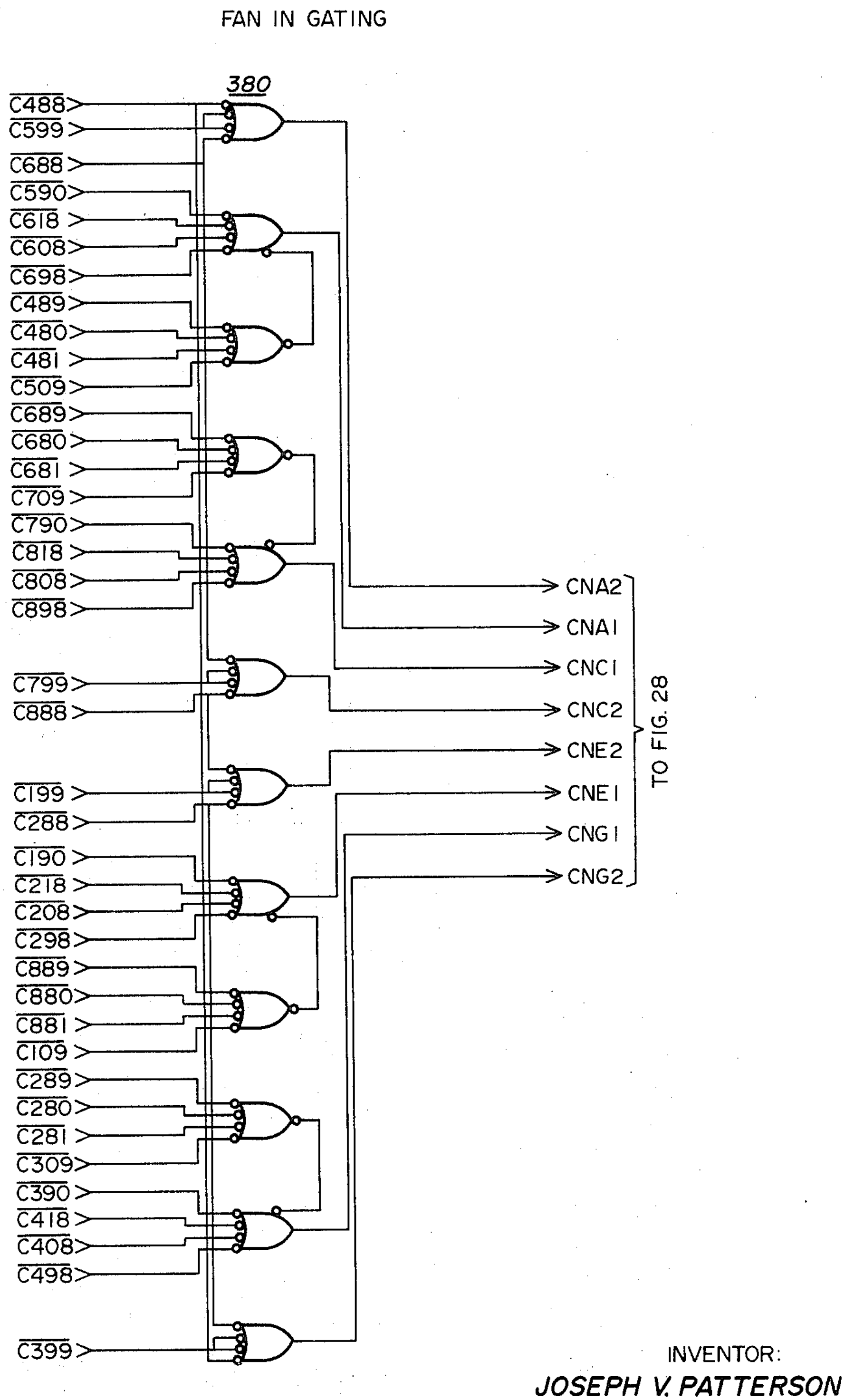
FIG. 27 illustrates circuit logic for fan-in gating leading to negative curve, stop and node accumulators.
Figure 28:
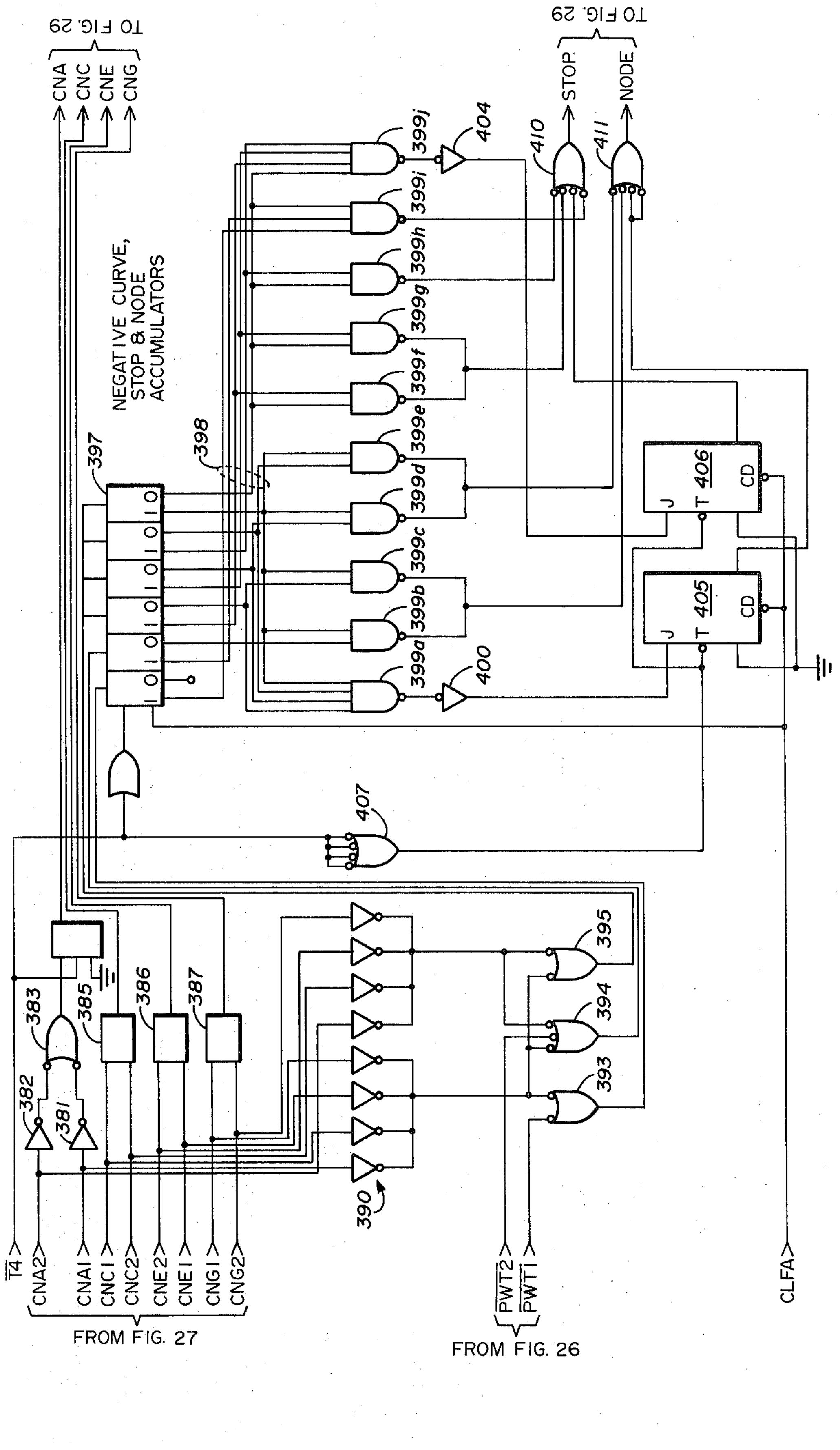
FIG. 28 illustrates accumulator logic employed in generating negative curve, stop, and node signals.

FIG. 27 illustrates fan-in gating logic for the negative curve, STOP and NODE accumulators of FIG. 28.

FIG. 24

In FIG. 24, the A sharpness accumulator 260 is comprised of three basic sections. There is an input logic section 270, a counter 271 and an output logic section 272.

In the input logic 270, signals are applied as inputs as labeled in the left margin. They are employed for generating signals representative of the weights to be accorded to particular curves that may have been encountered in a given boundary. More particularly, an OR gate 275 has as inputs the signals $\overline{C509}$ and $\overline{C590}$. From FIG. 8, it will be noted that both curves 509 and 590 are relatively gentle curves. Thus, with the presence of either of those curves there will be produced, at the output of inverter 276, a voltage state representative of a weight of one. This is signified by the legend AWTN1, meaning that there is a curved boundary in the A quadrant, that the curve is a negative curve so gentle that it should be accorded a weight of one. This signal is then applied through negation to OR gate 277. Voltage states representative of the presence of curves $\overline{C100}$ or $\overline{C500}$ are applied through negations to an OR gate 278 and thence by way of an inverter 279 and a negation to OR gate 277. The output of the inverter 279 will be true if either of curves 500 or 100 are present. However, from FIG. 8 it will be noted that both curves 500 and 100 tend to enhance sharpness more than 509 or 590. (Refer to text on pages 15 and 16 and to Table XIV, page 45.) The signal at the output of the inverter 279, therefore, is given a weight of four and is designated by the legend AWTN4. This legend means that there is a curve in the A quadrant. The curve is a negative curve having a weight of four, meaning that it is a fairly sharp curve.

In a similar manner, the presence or absence of other curves of varying sharpness are indicated by the logically developed signals applied to OR gates 281–284 and thence to the counter 271. The signals employed are identified by legends AWTN1, AWTN4, AWTP4, AWTP6, AWTP2, AWTP3, and AWTP1. The various signals from OR gates 277 and 280–284 are then applied to the counter unit in such a manner as to reflect the sign of the curve, positive or negative, and the respective weights of the curves encountered.

Counter 271 comprises five adders 285–289. The adders employed were of the type manufactured and sold by Texas Instruments Incorporated of Dallas, Texas, and identified as TI SN7480 Adder. The adder outputs are connected to five flip-flops 291–295. The adders 285–289 are single bit high speed binary full adders with gated complementary inputs, complementary sum outputs and inverted carry output.

Counter 271 receives the curve weight signals from the input logic 277, 280–284 and transfers the information to the output logic. A logic one will be fed to the A input of adder 285 when any curve with a weight of one or three is present in the input logic 270. A logic 1 is fed to the A input of adder 286 when any curve with a weight of two or three (3=2+1) and six (6=4+2) is present. The A input to each of the adders 287, 288 and 289 can similarly be determined from the connections made in the input logic. The negative weight signals from inverters 276 and 279 will subtract from the accumulative totals produced by the counter. A curve with a negative weight of 1 is fed to each N-bit binary adder to be subtracted, while a curve with a negative weight of 4 is fed only to adders 287, 288 and 289. The function of the input logic is to receive the curvature information, logically combine the signals by weight, and provide inputs to the counter which may then be added algebraically.

The output logic 272 receives the counter outputs. If the total output from the counter is above a threshold, an A sharpness signal (SA) is generated. The counter 271 allows 16 positive curves plus one negative curve to occur with each clock pulse T4. The outputs of adder 285 are labeled Σ, $\bar{\Sigma}$ and CN+1. The inputs are A, B and CN. The adders 286–289 are identical. The adders operate according to the logic equations of Table IX.

TABLE IX $$\Sigma = (A\bar{B} + \bar{A}B)(\overline{CN}) + (AB + \overline{AB})(CN)$$

$$\bar{\Sigma} = (A\bar{B} + \bar{A}B)(CN) + (AB + \overline{AB})(\overline{CN})$$

$$\overline{CN+1} = \overline{AB + CN(A\bar{B} + \bar{A}B)}$$

The input-output conditions of adders 285–289 are set out in Table X.

TABLE X

| | INPUT | | | OUTPUT | | |
|---|---|---|---|---|---|---|
| | CN | A | B | Σ | $\bar{\Sigma}$ | $\overline{CN+1}$ |
| 285 | 0 | 1 | 0 | 1 | 0 | 1 |
| 286 | 1 | 1 | 1 | 1 | 0 | 0 |
| 287 | 0 | 0 | 0 | 0 | 1 | 1 |
| 288 | 1 | 1 | 1 | 1 | 0 | 0 |
| 289 | 0 | 0 | 0 | 0 | 1 | 1 |

The Σ and $\bar{\Sigma}$ signals feed J and K respectively for flip-flops 291, 293 and 295. The opposite Σ and $\bar{\Sigma}$ feed the J and K respectively for flip-flops 292 and 294. Only flip-flop 291 will transfer a 1 when the first clock pulse T4 occurs, indicating a cumulative total of 1. After the transfer of information occurs, the input-output conditions are as set out in Table XI.

TABLE XI

| | INPUT | | | OUPUT | | |
|---|---|---|---|---|---|---|
| | CN | A | B | Σ | $\bar{\Sigma}$ | $\overline{CN+1}$ |
| 285 | 0 | 1 | 1 | 0 | 1 | 0 |
| 286 | 0 | 1 | 1 | 0 | 1 | 0 |
| 287 | 0 | 0 | 0 | 0 | 1 | 1 |

| | | | | | | |
|---|---|---|---|---|---|---|
| 288 | 1 | 1 | 1 | 1 | 0 | 0 |
| 289 | 0 | 0 | 0 | 0 | 1 | 1 |

By applying the same reasoning previously outlined, it may be seen that only flip-flop 292 will be at logic 1 state after the second clock pulse T4, indicating a cumulative total of two, because two positive curves, each with a weight of 1 have been processed. The counter will increase the count by 1 each time a clock pulse T4 occurs until the curve with a weight of negative 1 is present.

The counter 271 will exhibit a count of 8 (all flip-flops except 294 will be at a logic 0) after clock pulse 8 occurs. The negative 1 curve now takes place and the input/output conditions are as in Table XII.

TABLE XII

| INPUT | | | | OUTPUT | | |
|---|---|---|---|---|---|---|
| | CN | A | B | Σ | $\overline{\Sigma}$ | $\overline{CN+1}$ |
| 285 | 0 | 1 | 0 | 1 | 0 | 1 |
| 286 | 1 | 0 | 1 | 0 | 1 | 0 |
| 287 | 0 | 1 | 0 | 1 | 0 | 1 |
| 288 | 1 | 0 | 0 | 1 | 1 | 0 1 |
| 289 | 1 | 1 | 0 | 0 | 1 | 0 |

After the 9th clock pulse, the counter will exhibit a count of 7. A 1 has been subtracted from 8 for a cumulative total of 7. By similar reasoning the operation of the counter over the useful weight range may be determined.

The output logic 272 comprises three flip-flops 301, 302 and 303. Flip-flop 301 is connected at its J input to the output of OR gate 281 and at its output to the input of a NAND gate 304 whose output drives an OR gate 305 from which the sharpness signal (SA) for quadrant A appears.

Flip-flop 302 is connected at its J input to the output of a NAND gate 310 by way of an inverter 311. Flip-flop 303 is connected at its input to the output of a NAND gate 312 by way of an inverter 313. It will be noted that the NAND gate 304 is connected at one input to the output of an OR gate 320. The OR gate 320 is connected at two inputs to the outputs of NAND gates 321 and 322. The third input to OR gate 320 is connected to the zero output of flip-flop 294. The fourth input to OR gate 320 is connected to the zero output of flip-flop 303 which is also connected to one input of OR gate 323.

NAND gate 321 is connected at one input to the 1 output of flip-flop 292. The second input to NAND gate 321 is connected to the one output of flip-flop 293 as is a first input of NAND gate 322. The second input of NAND gate 322 is connected to the one output of flip-flop 291.

The output logic 272 receives the counter information and declares a sharpness feature to be present in the A quadrant when a threshold of 4/5 is reached. These conditions are true only during the absence of negative curves, and only if it were not possible to run past the end of the counter. Since negative curves do exist and since it is possible to run past the end of the counter, the following problems are present and are solved by the system.

1. The sharpness accumulator logic will generate an undesirable signal when the count is negative. This condition may be readily observed when the counter exhibits a negative 1 and a positive 31 in the same manner. This is illustrated in Table XIII.

TABLE XIII

| | 16 | 8 | 4 | 2 | 1 |
|---|---|---|---|---|---|
| Negative 1 | 1 | 1 | 1 | 1 | 1 |
| Positive 31 | 1 | 1 | 1 | 1 | 1 |

2. The counter can flip over the end in a positive or negative direction. It has been determined that for each character the count would never reach a 31, and further, if a count of +15 was reached, a sharpness feature could be generated without the possibility of falling below the threshold. In the event a count of −15 is reached, the threshold will never be reached. The 16-bit counter 271 output is, therefore, used as a polarity detector, and to determine a "lock threshold." The "lock threshold" operates when a count exceeds ±15. At this point the sharpness accumulator logic may be locked in that state.

The $\overline{\text{ANSLOCK}}$ signal at the zero output of flip-flop 302 locks the accumulator in the $\overline{\text{SA}}$ state during the time that particular character is being processed. Conditions for $\overline{\text{ANSLOCK}}$ signal are:

*a.* count must be at ±16; the counter output will exhibit a logic 1 at 295 output.

*b.* if the next curve is negative an $\overline{\text{ANSLOCK}}$ signal must be generated before the clock pulse occurs; otherwise, the counter will flip over the end. The requirement is met by feeding the signals AWTN1 + AWTN4 and the output Σ of adder 289 to the NAND gate 310.

*c.* the sharpness logic circuit must not be in the positive lock state so that an $\overline{\text{ANSLOCK}}$ signal may also be fed to the NAND gate 304. By NANDing Σ from adder 289, the 1 output of flip-flop 295, AWTN1 + AWTN4, and $\overline{\text{ASLOCK}}$ in unit 310, all of the requirements for the $\overline{\text{ANSLOCK}}$ to exist have been met. When the $\overline{\text{ANSLOCK}}$ condition occurs, a logic 1 is inverted and fed to the negative lock flip-flop 302. This condition sets the $\overline{\text{ANSLOCK}}$ to a logic 0 at the next clock pulse. In order for the $\overline{\text{ANSLOCK}}$ to occur, the following conditions must be met.

*a.* The counter must be at ±15,

*b.* The next curvature must not be negative, and

*c.* The $\overline{\text{ANSLOCK}}$ must be at logic 0.

When the output Σ of adder 289, the zero output of flip-flop 295, AWTN1 + AWTN4 and $\overline{\text{ANSLOCK}}$ are NANDed in unit 312, inverted, and fed to the J input of the Positive Lock flip-flop 303, the flip-flop 303 is set at the next clock pulse. $\overline{\text{ASLOCK}}$ drops to a logic 0 and if an OK SHARP is at a logic 1, the sharpness accumulator logic is locked in the SA state. The release OK SHARP circuit ORs those curves in OR gate 280 and 281 which contribute to a SHARPNESS, and sets flip-flop 301 which feeds a logic 1 to the sharpness accumulator output logic. After receiving the counter information, the sharpness accumulator output logic combines the information to determine if the threshold has been reached. Coupled with the OK SHARP, AN- $\overline{\text{SLOCK}}$, and $\overline{\text{ASLOCK}}$ signals, an SA signal is generated which is fed to a feature accumulator.

Thus, in sharpness accumulation and feature determination operations, certain curve codes must occur to release the sharpness feature output, regardless of the accumulator total. Those not releasing the sharpness output will be marked with an asterisk (*) in Table XIV below. Curve codes that are summed as part of a five vector curve code are marked with a double asterisk (). A code marked by a triple asterisk (*) does not add weighting, but will enable the sharpness output. Those curve codes that contribute negative weighting can set an inhibit a latch if they occur during a threshold condition.

From an inspection of the A sharpness accumulator 260 of FIG. 24, it will be seen that the curves set forth in the following Table XIV are employed and contribute weights as there indicated.

TABLE XIV

A QUAD SHARPNESS:
(Threshold: 4/5)

| Curve Code | Weight | Curve Code | Weight |
|---|---|---|---|
| 100 | −4 | 320 | +1 |
| 103 | +3 | 330 | +1 |
| 111** | +4 | 488 | +4 |
| 112 | +4 | 489 | +3 |
| 113 | +6 | 480** | +2 |
| 121 | +4 | 400* | +1 |
| 122 | +6 | 890* | +1 |
| 123 | +6 | 800* | +1 |
| 130 | +3 | 809* | +1 |
| 131 | +6 | 702 | +1 |
| 132 | +6 | 703 | +1 |
| 133 | +6 | 688 | +4 |
| 290* | +1 | 698 | +3 |
| 209* | +1 | 608** | +2 |
| 200* | +1 | 600* | +1 |
| 590 | −1 | | |
| 509 | −1 | | |
| 500 | −4 | | |
| 599*** | − | | |

The C sharpness accumulator 261, the E sharpness accumulator 262 and the G sharpness accumulator 263 are constructed the same as accumulator 260. However, the input connections for accumulators 261–263 are different than for the accumulator 260. Table XV below shows the input connections for accumulator 260 in the order in which they appear at the left side of FIG. 24. Also, the corresponding connections for each of accumulators 261, 262, and 263 are included. Thus, from the detailed drawing of accumulator 260 and Table XV, the accumulators 261–263 shown in block form can be readily produced. The signal channels from the accumulators are then connected to the feature storage matrix 30, FIG. 1, shown in detail in FIG. 29.

TABLE XV

Accumulator Input Schedule

| Accumulator A | Accumulator C | Accumulator E | Accumulator G |
|---|---|---|---|
| $\overline{\text{C509}}$ | $\overline{\text{C709}}$ | $\overline{\text{C109}}$ | $\overline{\text{C309}}$ |
| $\overline{\text{C590}}$ | $\overline{\text{C790}}$ | $\overline{\text{C190}}$ | $\overline{\text{C390}}$ |
| $\overline{\text{C100}}$ | $\overline{\text{C300}}$ | $\overline{\text{C500}}$ | $\overline{\text{C700}}$ |
| $\overline{\text{C500}}$ | $\overline{\text{C700}}$ | $\overline{\text{C100}}$ | $\overline{\text{C300}}$ |
| $\overline{\text{C599}}$ | $\overline{\text{C799}}$ | $\overline{\text{C199}}$ | $\overline{\text{C399}}$ |
| $\overline{\text{C111-S}}$ | $\overline{\text{C311-S}}$ | $\overline{\text{C511-S}}$ | $\overline{\text{C711-S}}$ |
| $\overline{\text{C121}}$ | $\overline{\text{C321}}$ | $\overline{\text{C521}}$ | $\overline{\text{C721}}$ |
| $\overline{\text{C112}}$ | $\overline{\text{C312}}$ | $\overline{\text{C512}}$ | $\overline{\text{C712}}$ |
| $\overline{\text{C488}}$ | $\overline{\text{C688}}$ | $\overline{\text{C888}}$ | $\overline{\text{C288}}$ |
| $\overline{\text{C688}}$ | $\overline{\text{C888}}$ | $\overline{\text{C288}}$ | $\overline{\text{C488}}$ |
| $\overline{\text{C131}}$ | $\overline{\text{C331}}$ | $\overline{\text{C531}}$ | $\overline{\text{C731}}$ |
| $\overline{\text{C122}}$ | $\overline{\text{C322}}$ | $\overline{\text{C522}}$ | $\overline{\text{C722}}$ |
| $\overline{\text{C132}}$ | $\overline{\text{C332}}$ | $\overline{\text{C532}}$ | $\overline{\text{C732}}$ |
| $\overline{\text{C113}}$ | | $\overline{\text{C513}}$ | $\overline{\text{C713}}$ |
| $\overline{\text{C123}}$ | $\overline{\text{C323}}$ | $\overline{\text{C523}}$ | $\overline{\text{C723}}$ |
| $\overline{\text{C133}}$ | $\overline{\text{C333}}$ | $\overline{\text{C533}}$ | $\overline{\text{C733}}$ |
| $\overline{\text{C480-S}}$ | $\overline{\text{C680-S}}$ | $\overline{\text{C880-S}}$ | $\overline{\text{C280-S}}$ |
| $\overline{\text{C608-S}}$ | $\overline{\text{C808-S}}$ | $\overline{\text{C208-S}}$ | $\overline{\text{C408-S}}$ |
| $\overline{\text{C130}}$ | $\overline{\text{C330}}$ | $\overline{\text{C530}}$ | $\overline{\text{C730}}$ |
| $\overline{\text{C103}}$ | $\overline{\text{C303}}$ | $\overline{\text{C503}}$ | $\overline{\text{C703}}$ |
| $\overline{\text{C489}}$ | $\overline{\text{C689}}$ | $\overline{\text{C889}}$ | $\overline{\text{C289}}$ |
| $\overline{\text{C698}}$ | $\overline{\text{C898}}$ | $\overline{\text{C298}}$ | $\overline{\text{C498}}$ |
| $\overline{\text{C320}}$ | $\overline{\text{C520}}$ | $\overline{\text{C720}}$ | $\overline{\text{C120}}$ |
| $\overline{\text{C330}}$ | $\overline{\text{C530}}$ | $\overline{\text{C730}}$ | $\overline{\text{C130}}$ |
| $\overline{\text{C702}}$ | $\overline{\text{C102}}$ | $\overline{\text{C302}}$ | $\overline{\text{C502}}$ |
| $\overline{\text{C703}}$ | $\overline{\text{C103}}$ | $\overline{\text{C303}}$ | $\overline{\text{C503}}$ |
| $\overline{\text{C209}}$ | $\overline{\text{C409}}$ | $\overline{\text{C609}}$ | $\overline{\text{C809}}$ |
| $\overline{\text{C290}}$ | $\overline{\text{C490}}$ | $\overline{\text{C690}}$ | $\overline{\text{C890}}$ |
| $\overline{\text{C809}}$ | $\overline{\text{C209}}$ | $\overline{\text{C409}}$ | $\overline{\text{C609}}$ |
| $\overline{\text{C890}}$ | $\overline{\text{C290}}$ | $\overline{\text{C490}}$ | $\overline{\text{C690}}$ |
| $\overline{\text{C200}}$ | | | |
| $\overline{\text{C400}}$ | | | |
| $\overline{\text{C600}}$ | | | |
| $\overline{\text{C800}}$ | | | |

FIG. 25

FIG. 25 illustrates straight line accumulators. As in the case of the sharpness accumulators, these are four straight line accumulators one for each quadrant. Straight line accumulators 265–268 may produce output signals, i.e.,: line-vertical (LV), line-horizontal (LH), line-left sloping (LLS) and line-right sloping (LRS). The straight lines are those illustrated in FIG. 10. The signals required to detect the presence of a particular sloping line are those labeled as input signals to FIG. 25. The logic for line accumulator 265 is shown in detail with the logic for 266, 267, and 268 being shown only in block diagram form. However, the inputs and outputs are indicated in FIG. 25.

The line accumulators have threshold of 2, which means that an accumulated total contribution of 3 is adequate to define a line feature in a given zone. The line accumulator may be incremented by one or two counts by the occurrence of a curve code, depending upon the importance of the curvature to the line feature definition.

Straight line accumulator 265 comprises two adders 340 and 341. The adders 340 and 341 are the same as employed in the sharpness accumulators of FIG. 24. In this system, the outputs of OR gates 342 and 343 are connected to the A input of the adder 340. NOR gates 344 and 345 are connected at their output to additional inputs on gates 342 and 343.

The OR gate 346 is connected to the A input of the second adder 341. The Σ output of adder 340 is connected to the J input of a flip-flop 350. The Σ output of adder 341 is connected to the J input of a flip-flop 351. The $\overline{\text{CN+1}}$ output of adder 341 is connected to the J input of a flip-flop 352. The 1 output of flip-flop 350 is connected to the B input of adder 340, and to NAND gate 353 which leads to phantom OR gate 354, inverter 355 and thence to the output line LRS. The 1 output of flip-flop 351 is connected through a buffer to the B input of adder 341 and also to the NAND gate 353. Flip-flop 352 is connected at its 1 output, by way of inverter 356, to the phantom OR gate 354.

If the line LRS1 is at a logic 1 for four consecutive clock pulses, the flip-flop 350 output will be as indicated in FIG. 25a. When a count of three is reached, the 1 outputs of flip-flops 350 and 351 are ANDed in unit 353 and inverted to generate the LRS signal. If a count of four is reached, flip-flop 352 will be set to a logic 1 which will lock the LRS signal to a logic 1. In a similar manner, each of the LV, LH and LLS signals are generated.

FIG. 26

FIG. 26 is a plus curvature accumulator and serves to produce the four output signals CPA, CPC, CPE and CPG and in addition thereto, two weighting signals $\overline{PWT1}$ and $\overline{PWT2}$. The output signals are generated by use of the input signals and the logic circuits shown in FIG. 26. The input signals are labeled at the left margin of FIG. 26. The input signals are applied to a bank of OR and NOR gates 360 which lead by way of two banks of inverters 361 and 363 to four flip-flops 364–367. The inputs to the inverters 361 are also connected to inverters 368 to produce the weighting signals $\overline{PWT1}$ and $\overline{PWT2}$.

As shown, the combined outputs of the first pair of inverters 361 is applied to the J input of the flip-flop 364 whose 1 output is the signal CPA indicating a positive curvature in zone A. Similarly, the second pair of inverters 361 feed flip-flop 365 to produce at the 1 output the signal CPC. The third pair of inverters 361 feed the J input of flip-flop 366 to produce the output signal CPE. The fourth pair of inverters 361 feed flip-flop 367 to produce the output signal CPG.

It will be noted that the timing signal T4 is applied to the K inputs of flip-flops 364–367. With the circuit constructed as shown, a signal will appear on the output of flip-flop 364 if a positive curvature is in zone A. Positive curvatures in zones C, E and G will result in the appearance of signals on the outputs of flip-flops 365–367, respectively.

FIG. 27

In FIG. 27, a fan in gating logic circuit has been illustrated. It is responsive to the input signals whose legends appear at the left side of the drawing for production of eight signals CNA1, CNA2, CNC1, CNC2, CNE1, CNE2, CNG1 and CNG2. The latter signals are utilized in the negative curve, STOP and NODE accumulators of FIG. 28. The fan in gating logic comprises a bank 380 of OR and NOR gates having negations on their inputs. It will be understood that the particular curves used to generate the output signal CNA1 are less sharp or severe curves than those employed to generate the signal CNA2. The same is true of the other pairs of signals for the zones C, E and G.

FIG. 28

The eight input signals and two weighting signals employed in FIG. 28 serve to produce six output signals CNA, CNC, CNE, CNG, STOP and NODE. In the production of the first four signals, simple logic networks are employed. More particularly, signals CNA1 and CNA2 are applied by way of inverters 381 and 382 to an OR gate 383 having negations at the two inputs thereof. The output of the OR gate 383 is connected to the J input of a flip-flop 384 whose 1 output is the CNA signal. Similarly, the signals CNC1 and CNC2 are connected to an identical logic circuit 385 to produce the CNC signal. CNE1 and CNE2 signals are applied through logic circuit 386 to produce the output signal CNE. CNG1 and CNG2 signals are applied through logic circuit 387 to produce the CNC signals.

In producing the STOP and NODE output signals, the eight input signals CNA1–CNG2 are applied by way of a bank of inverters 390 to OR gates 393, 394 and 395. The first four inverters 390 have a common output connected to OR gates 393-395. The other four inverters 390 have a common output connected to OR gates 394 and 395. OR gate 393 has one other input, the signal $\overline{PWT1}$. The signal $\overline{PWT2}$ is connected through a negation to one input of OR gate 394. The outputs of OR gates 393-395 are then connected as inputs to a six stage counter 397. More particularly, OR gate 393 is connected to state 1 of counter 397, gate 394 is connected to stage 2, and gate 395 is connected to stages 3–6. The outputs of counter 397 are connected by way of a bus 398 and a bank of NAND gates 399 to output logic. The output logic circuit includes NAND gate 399*a* with an inverter 400 leading therefrom. OR gate 411 is connected through negations at one input to the outputs of NAND gates 399*b* and 399*c* and at a second input to the outputs of NAND gates 399*d* and 399*e*. OR gate 410 is connected through negations at one input to the outputs of NAND gates 399*f* and 399*g*. OR gate 411 produces at its output the NODE signal. NAND gate 399*h* is connected through a negation to a third input OR gate 410, the output of which is the STOP signal. The NAND gate 399*j* is connected by way of an inverter 404 to the J input of a flip-flop 406. The zero output of flip-flop 406 is connected through a negation to the fourth input of OR gate 410. The third and fourth inputs of OR gate 411 are connected to the zero output of a flip-flop 405. The J input of flip-flop 405 is connected to the output of inverter 400.

A timing signal T4 is connected by way of a driver 407 to the T inputs of the flip-flops 405 and 406. A control signal line CLFA is connected to the CD terminals of flip-flops 405 and 406 and to the first stage of the counter 397. A CLFA signal serves to "clear the feature accumulators."

Thus, by use of the circuit of FIG. 28, the six feature signals CNA, CNC, CNE, CNG, STOP and NODE are produced.

The circuits of FIGS. 24–28 have as output signals the eighteen feature signals set out in Table I. The eighteen states are then stored, one set for each of the nine zones of FIG. 6, in the feature storage array 30 of FIG. 1. The storage matrix 30 of FIG. 1 is thus filled one register at a time. Each column of Table I may be considered to represent a storage register. There is one register for each of the nine zones of FIG. 6. After each of the nine zones has been sensed and the results thereof stored in the storage matrix, the voltage states thus present in the storage matrix are applied through the character mask 36, FIG. 1, for a decision as to the presence of any given symbol for which a mask is provided. The storage matrix 30, FIG. 1, is shown in detail in FIG. 29.

FIG. 29

The eighteen feature channels 420 extend from the circuits of FIGS. 24–28. The top channel, the STOP signal channel, is connected to the J input of a flip-flop 421. The NODE channel is connected to the J input of a flip-flop 422. Additional flip-flops not shown are provided in feature storage array 1 (FSA), one for each of the remaining sixteen channels of the group 420. Since the channels are all identical, only the top two channels have been illustrated in detail, the rest being shown in block form.

The I output of flip-flop 421 is connected by way of a driver amplifier including transistor 423 to the output channel 424 on which the signal f1,STOP appears. Similarly, the I output of flip-flop 422 is connected by way of an amplifier including a transistor 425 so that the output line 426 provides the output channel for the signal f1,NODE. The transistors 423 and 425 are provided in order to permit the driving of the several masks employed in the decision operation. Thus, the voltage states stored in the flip-flops 421 and 422 and the remaining sixteen flip-flops in the FSA1 appear after suitable amplification on the output channels 431. There are eighteen output channels from FSA1 and thus eighteen possible signals at the output of the first feature storage array. The output signals represent the existence of the features set out in column 1 of Table I.

The other feature storage arrays FSA2–FSA9 are shown in block form only. They are of the same construction as FSA1. They are each provided with a set of output channels, eighteen channels per set. The sets of output channels are designated as sets 432–439 and correspond with states represented in columns 2–9 of Table I. Thus, the output channels 432 include eighteen separate channels corresponding to channels 431 from FSA1.

Common to FSA1-FSA9 is a counter reset line 440 upon which a CR signal may appear. A voltage pulse appears on channel 440 having been generated after a bar between adjacent characters is detected in its passage over the retina 10 of FIG. 1. The detection of a bar thus produces the reset pulse which resets all of the storage flip-flops 421, 422, etc. in all FSA1–FSA9 of FIG. 29 preparatory to storing a similar set of features for the next succeeding character on retina 10.

Figure 29:
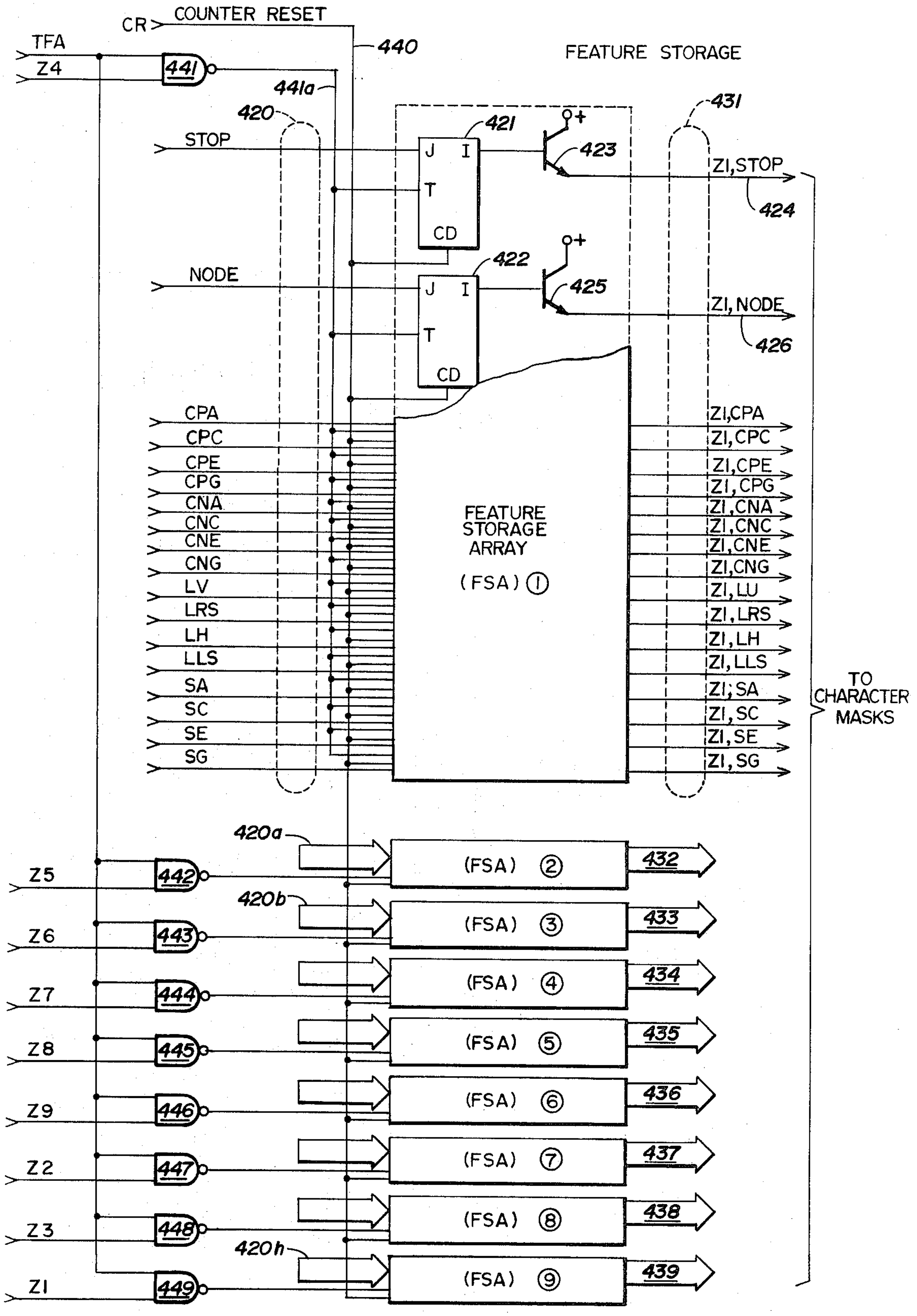
FIG. 29 illustrates the feature storage matrix of FIG. 1.

The transfer gate 28 of FIG. 1 is represented in FIG. 29 by the NAND gates 441–449. Each of the gates 441–449 is connected to the T input terminals of all of the flip-flops 421, 422, etc. in a given set. More particularly, the NAND gate 441 is connected to the T input terminal of the flip-flop 421 and to the T input terminal of flip-flop 422 and to the T input terminals of the additional sixteen flip-flops in FSA1. NAND gate 442 is similarly connected to all eighteen flip-flops in FSA2. NAND gates 443–449 similarly are connected. One input of NAND gate 441 is supplied by a TFA signal. The other input is supplied by a *f4* signal. The TFA signal is produced at the end of each processing operation for each of the zones 1–9, FIG. 6. This is a transfer feature accumulator signal. It is combined in gate 441 with a zone indicator signal to produce a strobe signal on line 441*a* which enables the storage elements in FSA1 to be set in dependence upon the signals on the input channels 420. Thus, the discovered features for the first zone are gated into the proper section of the feature storage matrix 30. In a similar manner, the TFA signal is combined with signal f5 to NAND gate 442. Signals *f6, f7, f8, f9, f2, f3* and *f1* are connected to NAND gates 443–449, respectively. While input channels 420 are shown connected only to the feature storage array 1, identical connections are provided to each of FSA-2–FSA9. The eighteen input channels 420 are connected in parallel to the nine feature storage array inputs as in 420 *a*, 420*b*, etc.

Thus, by operation of the circuit of FIG. 29 all the output signals necessary to be applied to character masks are generated.

The character masks 36 of FIG. 1 fed by the storage matrix 30 of FIG. 29 may be the same type as those disclosed in prior U.S. Pat. No. 3,417,372. They comprise resistive networks suitably weighted in accordance with the features that characterize a given symbol. The character masks each may comprise as many as 162 weighting resistors in a mask network. The number of inputs to the mask and the values of the resistors to be used may be determined in accordance with the principles set out in prior patents, including U.S. Pat. No. 3,417,372. In connection with detection of handprinted characters, different persons may execute the same character in slightly different form. Thus, the present invention provides for the different possible forms. By way of example, there is set out in the following tables the elements of character masks that have been used for each of the characters 0–9.

Tables XVI–XVIII represent three different masks for sensing the character 0. Tables XIX–XXI represent three masks for sensing the character 1. Tables XXII–XXIX detail one mask for each of the characters 2–9. In practice, it has been found desirable to use several masks for each of the symbols to be detected. In one embodiment of the invention, twenty masks were used for symbol 0, twenty-three masks for the symbol 1 in order to accommodate the different ways in which different persons may execute the numerals 0 and 1 and still distinguish them from each other and from all the different ways others may write the numerals 2–9.

TABLE XVI

#1 Handprinted Character Mask for 0

| | 1 | 2 | 3 | 4 | 5 | 6 | 7 | 8 | 9 |
|---|---|---|---|---|---|---|---|---|---|
| Stops | −167 | −200 | −250 | −167 | −125 | −125 | −200 | −150 | −167 |
| Nodes | 0 | 0 | −100 | −536F | −250 | −536F | −150 | 0 | −111 |
| +Curve A | −167 | 0 | 167 | −125 | −250 | 0 | 0 | −111 | −167 |
| +Curve C | 0 | 0 | 0 | 0 | 0 | 0 | 0 | 0 | 0 |
| +Curve E | −167 | 0 | 0 | 0 | 0 | 0 | 150 | 0 | −150 |
| +Curve G | 0 | 0 | 0 | 0 | −250 | 0 | −200 | 0 | 0 |
| −Curve A | −59 | 0 | 200 | −250 | −250 | 0 | 0 | 0 | −167 |
| −Curve C | 0 | 0 | −250 | 0 | −250 | 0 | −150 | 0 | 150 |
| −Curve E | −250F | 0 | 0 | 0 | −250 | 0 | 200 | 0 | −150 |
| −Curve G | 167 | 0 | 0 | 0 | 0 | 0 | 0 | 0 | 0 |
| Horiz | 0 | 0 | 0 | −167 | 0 | −200 | 0 | 0 | 0 |
| Right sl | 0 | 0 | −167 | 0 | 0 | 0 | −250 | 0 | 0 |
| Vertical | 0 | 0 | 0 | 167 | 0 | 167 | 0 | 0 | 0 |
| Left sl | −125 | 0 | 0 | 0 | 0 | 0 | 0 | 0 | −125 |
| Sharp A | 0 | 0 | 0 | 0 | −167 | 0 | −167 | −125 | −167 |
| Sharp C | −125 | −125 | 0 | 0 | −167 | 0 | 0 | 0 | 0 |
| Sharp E | −250 | 0 | 0 | 0 | 0 | −150 | 0 | 0 | −150 |
| Sharp G | 0 | 0 | 0 | 0 | −200 | 0 | 0 | −167 | −111 |

NOTE.—Absence weight 99.52 (86.30%); presence weight 13.68 (13.68%); total weight 113.20 (99.98%).

TABLE XVII

#2 Handprinted Character Mask for 0

| | 1 | 2 | 3 | 4 | 5 | 6 | 7 | 8 | 9 |
|---|---|---|---|---|---|---|---|---|---|
| Stops | −200 | 0 | −366F | −150 | −200 | −125 | −200 | −200 | −150 |
| Nodes | 0 | 0 | −125 | −366F | −366F | −366F | −366F | 0 | −111 |
| +Curve A | −200 | 0 | 0 | −111 | −200 | 0 | −111 | −111 | −167 |
| +Curve C | −167 | 0 | −111 | −167 | 0 | 0 | 0 | 0 | 0 |
| +Curve E | −250 | 0 | 0 | 0 | −200 | −91 | 200 | 0 | −150 |
| +Curve G | 0 | 0 | 0 | 0 | 0 | 0 | −250 | 0 | 0 |
| −Curve A | −111 | 0 | 366F | −250 | −250 | 0 | 0 | 0 | −200 |
| −Curve C | 0 | 0 | 0 | 0 | 0 | 0 | −366 | 0 | 200 |
| −Curve E | −200 | −91 | −44 | 0 | −366F | 0 | 200 | 0 | −150 |
| −Curve G | −366F | 0 | 0 | 0 | 0 | 0 | 0 | 0 | 0 |
| Horiz | −200 | 0 | 0 | −150 | 0 | −366F | 0 | 0 | 0 |
| Right sl | 0 | 0 | −44 | 0 | 0 | 0 | −200 | 0 | 0 |
| Vertical | 0 | 0 | 0 | 0 | 0 | 536F | 0 | 0 | 0 |
| Left sl | −111 | 0 | 0 | −250 | −200 | 0 | 0 | 0 | −111 |
| Sharp A | −200 | 0 | 0 | −100 | −250 | 0 | −111 | −83 | −150 |
| Sharp C | −125 | −91 | 0 | −150 | 0 | 0 | 0 | 0 | 0 |
| Sharp E | −200 | −167 | −125 | 0 | −250 | −150 | 0 | 0 | 0 |
| Sharp G | 0 | 0 | 0 | 0 | 0 | −125 | 0 | −150 | −111 |

NOTE.—Absence weight 121.1 (92.13%); presence weight 15.02 (6.00%); total weight 136.43 (98.13%).

TABLE XVIII

3 Handprinted Character Mask for 0

| | 1 | 2 | 3 | 4 | 5 | 6 | 7 | 8 | 9 |
|---|---|---|---|---|---|---|---|---|---|
| Stops | −250 | 0 | −366F | −200 | −250 | −125 | −366 | −200 | −150 |
| Nodes | 0 | 0 | −91 | −366F | −536F | −366 | −200 | 0 | 6 |
| +Curve A | −250 | 0 | 0 | −200 | 0 | 0 | 0 | −167 | −360 |
| +Curve C | 0 | 0 | 0 | 0 | 0 | 0 | 0 | 0 | 0 |
| +Curve E | −167 | 0 | 0 | 0 | 0 | 0 | 167 | 0 | −150 |
| +Curve G | 0 | 0 | 0 | 0 | −366 | 0 | −366 | 0 | 0 |
| −Curve A | −125 | 0 | −366F | −250 | 0 | 0 | 0 | 0 | −250 |
| −Curve C | 0 | 0 | −200 | 0 | −250 | 0 | −200 | 0 | 250 |
| −Curve E | −366F | 0 | 0 | 0 | −536F | 0 | 200 | 0 | −100 |
| −Curve G | 536F | 0 | 0 | 0 | 0 | 0 | 0 | 0 | 0 |
| Horiz | 0 | 0 | 0 | −250 | 0 | −250 | 0 | 0 | 0 |
| Right sl | 0 | 0 | −250 | 0 | 0 | 0 | −200 | 0 | 0 |
| Vertical | 0 | 0 | 0 | 250 | 0 | 366 | 0 | 0 | 1 |
| Left sl | −150 | 0 | 0 | 0 | 0 | 0 | 0 | 0 | −110 |
| Sharp A | 0 | 0 | 0 | 0 | 0 | 0 | 0 | −167 | −200 |
| Sharp C | −150 | −167 | 0 | 0 | −250 | 0 | 0 | 0 | 0 |
| Sharp E | −200 | 0 | 0 | 0 | 0 | −100 | 0 | 0 | −150 |
| Sharp G | 0 | 0 | 0 | 0 | −125 | 0 | 0 | −150 | −100 |

NOTE.—Absence weight 111.11 (85.75%); presence weight 17.69 (12.33%); total weight 128.80 (98.08%).

TABLE XIX

1 Handprinted Character Mask for 1

| | 1 | 2 | 3 | 4 | 5 | 6 | 7 | 8 | 9 |
|---|---|---|---|---|---|---|---|---|---|
| Stops | −111 | 125 | −91 | −100 | 0 | −77 | −83 | 125 | −100 |
| Nodes | −27 | −77 | −70 | −83 | −125 | −59 | −77 | −83 | −54 |
| +Curve A | −91 | 100 | 0 | −64 | 0 | −125 | −54 | 0 | 0 |
| +Curve C | −70 | 0 | −83 | −83 | 0 | −91 | −77 | 111 | 0 |
| +Curve E | −111 | 0 | −59 | −100 | 0 | −59 | 0 | 0 | −77 |
| +Curve G | 0 | 111 | −91 | −100 | 0 | −59 | 0 | 0 | −59 |
| −Curve A | −59 | −125 | −125 | −77 | −125 | −100 | −59 | −91 | −100 |
| −Curve C | −83 | −83 | −77 | −77 | −125 | −77 | −77 | 0 | −125 |
| −Curve E | −83 | 0 | −83 | −111 | 0 | −77 | −200 | 0 | −100 |
| −Curve G | −100 | −125 | −91 | −91 | 0 | −77 | 0 | 0 | −100 |
| Horiz | −111 | −111 | −100 | −91 | −111 | −83 | −100 | −111 | −91 |
| Right sl | −100 | 0 | −100 | −536F | 0 | −91 | −77 | 0 | −125 |
| Vertical | 0 | 0 | 0 | 0 | 100 | −125 | 0 | 0 | 0 |
| Left sl | −59 | 0 | −125 | −91 | 0 | −83 | −536F | 0 | −59 |
| Sharp A | −91 | 0 | 0 | −64 | 0 | −91 | −54 | 0 | −77 |
| Sharp C | −70 | 0 | −77 | −70 | 0 | −83 | −77 | 0 | 0 |
| Sharp E | −100 | 0 | −59 | −100 | 0 | −59 | 0 | 0 | −83 |
| Sharp G | 0 | 0 | −91 | −77 | 0 | −59 | −83 | 0 | −59 |

NOTE.—Absence weight 100.33 (89.61%); presence weight 6.72 (6.72%); total weight 107.05 (96.33%).

TABLE XX

#2 Handprinted Character Mask for 1

| | 1 | 2 | 3 | 4 | 5 | 6 | 7 | 8 | 9 |
|---|---|---|---|---|---|---|---|---|---|
| Stops | −111 | 125 | −91 | −100 | 0 | −91 | 125 | −91 | −91 |
| Nodes | −30 | −70 | −70 | −91 | −125 | −64 | −77 | −83 | −54 |
| +Curve A | −91 | 111 | 0 | −64 | 0 | −125 | −59 | 0 | −91 |
| +Curve C | −91 | 0 | −91 | −70 | 0 | −91 | 0 | 0 | 0 |
| +Curve E | −111 | 0 | −59 | −100 | 0 | −70 | 100 | 0 | −70 |
| +Curve G | 0 | 111 | −91 | −100 | 0 | −64 | 0 | 0 | −59 |
| −Curve A | −54 | −125 | −125 | −91 | −125 | −91 | −64 | −77 | −91 |
| −Curve C | −83 | −83 | −91 | −91 | −125 | −91 | 0 | 0 | −125 |
| −Curve E | −91 | 0 | −77 | −100 | 0 | −70 | 0 | 0 | −91 |
| −Curve G | −100 | −125 | −77 | −91 | 0 | −77 | 0 | 0 | −91 |
| Horiz | −111 | −111 | −91 | −77 | −100 | −91 | −91 | −111 | −91 |
| Right sl | −100 | 0 | −91 | −111 | 0 | −83 | 0 | 0 | −125 |
| Vertical | 0 | 0 | 0 | 0 | 100 | −125 | 0 | 0 | −111 |
| Left sl | −77 | 0 | −111 | −77 | 0 | −91 | −125 | 0 | −64 |
| Sharp A | −83 | 0 | 0 | −64 | 0 | −91 | −59 | 0 | −91 |
| Sharp C | −91 | 0 | −83 | −70 | 0 | −77 | 0 | 0 | 0 |
| Sharp E | −111 | 0 | −59 | −91 | 0 | −70 | 0 | 0 | −70 |
| Sharp G | 0 | 0 | −64 | −77 | 0 | −59 | 0 | 0 | −70 |

NOTE.—Absence weight 88.03 (88.03%); presence weight 6.72 (6.72%); total weight 94.75 (94.75%).

TABLE XXI

#3 Handprinted Character Mask for 1

| | 1 | 2 | 3 | 4 | 5 | 6 | 7 | 8 | 9 |
|---|---|---|---|---|---|---|---|---|---|
| Stops | −125 | 111 | 0 | −100 | 0 | −77 | −100 | −111 | 111 |
| Nodes | −30 | −70 | −70 | −70 | −111 | −111 | −77 | −91 | −48 |
| +Curve A | −125 | 125 | 0 | −64 | 0 | −111 | −54 | 0 | 0 |
| +Curve C | −77 | 0 | −83 | −77 | 0 | −91 | −70 | 0 | 100 |
| +Curve E | −125 | 0 | −70 | −111 | 0 | −64 | 0 | 0 | 0 |
| +Curve G | 0 | 100 | 0 | −100 | 0 | −70 | −100 | 0 | −77 |
| −Curve A | −54 | −111 | −125 | −64 | −125 | −125 | −59 | −100 | −125 |
| −Curve C | −77 | −77 | −77 | −83 | −125 | −111 | −83 | 0 | −111 |
| −Curve E | −70 | 0 | −83 | −111 | −125 | 0 | −111 | 0 | 0 |
| −Curve G | −100 | −111 | −83 | −91 | 0 | −83 | −83 | 0 | −91 |
| Horiz | −91 | −125 | −125 | −77 | −125 | −77 | −83 | −111 | −111 |
| Right sl | −100 | 0 | −83 | −111 | 0 | −91 | −77 | 0 | −111 |
| Vertical | 0 | 0 | 0 | 0 | 125 | 0 | −111 | 0 | 0 |
| Left sl | −54 | 0 | −111 | −77 | 0 | −83 | −111 | 0 | −77 |
| Sharp A | −100 | 0 | 0 | −64 | 0 | −125 | −54 | 0 | 0 |
| Sharp C | −77 | 0 | −59 | −59 | 0 | −83 | −77 | 0 | 0 |
| Sharp E | −125 | 0 | −70 | −111 | 0 | −83 | 0 | 0 | 0 |
| Sharp G | 0 | 0 | 0 | −77 | 0 | −77 | −77 | 0 | −70 |

NOTE.—Absence weight 89.44 (89.44%); presence weight 6.72 (6.72%); total weight 96.16 (96.16%).

TABLE XXII

#1 Handprinted Character Mask for 2

| | 1 | 2 | 3 | 4 | 5 | 6 | 7 | 8 | 9 |
|---|---|---|---|---|---|---|---|---|---|
| Stops | 536 | 0 | 0 | −833 | 0 | 0 | 0 | 0 | 1,000 |
| Nodes | 0 | 0 | −167 | 0 | 0 | −200 | 0 | 0 | 0 |
| +Curve A | 0 | 0 | 0 | −150 | 0 | 0 | 0 | 0 | 167 |
| +Curve C | 0 | 0 | 0 | 0 | 0 | 0 | 0 | 0 | 0 |
| +Curve E | 536 | 0 | 0 | 0 | 0 | −250 | 167 | 0 | 0 |
| +Curve G | 0 | 0 | 0 | 0 | 0 | 0 | 0 | 0 | 0 |
| −Curve A | 0 | 0 | 0 | −536 | 0 | 0 | 0 | 0 | 0 |
| −Curve C | 0 | 0 | 0 | 0 | 0 | 0 | 0 | 0 | 0 |
| −Curve E | −366 | 0 | 0 | 0 | 0 | 0 | 0 | 0 | 0 |
| −Curve G | 0 | 0 | 0 | 0 | 0 | 0 | 0 | 0 | 0 |
| Horiz | 0 | 0 | 0 | −273 | 0 | 0 | 0 | 536 | 0 |
| Right sl | 0 | 0 | 0 | 0 | 1,000 | 0 | 0 | 0 | 0 |
| Vertical | −366 | 0 | 0 | 0 | 0 | 0 | 0 | 0 | −366 |
| Left sl | 0 | 0 | 0 | −200 | −200 | −250 | 0 | 0 | 0 |
| Sharp A | 0 | 0 | 0 | −150 | 0 | 0 | 0 | 0 | 0 |
| Sharp C | 0 | 0 | 0 | 0 | 0 | 0 | 0 | 0 | 0 |
| Sharp E | 0 | 0 | 0 | 0 | 0 | −250 | 0 | 0 | 0 |
| Sharp G | 0 | 0 | 0 | 0 | 0 | 0 | 0 | 0 | 0 |

NOTE.—Absence weight 45.57 (45.57%); presence weight 39.42 (39.42%); total weight 84.99 (84.99%).

TABLE XXIII

#1 Handprinted Character Mask for 3

| | 1 | 2 | 3 | 4 | 5 | 6 | 7 | 8 | 9 |
|---|---|---|---|---|---|---|---|---|---|
| Stops | 536 | −200 | −1,000F | 1,000F | −200 | −1,000 | 366 | −150 | −1,000 |
| Nodes | 0 | 0 | 0 | 0 | 0 | 0 | 0 | −1,000 | 0 |
| +Curve A | −100 | 0 | 0 | 0 | 0 | 0 | 0 | 0 | 0 |
| +Curve C | 0 | 0 | 0 | 0 | 0 | 0 | 0 | 0 | 536 |
| +Curve E | 366 | 0 | −150 | 0 | 0 | 0 | 125 | 0 | 0 |
| +Curve G | 366 | 0 | 0 | 0 | 0 | −125 | 250 | 0 | 0 |
| −Curve A | 0 | 0 | 0 | −150 | 0 | 0 | 0 | 0 | 0 |
| −Curve C | 0 | 0 | 0 | −125 | 0 | 0 | −536 | 0 | 0 |
| −Curve E | 0 | 0 | 0 | −111 | 0 | 0 | 0 | 0 | 0 |
| −Curve G | 0 | 0 | 0 | −111 | 0 | 0 | −536 | 0 | 0 |
| Horiz | 0 | 0 | 0 | 0 | 0 | 0 | 0 | 0 | 0 |
| Right sl | 0 | 0 | 0 | 0 | 0 | 0 | 0 | 0 | 0 |
| Vertical | −200 | 0 | 0 | −1,000F | 0 | 0 | 0 | 0 | 0 |
| Left sl | 0 | 0 | 0 | 0 | 0 | 0 | 0 | 0 | 0 |
| Sharp A | 0 | 0 | 0 | 0 | 0 | 0 | 0 | 0 | 0 |
| Sharp C | 0 | 0 | 0 | 0 | 0 | 0 | 0 | 0 | 0 |
| Sharp E | 0 | 0 | 0 | 0 | 0 | 0 | 0 | 0 | −1,000 |
| Sharp G | 0 | 0 | 0 | 0 | 0 | 0 | 0 | 0 | 0 |

NOTE.—Absence weight 86.94 (66.94%); presence weight 35.45 (25.45%); total weight 122.39 (92.39%).

TABLE XXIV

#1 Handprinted Character Mask for 4

| | 1 | 2 | 3 | 4 | 5 | 6 | 7 | 8 | 9 |
|---|---|---|---|---|---|---|---|---|---|
| Stops | −167 | 167 | 200 | −536F | −77 | 0 | −167 | 125 | −125 |
| Nodes | 0 | 0 | −70 | −91 | 366 | 0 | −77 | −83 | −77 |
| +Curve A | −111 | 150 | 125 | −48 | 0 | 0 | −59 | −111 | −100 |
| +Curve C | 0 | 0 | −111 | −91 | 0 | 0 | −167 | 111 | 0 |
| +Curve E | −91 | −77 | −48 | 0 | 0 | −70 | 0 | 125 | 0 |
| +Curve G | 0 | 167 | 536F | 0 | 0 | −83 | −83 | 0 | −77 |
| −Curve A | −54 | −167 | −167 | −200 | 366 | 0 | −91 | 0 | 0 |
| −Curve C | 0 | −91 | −100 | 0 | 366 | 0 | −77 | −125 | −125 |
| −Curve E | −125 | −91 | −111 | 0 | 0 | 0 | 0 | −100 | −70 |
| −Curve G | 0 | −150 | −100 | 0 | 0 | 0 | −125 | 0 | 0 |
| Horiz | −111 | −167 | −150 | 0 | 0 | 0 | 0 | −125 | 0 |
| Right sl | 0 | 0 | 0 | 0 | 0 | 0 | −91 | 0 | 0 |
| Vertical | 0 | 0 | 200 | 0 | 0 | 0 | −125 | 125 | 0 |
| Left sl | −54 | −125 | −150 | −125 | −100 | −91 | −125 | −91 | 0 |
| Sharp A | −111 | 0 | 200 | −167 | 0 | 0 | −59 | 0 | 0 |
| Sharp C | −59 | −59 | 0 | −77 | 0 | 0 | −83 | 0 | 0 |
| Sharp E | −111 | −77 | −48 | 0 | 0 | 0 | 0 | 0 | 0 |
| Sharp G | 0 | 0 | 0 | 0 | 0 | 0 | −83 | 0 | 0 |

NOTE.—Absence weight 74.30 (68.94%); presence weight 33.29 (27.93%); total weight 107.59 (96.87%).

TABLE XXV

#1 Handprinted Character Mask for 5

| | 1 | 2 | 3 | 4 | 5 | 6 | 7 | 8 | 9 |
|---|---|---|---|---|---|---|---|---|---|
| Stops | −366 | 0 | 536 | −250 | 0 | 0 | 536 | −250 | 0 |
| Nodes | 0 | 0 | 0 | 0 | 0 | 0 | −200 | 0 | 0 |
| +Curve A | 0 | 0 | 0 | 0 | 0 | 0 | 0 | −250 | 0 |
| +Curve C | −250 | 0 | 366 | 0 | 0 | 0 | 0 | 0 | 0 |
| +Curve E | 0 | 0 | −250 | 0 | 0 | 0 | 0 | 0 | 0 |
| +Curve G | 366 | 0 | 0 | 0 | 0 | 0 | 536 | 0 | 0 |
| −Curve A | 0 | 0 | 0 | 0 | 0 | 0 | 0 | 0 | 0 |
| −Curve C | 0 | 0 | 0 | 0 | 0 | 0 | 0 | 0 | 0 |
| −Curve E | 0 | 0 | 0 | 536 | −536 | 0 | 0 | 0 | 0 |
| −Curve G | 366 | −536 | 0 | 0 | 0 | −536 | 0 | 0 | 0 |
| Horiz | 0 | 366 | 0 | 0 | 0 | 0 | 0 | 0 | 0 |
| Right sl | 0 | 0 | 0 | 0 | 0 | 0 | 0 | 0 | 0 |
| Vertical | 0 | −250 | −366 | 0 | 0 | 0 | 0 | 0 | 0 |
| Left sl | 0 | 0 | 0 | 0 | 0 | 0 | 0 | 0 | 0 |
| Sharp A | 0 | 0 | 0 | 0 | 0 | 0 | 0 | 0 | 0 |
| Sharp C | 0 | 0 | 0 | 0 | 0 | 0 | 0 | 0 | 0 |
| Sharp E | 0 | 0 | 0 | 0 | 0 | 0 | 0 | −200 | 0 |
| Sharp G | 0 | 0 | 0 | 0 | 0 | 0 | 0 | −150 | 0 |

NOTE.—Absence weight 43.90 (43.90%); presence weight 36.08 (36.08%); total weight 79.98 (79.98%).

TABLE XXVI

#1 Handprinted Character Mask for 6

| | 1 | 2 | 3 | 4 | 5 | 6 | 7 | 8 | 9 |
|---|---|---|---|---|---|---|---|---|---|
| Stops | 0 | 0 | 536 | −300 | 0 | 0 | −536 | 0 | 0 |
| Nodes | 0 | 0 | 0 | 0 | 536 | 0 | 0 | 0 | 0 |
| +Curve A | 0 | 0 | 0 | −300 | 0 | 64 | 0 | 0 | 0 |
| +Curve C | 0 | 0 | 0 | 0 | 0 | 0 | 0 | 0 | 0 |
| +Curve E | −250 | 0 | −200 | −64 | −100 | 0 | 0 | 0 | 0 |
| +Curve G | 0 | 0 | 0 | 0 | 0 | 0 | 0 | 0 | 0 |
| −Curve A | 0 | −536 | −536 | −44 | 0 | 0 | 0 | 0 | 0 |
| −Curve C | 0 | 0 | 0 | 0 | 0 | 0 | 0 | 0 | 0 |
| −Curve E | 0 | 0 | 0 | 0 | 1,000 | 0 | 1,000 | 0 | 0 |
| −Curve G | −44 | 0 | 0 | 0 | 0 | 0 | 0 | 0 | 0 |
| Horiz | 0 | −64 | 0 | 0 | 0 | 0 | 0 | 0 | 0 |
| Right sl | 0 | 0 | 64 | 0 | 0 | 0 | 0 | 0 | 0 |
| Vertical | 1,000 | 0 | 0 | 0 | 0 | 0 | 0 | 0 | 0 |
| Left sl | 0 | 0 | −200 | 0 | 0 | 0 | 0 | 0 | 0 |
| Sharp A | 0 | 0 | 0 | 0 | 0 | 0 | 0 | 0 | 0 |
| Sharp C | 0 | 0 | 0 | 0 | −83 | 0 | 0 | 0 | 0 |
| Sharp E | 0 | 0 | −200 | 0 | 0 | 0 | 0 | 0 | 0 |
| Sharp G | 0 | −64 | 0 | 0 | 0 | 0 | 0 | 0 | 0 |

NOTE.—Absence weight 45.21 (45.21%); presence weight 32.00 (32.00%); total weight 77.21 (77.21%).

TABLE XXVII

#1 Handprinted Character Mask for 7

| | 1 | 2 | 3 | 4 | 5 | 6 | 7 | 8 | 9 |
|---|---|---|---|---|---|---|---|---|---|
| Stops | 366F | 0 | −250 | 0 | 0 | −200 | 250 | 0 | −250 |
| Nodes | 0 | 0 | −250 | −111 | −536F | 0 | −91 | −167 | 0 |
| +Curve A | 0 | 0 | 250 | −150 | −366F | 0 | 0 | 0 | −250 |
| +Curve C | 0 | 0 | 0 | 0 | 0 | 0 | 0 | 0 | −187 |
| +Curve E | 250 | 0 | −125 | 0 | −187 | −125 | 250 | 0 | −100 |
| +Curve G | 250 | 0 | 0 | 0 | 0 | 0 | 0 | 0 | −91 |
| −Curve A | −83 | 0 | 0 | −150 | −187 | 0 | −125 | −125 | −200 |
| −Curve C | 0 | 0 | 0 | 0 | 0 | 0 | 0 | 0 | −366 |
| −Curve E | 0 | −125 | 0 | −250 | −366F | 0 | −200 | −250 | −200 |
| −Curve G | 0 | 0 | 0 | 0 | 0 | 0 | 0 | 0 | 0 |
| Horiz | 0 | 250 | 0 | 0 | 0 | −125 | −187 | −536F | −250 |
| Right sl | 0 | 0 | 0 | 0 | 250 | 0 | 0 | 0 | −366F |
| Vertical | −200 | 0 | 0 | 0 | 0 | 0 | 0 | 0 | −366 |
| Left sl | 0 | 0 | 0 | −250 | −167 | −167 | −167 | −91 | −150 |
| Sharp A | 0 | 0 | 0 | −83 | −536F | 0 | 0 | 0 | −250 |
| Sharp C | 0 | 0 | 0 | −91 | −536F | 0 | 0 | 0 | −250 |
| Sharp E | 0 | 0 | −125 | 0 | 0 | −91 | 0 | 0 | −111 |
| Sharp G | 0 | 0 | 0 | 0 | −536F | −91 | 0 | −150 | −91 |

NOTE.—Absence weight 120.26 (82.48%); presence weight 21.16 (17.50%); total weight 141.42 (99.98%).

TABLE XXVIII

#1 Handprinted Character Mask for 8

| | 1 | 2 | 3 | 4 | 5 | 6 | 7 | 8 | 9 |
|---|---|---|---|---|---|---|---|---|---|
| Stops | −366 | −536 | −536 | 0 | 0 | 0 | −536 | −536 | −536 |
| Nodes | 0 | 0 | 0 | 0 | 1,000 | 0 | 0 | 0 | 0 |
| +Curve A | 0 | 0 | 200 | 0 | 0 | 0 | −366 | 0 | 0 |
| +Curve C | 0 | 0 | 0 | 0 | 0 | 0 | 0 | 0 | 200 |
| +Curve E | 0 | 0 | 0 | 0 | 0 | 0 | 366 | 0 | 0 |
| +Curve G | 0 | 0 | 0 | 0 | 0 | 0 | 0 | 0 | 0 |
| −Curve A | 0 | 9 | 536 | 0 | 0 | 0 | 0 | 0 | 0 |
| −Curve C | 0 | 0 | 0 | 0 | 0 | 0 | 0 | 0 | 536 |
| −Curve E | 0 | 0 | 0 | 0 | 0 | 0 | 536 | 0 | 0 |
| −Curve G | 1,000 | 0 | 0 | 0 | 0 | 0 | 0 | 0 | 0 |
| Horiz | 0 | 0 | 0 | 0 | 0 | 0 | 0 | 0 | 0 |
| Right sl | 0 | 0 | 0 | 0 | 0 | 0 | 0 | 0 | 0 |
| Vertical | 0 | 0 | 0 | 0 | 0 | 0 | 0 | 0 | 0 |
| Left sl | 0 | 0 | 0 | 0 | 0 | 0 | 0 | 0 | 0 |
| Sharp A | 0 | 0 | 0 | 0 | 0 | 0 | 0 | 0 | 0 |
| Sharp C | 0 | 0 | 0 | 0 | 0 | 0 | 0 | 0 | 0 |
| Sharp E | 0 | 0 | 0 | 0 | 0 | 0 | 0 | 0 | 0 |
| Sharp G | 0 | 0 | 0 | 0 | 0 | 0 | 0 | 0 | 0 |

NOTE.—Absence weight 34.12 (34.12%); presence weight 43.74 (43.74%); total weight 77.86 (77.86%).

TABLE XXIX

#1 Handprinted Character Mask for 9

| | 1 | 2 | 3 | 4 | 5 | 6 | 7 | 8 | 9 |
|---|---|---|---|---|---|---|---|---|---|
| Stops | −366 | −366 | −366 | −250 | −111 | 0 | −167 | 0 | 366 |
| Nodes | 0 | 0 | 0 | −167 | 366 | 0 | −125 | −200 | 0 |
| +Curve A | −366 | 0 | 250 | 0 | −250 | 0 | −100 | −125 | 0 |
| +Curve C | 0 | 0 | 0 | 0 | 0 | 0 | −167 | 0 | 250 |
| +Curve E | 0 | −111 | −125 | 0 | 0 | 0 | 0 | 0 | 366 |
| +Curve G | 0 | 0 | 0 | 0 | 0 | 0 | −250 | 0 | 0 |
| −Curve A | 0 | 0 | 0 | 0 | 0 | 0 | −125 | 0 | 0 |
| −Curve C | 0 | 0 | 0 | 0 | 0 | 0 | −150 | −200 | −250 |
| −Curve E | 0 | 0 | 0 | 0 | 0 | 0 | 0 | −536F | 0 |
| −Curve G | 366 | 0 | 0 | 0 | 0 | 0 | −536F | −167 | −250 |
| Horiz | 0 | 0 | 0 | 0 | 0 | −200 | 0 | −536F | −250 |
| Right sl | 0 | 0 | 0 | 0 | 0 | 0 | −167 | −200 | 0 |
| Vertical | 0 | 0 | 0 | 0 | 0 | 0 | −200 | 0 | 0 |
| Left sl | 0 | 0 | 0 | 0 | 0 | −167 | −366 | −250 | 0 |
| Sharp A | 0 | 0 | 0 | −111 | 0 | 0 | −91 | 0 | 0 |
| Sharp C | −250 | 0 | 0 | 0 | 0 | 0 | −167 | 0 | 0 |
| Sharp E | 0 | −125 | 0 | 0 | 0 | 0 | −366 | 0 | 0 |
| Sharp G | 0 | 0 | 0 | 0 | 0 | 0 | −150 | 0 | 0 |

NOTE.—Absence weight 94.22 (78.14%); presence weight 19.64 (19.64%); total weight 113.86 (97.78%).

In Table XVI it will be noted that the character mask, rather than require the presence of 162 resistors in the networks, requires only sixty-one resistors. Some are of positive and some are of negative weight. The same is generally true of all masks employed.

As in U.S. Pat. No. 3,417,372, it is actually the case that two masks are employed for each form of each character to be detected. One mask of each pair indicates feature presence and the other indicates feature absence. The positive masks contain resistors in the expected features of the character to which the mask relates. The negative masks contain resistors in the expected false features of the character. The positive and negative masks are indicated by the sign of the weights in Tables XVI–XXIX.

If a character on the retina 10 exactly overlays a mask, a voltage is applied to all the resistors. The sum of the outputs in that case results in zero mismatch. Any feature detected in the false area of a negative mask, or any false detected in the feature area of a positive mask results in a decreased output. Therefore, if a character does not exactly overlay the mask, a lower output voltage is obtained from the mask. Thus, the character mask which least mismatches the character on the retina delivers the highest output voltage. More weight is placed on certain features by connecting those outputs to mask resistors of lower values. The character recognition process is gated to insure that a character will be recognized only after the shifting process indicated in FIG. 6 has been completed.

From the foregoing it will be understood that the output signals from the feature storage array are applied to masks as may be desired and may be designed for particular execution of different symbols. The outputs of the masks are then applied to output matrix amplifiers. The output matrix amplifiers may be the amplifiers 161, FIG. 4, of U.S. Pat. No. 3,417,372. In the embodiment here described, the amplifiers were tailored to amplify character mask output signals that exceed 3.5 volts and accommodate output signals from the character masks up to 5.0 volts.

An output mask amplifier (OMA) is provided for each mask. All OMAs preferably have gate inputs connected to control logic so that the OMAs can be inhibited under any desired condition. Each OMA is electrically related to a particular character of the system vocabulary. The OMAs amplify their respective inputs to a usable level, and in doing so increase the difference between similar, but separate, character mask outputs.

Only those character mask output signals that exceed +3.5 volts are amplified. This is based on the assumption that if no character mask output exceeds +3.5 volts when a character is on the retina 10, the character is not in the system vocabulary. Even badly deteriorated characters have been found to result in mask outputs of at least +3.5 volts. Any input signal less than 3.5 volts results in an amplifier output of −6 volts.

The OMAs amplify signals between 3.5 and 5.0 volts. Each OMA input, then, is the upper +1.5 volts of a possible character mask output signal. Any signal above 5.0 volts is clipped on the positive peak. The amplifier gain is approximately 8.5:1, delivering outputs from −6.0 volts (high mismatch) to +7.0 (no mismatch). The clipping level preferably is variable above and below the nominal 3.5 volt level, the point at which the OMAs begin to amplify, by varying the reference voltage.

The reference voltage can be determined by measuring the peak voltage of any character mask that exceeds 3.3 volts. Subtract 3.3 volts from the measured voltage and multiply the difference by 8.5. This voltage will be the swing of the OMA output voltage. The OMA reference may then be adjusted to produce this swing.

The decision making process based upon the output of the OMAs may be as set forth in U.S. Pat. No. 3,417,372 by means of which a single output indication is produced to identify a given character from simultaneous comparison of all the signals from all the masks.

It will now be recognized that the invention may be used for the identification of machine printed characters. In such case, the problem is much simplified because of the identity between repetitive execution of the same character. However, the present invention differs from prior methods and systems in that the field on which the symbol is projected is analyzed for features in each of a plurality of subarrays. The character features in each of the subarrays or zones are then detected and the presence or absence of a given feature for each of the zones is stored. The data stored in the feature storage matrix 30 is then applied to masks whose outputs are then applied to the decision logic.

The invention has been found to be satisfactory in the form detailed in FIGS. 11–29 as a fully wired fixed circuit. However, the same decision making process may be implemented by proper programming of an automatic digital computer. So far as is presently determined, the wired system herein described is the preferred form of the invention.

While the array 10 has been divided into nine separate zones, it may be possible or desirable to utilize a fewer or a greater number of zones in the retina in order to identify characters. The nine zones herein selected and employed have been found to represent a system satisfactory for identification of hand executed symbols. The invention has been described in terms of an optical reader for handprinted characters. Sets of pattern related signals such as applied to input matrix 20 of FIG. 1 may be evaluated or identified through the use of the invention quite independent of the source, optical or otherwise.

FIG. 30

Figure 30:
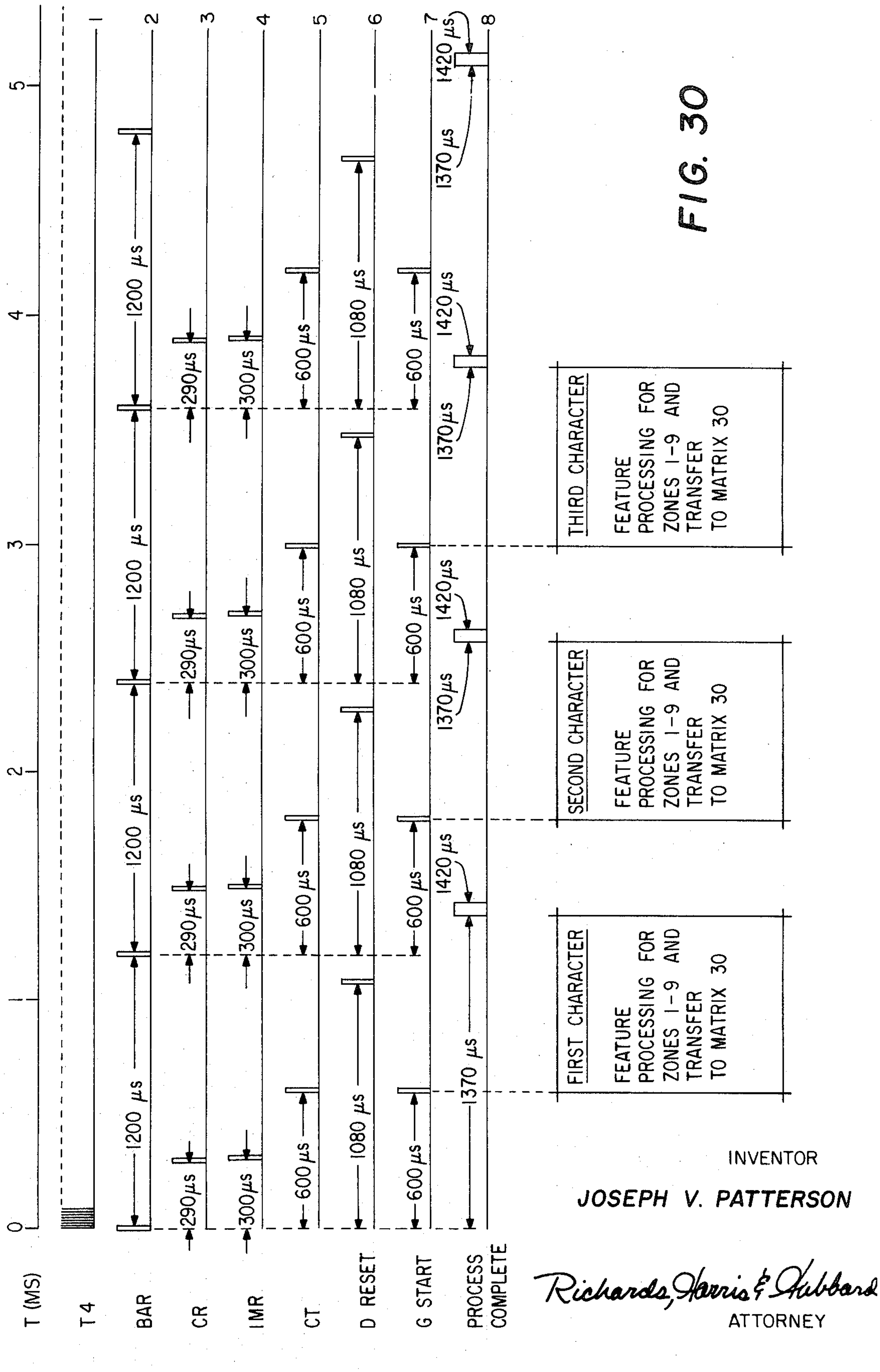
FIG. 30 is a system timing diagram.

FIG. 30 illustrates a timing sequence for the control of the operation of the system illustrated in FIGS. 11–29. It will be remembered that characters are projected onto the retina 10, FIG. 1, from a moving document traveling past the retina 10 at high speed, for example, around 1200 inches per second. The effect of the presence of a character is transferred and stored in matrix 20 in predetermined time relation with reference to the appearance at the center of the retina of a bar forming part of the rectangle enclosing the field in which the character is written. It will further be remembered that the system described herein, representing an embodiment of the invention that has been found to be operable and satisfactory for character recognition, contemplates the execution of the characters so that they fill substantially the rectangular field provided and that the characters be executed without unnecessary loops and with unbroken line strokes. Where the executed character to be recognized is substantially smaller than the character field provided, normalization procedures may be undertaken to expand the character stored in the input matrix so that it effectively occupies the entire field. Such normalization procedures have not here been described inasmuch as the system is operable without use thereof so long as reasonable care is exercised in executing the character so as to fully utilize the space provided.

The operation of the character recognition system of FIGS. 11–29 is under control of one microsecond pulses from a 1 MHz clock located in the master sequencer 50 of FIG. 1. Clock pulses T4 are used not only to control the sequence of operations, as will be described below, but are also applied to various gates and flip-flops throughout the system to serve as enable pulses for synchronizing the changing of states and generally time the system functions.

FIG. 30 is a timing diagram illustrating the relative time occurrences of various operations in a series of character processing sequences. The one microsecond clock pulses are illustrated in line 1 of the timing diagram as a pulse train T4. Zero reference time in each process sequence begins with the detecting of a bar in the center of the retina 10 (FIG. 1). The occurrence of a bar triggers the operation of a D counter (not shown) which registers each of the one microsecond clock pulses and whose count is decoded at preset values to generate certain timing pulses.

As shown on line 2 of FIG. 30, BAR pulses occur every twelve hundred microseconds. This spacing of BAR pulses will, of course, be dependent upon the size of the character field utilized and the speed at which document travels. For the installation herein described, a 1200 microsecond interval was employed.

At 290 microseconds after reference time zero at which a BAR pulse occurs, a counter reset (CR) pulse is produced as illustrated on the third line of FIG. 30. At 300 microseconds after the generation of each BAR pulse, i.e., when the bar has traveled across one-fourth the face of the retina, an input matrix reset (IMR) pulse is produced as shown on line 4. The CR pulse is applied to clear and reset the X, Y, and Z counters and the feature storage matrix while the IMR pulse is employed to clear and set the storage elements of the input matrix.

After passage of 600 microseconds from reference time zero, the bar has reached the boundary of the retina and the character field is in proper registration with the retina area. At this time the D counter value is decoded to produce a character transfer (CT) pulse of 25 microseconds duration as shown on line 5 of FIG. 30, which pulse is applied to the circuitry to transfer the responses of the photocells in the retina through the amplitude correlators into the input storage matrix.

At 600 microseconds after initiation of a timing cycle, a G counter (not shown) is also triggered, line 7, FIG. 30. Control of the cessation of a processing sequence is then shifted from the D counter to the G counter because each character processing operation overlaps the receipt of the next bar image. If the D counter were not released from its processing control function by the G counter, it could not be cleared, reset, and triggered to begin counting at reference time zero by the next succeeding bar image so as to begin the processing sequence for the next succeeding character. Following triggering of the G counter, the D counter is reset at 1080 microseconds, line 6, FIG. 30. At 1370 microseconds from reference time zero, the G counter, i.e., at a count of 770, is decoded to produce a process complete signal of 50 microseconds duration, line 8, FIG. 30.

Since scanning and processing of the nine zones illustrated in FIG. 6 begins at 600 microseconds with the generation of the CT pulse, and ceases with the onset of the process complete pulse at a time of 1370 microseconds, the timing sequence allows 770 microseconds for processing the nine zones for a given character image. The actual time required to process a character will vary depending upon the number of black zones in the character image on the retina and the complexity of the vectors to be generated in processing. For all characters, processing will be completed within the "worst case" time interval of 770 microseconds with the average probably being in the range of 400–500 microseconds.

In operation, a BAR present signal, derived from a mask, sets a BAR present flip-flop and enables the system clock, which starts advancing the D counter.

The basic timing functions are generated by the D counter. The first function generated, the CR pulse, resets the X, Y, and Z counter and the feature storage matrix. The IMR pulse (input-matrix reset) is generated next. At this time the input matrix 20 in FIG. 1 contains no data and the system counters are reset. The next decoded output of the D counter occurs when the character to be analyzed is exactly centered in the retina at 600 microseconds after reference time zero. This term initializes the X, Y, and Z counters, putting decimal 1 in these counters. The pulse CT that initializes the counters is gated to transfer the amplitude correlator outputs into the input matrix 20.

With the desired data in the input matrix 20, the shifting process starts. The shifting operation allows each black cell in the matrix 20 to be viewed as the center cell for vector derivation for one process pulse. The next clock pulse, after the CT pulse, allows the shifting process to begin and resets a terminate flip-flop.

At the end of each zone a transfer feature accumulator (TFA) flip-flop is set and remains set for two clock pulses. During this period of time, the shifting process and advancing of the X, Y, and Z counters is inhibited. The two clock pulse interval is employed for transferring the contents of the feature accumulators into the feature storage matrix 30 and resetting the feature accumulators 26. The shifting process continues after TFA is reset. The shifting ends with the data in the input matrix 20 in its original form. This occurs one clock pulse after the outputs Z1, Y1, and X12 become true. At this time, the terminate flip-flop is set inhibiting the system clocks such that no shifting occurs. The terminate flip-flop remains set until the next CT signal when it is reset, allowing the shifting process to start again. The shifting process and the advancing of the counters are controlled by gating the clocks to the input matrix 20 and the respective counters. The equations for the gate clocks are shown below:

$$IMC = IMR + LVIP \cdot \overline{FFT} \cdot \overline{TFA} \cdot (SU+SL+SR) + \overline{PROCESS\ ENABLE} \cdot (SU+SL+SR) \cdot TFA \cdot FFT$$

$$CG = LVIP \cdot FFT \cdot TFA \cdot (SU+SL+SR) + \overline{PROCESS\ ENABLE} + \overline{PROCESS\ ENABLE} \cdot (SU+SL+SR) \cdot TFA \cdot FFT$$

$$ZG = LVIP + \overline{PROCESS\ ENABLE}$$

IMR — Input Matrix Reset
LVIP — Last Vector in Process
FFT — Terminate Flip-Flop
TFA — Transfer Feature Accumulator
SU — Shift Up
SL — Shift Left
SR — Shift Right
Process Enable — Enables Vector Sequences These gated terms enable the 1 MHz clock to the respective counters.

Thus, in accordance with the invention, automatic recognition of alphanumeric characters is carried out where representations of such characters are sequentially focused onto an array of photocells forming a retina whose output signals are applied to amplitude correlators to derive for each cell a black output signal or a white output signal for control of character selection. Means are provided responsive to the derived signal from each of the cells as it occupies a center cell location in a process array and to the derived signals from cells surrounding each center cell for generating a curvature signal representative of the type of curvature in the character responsible for the output signal from the center cell. Automatic means classifies and stores, in response to the curvature signals, indicia designating predetermined features of the character present in zones occupied by each of a plurality of multiple overlapping subarrays of the array of photocells. Means including character mask comparison means are responsive to said indicia for producing an output signal uniquely representative of the character. The automatic means for classifying and storing provides for the introduction of weighting of predetermined vector signals to provide for identification of character features otherwise ambiguous.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for automatic recognition of a character in a series of alphanumeric characters where representations of such characters are sensed by sensors to produce output signals applied to amplitude correlators to derive a matrix of signals, comprising a black output signal or a white output signal for each sensor for control of the identification of said character, the combination which comprises:

means responsive to the derived signal from each said sensor and to the derived signals from sensors surrounding each said sensor for generating curvature signals representative of curvatures in the boundary of said character in the region of each said sensor, automatic means for generating and storing, in response to said curvature signals, binary representations designating the presence of any of four quadrant limited positive curvature features and any of four quadrant limited negative curvature features of the boundary of said character in each of a plurality of contiguous subarrays of said sensors, and means including character mask comparison means responsive to said binary representations for producing an output signal uniquely representative of said character.

2. In the recognition of a character in a series of alphanumeric characters where representations of such characters are sequentially generated as binary signals processed to derive a matrix of binary black output signal and binary white output signal representative of the black/white character of a field on which said character resposes, the steps of:

a. generating curvature signals representative of the change in direction of the border of the character responsible for the output signals from areas at and adjacent said border, b. in response to said curvature signals, generating a set of binary curvature feature signals designating the presence or absence of each of four quadrant limited positive curvature features and four quadrant limited negative curvature features of said character in each of a plurality of overlapping submatrices of said matrix of black or white signals, and c. simultaneously applying said curvature feature signals for all of the submatrices to masks, numbering at least one for each of the characters in said set, for generating one signal from each of said masks whereby the signals from said masks may be employed in deciding which character in said set relates to said black and white signals.

3. The method according to claim 2 in which there is included the step generating and applying to said masks feature signals representative of stops, nodes and sharpness.

4. The method according to claim 2 in which there is included the step generating and applying to said masks feature signals representative of horizontal, right sloping or left sloping lines.

5. The method according to claim 2 in which there is included the step generating and applying to said masks feature signals representative of existence of changes in boundary direction of sharpness in excess of a predetermined threshold of any one of four different quadrant limits.

6. A system for automatic recognition of an alphanumeric character where a representation of said character is focused onto an array of photocells forming a retina whose output signals are applied to amplitude correlators to derive for each cell in the retina a black output signal or a white output signal for control of character selection, the combination which comprises:

means responsive to the derived signal from each given cell and from each of the cells surrounding each cell for generating a vector signal for each of said cells which has a black output signal and is bordered by at least one cell having a white output signal, said vector signal being representative of the direction of the boundary of the portion of the character responsible for the output signal from said given cell, means responsive to each vector signal generated for said given cell and to the vector signals generated for the cells surrounding said given cell for generating curvature signals representative of change in direction of the boundary in the character segment in the region sensed by said given cell, automatic means responsive to said curvature signals generated for cells within each of a set of successively analyzed zones defining a plurality of contiguous subarrays of said array of photocells for generating a plurality of binary feature signals representative of the presence of any of four quadrant limited positive curvature features and any of four quadrant limited negative curvature features in each of said subarrays to signal the presence of a character feature in each said subarray, and means including character mask comparison means responsive to said feature signals for producing an output signal uniquely representative of said character focused upon said retina.

7. The system of claim 6 wherein control means are provided for establishing nine subarrays each bounded on at least two sides by a contiguous subarray.

8. A system as set forth in claim 6 wherein said means responsive to said curvature signals includes means to generate a signal representative of the presence of the feature of a line ending, characterized by an excess convex curvature within any of said subarrays.

9. A system as set forth in claim 6 wherein said means responsive to said curvature signals includes means to generate a signal representative of the presence of the feature of a line intersection, characterized by an excess concave curvature within any of said subarrays.

10. A system as set forth in claim 6 wherein said means responsive to said curvature signals includes means to generate a signal representative of the presence of the feature of a straight line, characterized by edges having a predetermined minimum curvature within any of said subarrays.

11. A method for recognition of a character in a set of alphanumeric characters where representations of such characters are sequentially focused onto an array of photocells forming a retina producing output signals which are processed to derive as a matrix of output signals a black output signal or a white output signal for each said photocell comprising the steps of:

a. generating binary signals representative of the presence of any of four quadrant limited positive boundary curvature features, four quadrant limited negative boundary curvature features, right slope boundary, left slope boundary, vertical boundary and horizontal boundary in the border of said character when said character is responsible for said black and white output signal derived from cells at and adjacent said border in each of a plurality of overlapping submatrices of said matrix, and b. storing said binary signals for each of said submatrices for simultaneous transfer to character masks, numbering at least one mask for each of the characters in said set, to identify said character from others in said set.

12. In character recognition where a binary type matrix represents the light and dark condition of elemental areas of a field on which a character reposes, the steps of:

a. generating a binary output signal for each of four quadrant limited positive and negative curvature features in a first fraction of said field, with binary signals indicating presence or absence of said features in any portion of the boundary of said character in said fraction of said field, b. generating binary signals indicating the presence or absence in said first fraction of said field of vertical boundary, horizontal boundary, right sloping boundary and left sloping boundary, c. generating like binary output signals for each of a plurality of similar fractions adjoining said first fraction on at least two sides thereof, and d. applying all said binary output signals for all said fractions to a set of character masks for identifying such character.

13. In a system for automatic recognition of a character in a set of alphanumeric characters where representations of such characters are sensed to produce output signals applied to amplitude correlators to derive a matrix of signals, comprising a black output signal or a white output signal for each elemental area of the field on which said character resposes for control of character selection, the combination which comprises:

means responsive to the derived signal for each said area and to the derived signals for areas surrounding each said area for generating vector signals, at least one vector signal for each area producing a black output signal and adjoining an area producing a white output signal, each vector signal reflecting at least three predetermined different degrees of curvature in the boundary of said character in the region of said area, automatic means for generating and storing, in response to said vector signals, binary representations designating the presence or absence of each of a set of character stroke features comprising four quadrant limited positive and negative curvature features of said character for each of a plurality of overlapping subareas of of said field, and means including character mask comparison means responsive to said binary representations for producing an output signal uniquely representative of said character.

14. In the recognition of a character in a set of alphanumeric characters where representations of such character is generated as binary signals processed to derive a matrix formed of a binary black output signal or a binary white output signal for each elemental area of the field upon which said character reposes, the steps of:

a. generating for each said area which have a black output signal and is bounded by at least one white output signal a vector signal dependent upon at least three different predetermined degrees of curvature present in the region of said area, b. in response to said vector signals, generating a set of binary feature signals designating the presence or absence of each of four quadrant limited positive curvature features and four quadrant limited negative curvature features of said character in each of a plurality of overlapping fractions of said field, and c. simultaneously applying said feature signals for all said fractions to a plurality of masks numbering at least one for each of the characters in said set, for generating one signal from each of said masks whereby the signals from said masks may be employed in identifying said character.

15. The method according to claim 14 in which there is included the step generating and applying to said masks feature signals representative of stops, nodes and sharpness.

16. The method according to claim 14 in which there is included the step generating and applying to said masks feature signals representative of horizontal, right sloping or left sloping lines.

17. The method according to claim 14 in which there is included the step generating and applying to said masks feature signals representative of existence of changes in boundary direction of sharpness in excess of a predetermined threshold of any one of four different quadrant limits.

* * * * *

PO-1050
(5/69)

UNITED STATES PATENT OFFICE
CERTIFICATE OF CORRECTION

Patent No. 3,766,520 Dated Oct. 16, 1973

Inventor(s) Joseph V. Patterson

It is certified that error appears in the above-identified patent and that said Letters Patent are hereby corrected as shown below:

Assignee: "Regonition" should be --Recognition--.
Col. 2, line 25, "search" should be --searching--;
line 52, "straight 2" should be --straight line--.
Col. 5, line 7, "14" should be --15--;
line 24, "storage" should be --feature--.
Col. 8, line 17, "such a" should be --such as--.
Col. 9, line 29, "storage" should be --input--;
line 48, "The 1,1" should be --The--.
Col. 11, line 65, "155" (first occurrence) should be --to--.
Col. 12, line 11, "vevtor" should be --vector--.
Col. 14, line 48, "(feed h)" should be --$\overline{\text{(feed h)}}$--.
Col. 19, line 29, "288 1 0 0 1 1 0 1" should be
--288 1 0 0 $\overline{1\ 0}$ 1--.
Col. 21, line 69, line should be --$\overline{C113}$, $\overline{C313}$, $\overline{C513}$, $\overline{C713}$--.
Col. 27, Table XVIII, figures under #9 ahould be --150, 0, -366, 0, -150, 0, -250, 250, -100, 0, 0, 0, 0, -111, -200, 0, -150, -100--.
Col. 31, Table XXVI, "Vertical.......1,000" should be
--Vertical.......-1,000--;
Table XXVIII, figures under #2 should be -- -536, 0, 0, 0, 0, 0, 0, 0, 0, 0, 0, 0, 0, 0, 0, 0, 0, 0--.
Col. 35, line 55, "1" should be --two--;
line 63, "2" should be --three--.
Col. 36, line 3, "third" should be --fourth--;
line 7, "4" should be --five--;
line 16, "5" should be --six--;
line 21, after "triggered" insert --by a G START pulse--;
line 21, "7" should be --eight--;
line 32, "6" should be --seven--;
line 35, "process complete" should be PROCESS COMPLETE--.
Col. 37, line 26, "TFA·FFT" should be --$\overline{\text{TFA}}\cdot\overline{\text{FFT}}$--.
Col. 38, line 59, after "step" insert --of--;
line 63, after "step" insert --of--;
line 67, after "step" insert --of--.

PO-1050
(5/69)

UNITED STATES PATENT OFFICE
CERTIFICATE OF CORRECTION

Patent No. 3,766,520 Dated Oct. 16, 1973

PAGE - 2

Inventor(s) Joseph V. Patterson

It is certified that error appears in the above-identified patent and that said Letters Patent are hereby corrected as shown below:

Col. 40, line 65, "is" should be --are--.
Col. 42, line 4, after "step" insert --of--;
line 8, after "step" insert --of--;
line 12, after "step" insert --of--.

Column 36, line 36, "8" should read -- 9 --.

Signed and sealed this 24th day of September 1974.

(SEAL)
Attest:

McCOY M. GIBSON JR.
Attesting Officer

C. MARSHALL DANN
Commissioner of Patents